United States Patent [19]
Yasuda et al.

[11] Patent Number: 5,887,136
[45] Date of Patent: Mar. 23, 1999

[54] COMMUNICATION SYSTEM AND COMMUNICATION CONTROL METHOD FOR THE SAME

[75] Inventors: Chikara Yasuda, Kawasaki; Masahiro Takagi, Tokyo; Tsuguhiro Hirose, Yokohama; Narito Kimura, Ichikawa; Ryuji Ito, Tokyo; Kazue Fujiwara, Kawasaki, all of Japan

[73] Assignee: Kabushiki Kaisha Toshiba, Kawasaki, Japan

[21] Appl. No.: 691,559

[22] Filed: Aug. 2, 1996

[30] Foreign Application Priority Data

| Aug. 4, 1995 | [JP] | Japan | 7-219888 |
| Aug. 4, 1995 | [JP] | Japan | 7-219889 |
| Aug. 22, 1995 | [JP] | Japan | 7-213768 |

[51] Int. Cl.$^6$ .................................................. G06F 17/00
[52] U.S. Cl. ...................................................... 395/200.34
[58] Field of Search ........................ 395/200.34, 200.35, 395/200.47, 200.48, 200.57, 200.59; 348/13, 15, 16

[56] References Cited

U.S. PATENT DOCUMENTS

| 5,544,320 | 8/1996 | Konrad | 395/200.57 |
| 5,764,916 | 6/1998 | Busey et al. | 395/200.57 |

FOREIGN PATENT DOCUMENTS

| 4-361462 | 12/1992 | Japan . |
| 7-66898 | 3/1995 | Japan . |
| 7-121036 | 12/1995 | Japan . |

OTHER PUBLICATIONS

Watabe et al.; Distributed Desktop Conferencing System with Multiuser Multimedia Interface: IEEE Journal Of Selected Areas in Communication, vol. 9, No. 4, May 1991.

Chang et al; Call Processing And Signalling in a Desktop Multimedia Conferencing System; 1996.

*Primary Examiner*—Ellis B. Ramirez
*Attorney, Agent, or Firm*—Oblon, Spivak, McClelland, Maier & Neustadt, P.C.

[57] ABSTRACT

A communication system housing a plurality of terminals capable of processing one or more media is provided with an available terminal information storage section for storing a terminal or terminals to be used for each user, an available media information storage section for storing a medium or media or a media realization scheme or schemes to be used for each terminal, a determination section for determining a combination of one or more media or one or more media realization schemes and a terminal combination of one or more terminals to be used by each user in accordance with the contents of the available terminal information storage section and the available media information storage section for each of users engaged in communications according to communication requests and a control section for controlling setting of call/connections based on the media combination and the terminal combination determined by the determination section.

25 Claims, 58 Drawing Sheets

| USER id | TERMINAL id |
|---|---|
| USER A | 101 |
| USER B | 102, 103, 104 |
| USER C | 105 |
| USER D | 106, 107 |
| USER E | 108 |
| .. | .. |

FIG. 2

| TERMINAL id | MEDIA |
|---|---|
| 101 | AUDIO CODING SCHEME a1<br>VIDEO CODING SCHEME v1 |
| 102 | VIDEO CODING SCHEME v1 |
| 103 | AUDIO CODING SCHEME a1 |
| 104 | AUDIO CODING SCHEME a2 |
| 105 | AUDIO CODING SCHEME a1 |
| 106 | AUDIO CODING SCHEME a2 |
| 107 | VIDEO CODING SCHEME v2 |
| 108 | AUDIO·VIDEO CODING SCHEME av1 |
| .. | .. |

FIG. 3

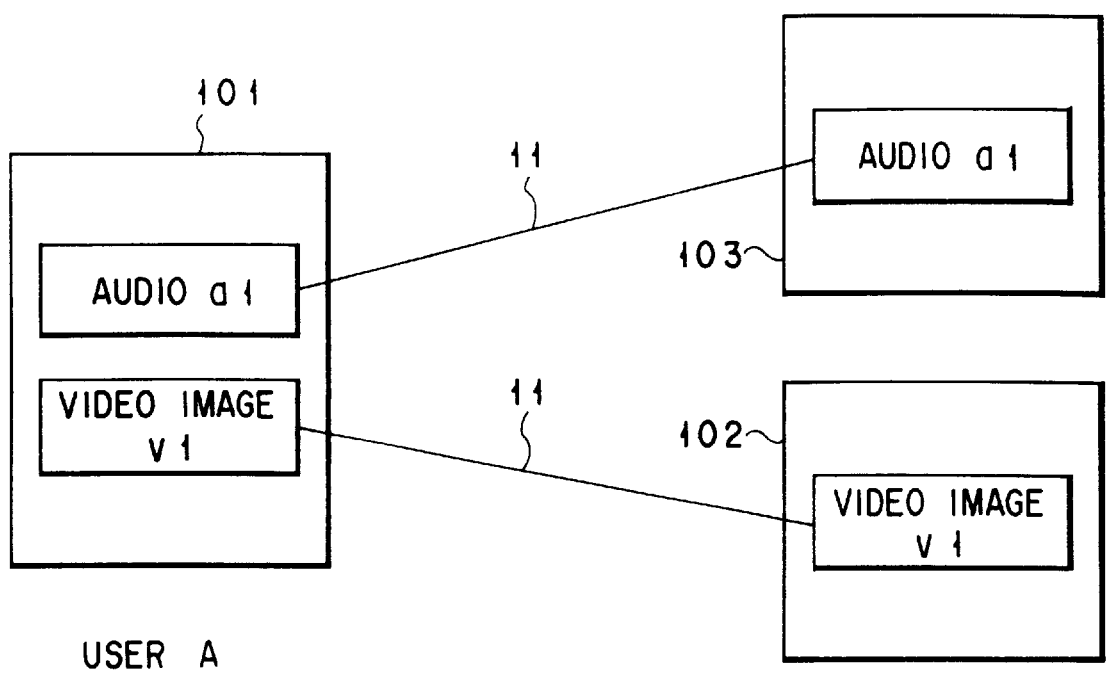
F I G. 5
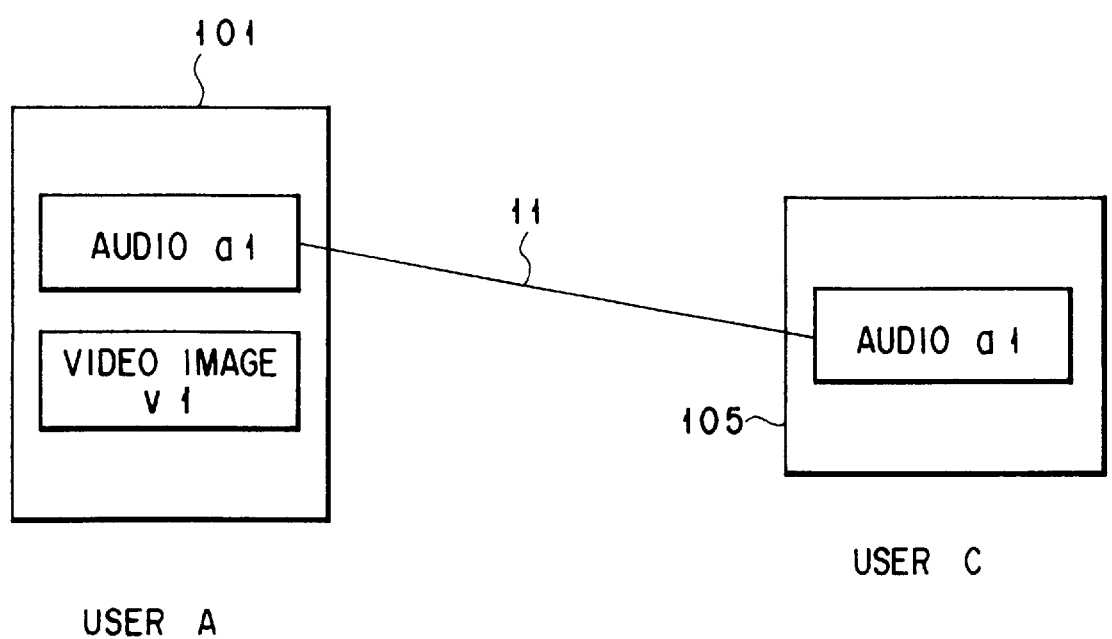
F I G. 7

| MEDIA CONVERSION SECTION id | CONVERSION MEDIA | ADDRESS |
|---|---|---|
| 201 | AUDIO CODING SCHEME  a1 ⇔ a2 | addr1 |
| 202 | AUDIO + VIDEO CODING SCHEME  av1 ⇔ av2 | addr2 |
| 203 | VIDEO CODING SCHEME  v1 ⇔ v2 | addr3 |
| .. | .. | .. |
F I G. 9
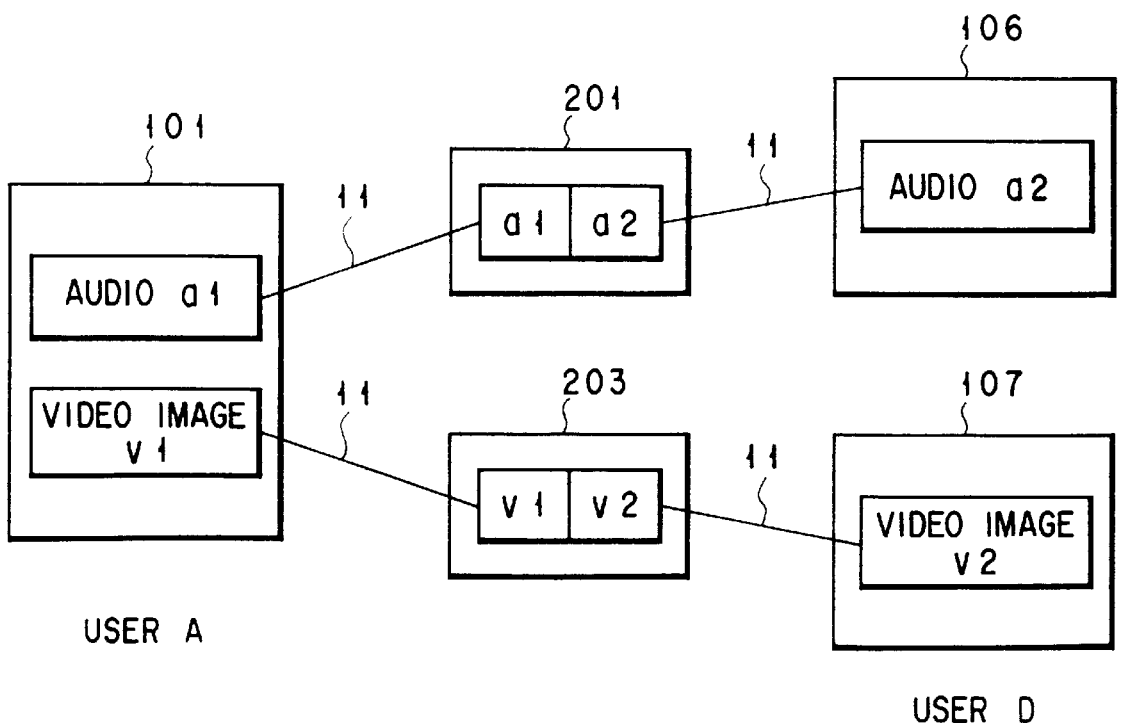
F I G. 10

| MULTI-POINT MEDIA PROCESSING SECTION id | MEDIA PROCESSING MODE | AVAILABLE MEDIA | ADDRESS |
|---|---|---|---|
| 301 | MEETING | AUDIO CODING SCHEME a1<br>VIDEO CODING SCHEME v1 | addr1 |
| 302 | MEETING | AUDIO · VIDEO CODING SCHEME av1 | addr2 |
| 303 | BROADCAST | AUDIO · VIDEO CODING SCHEME av1 | addr3 |
| ⋮ | ⋮ | ⋮ | ⋮ |

FIG. 12

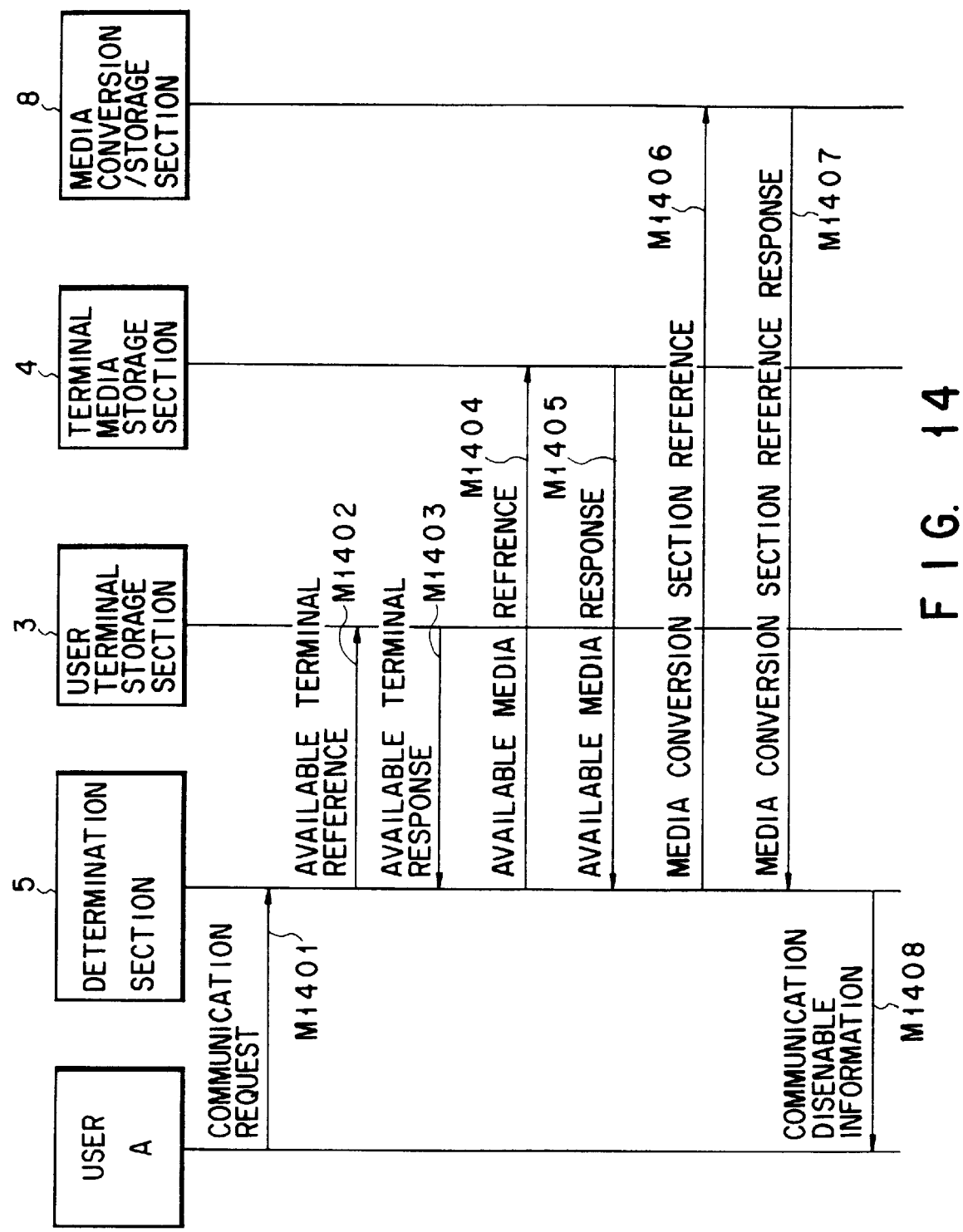
F I G. 14

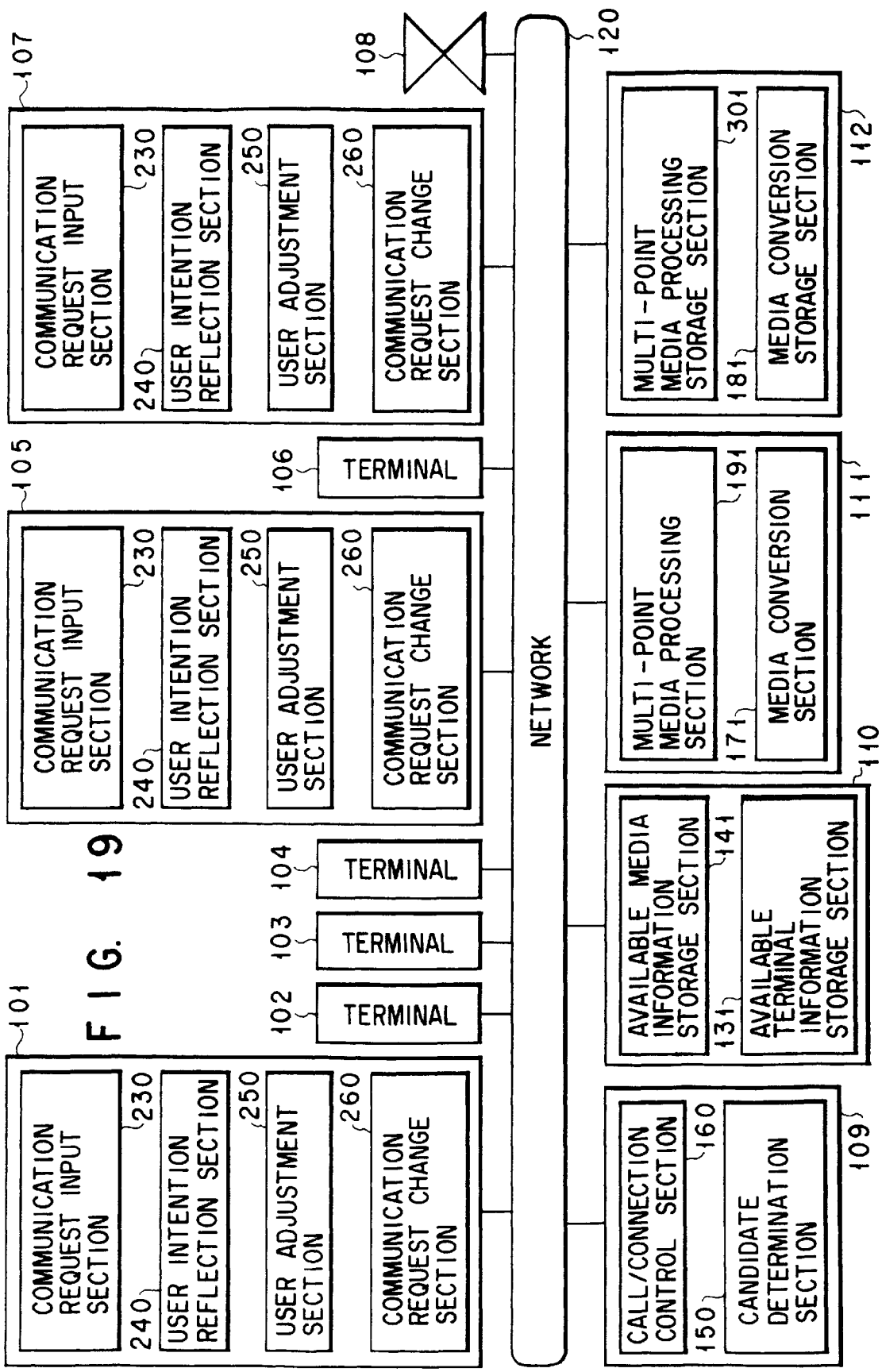

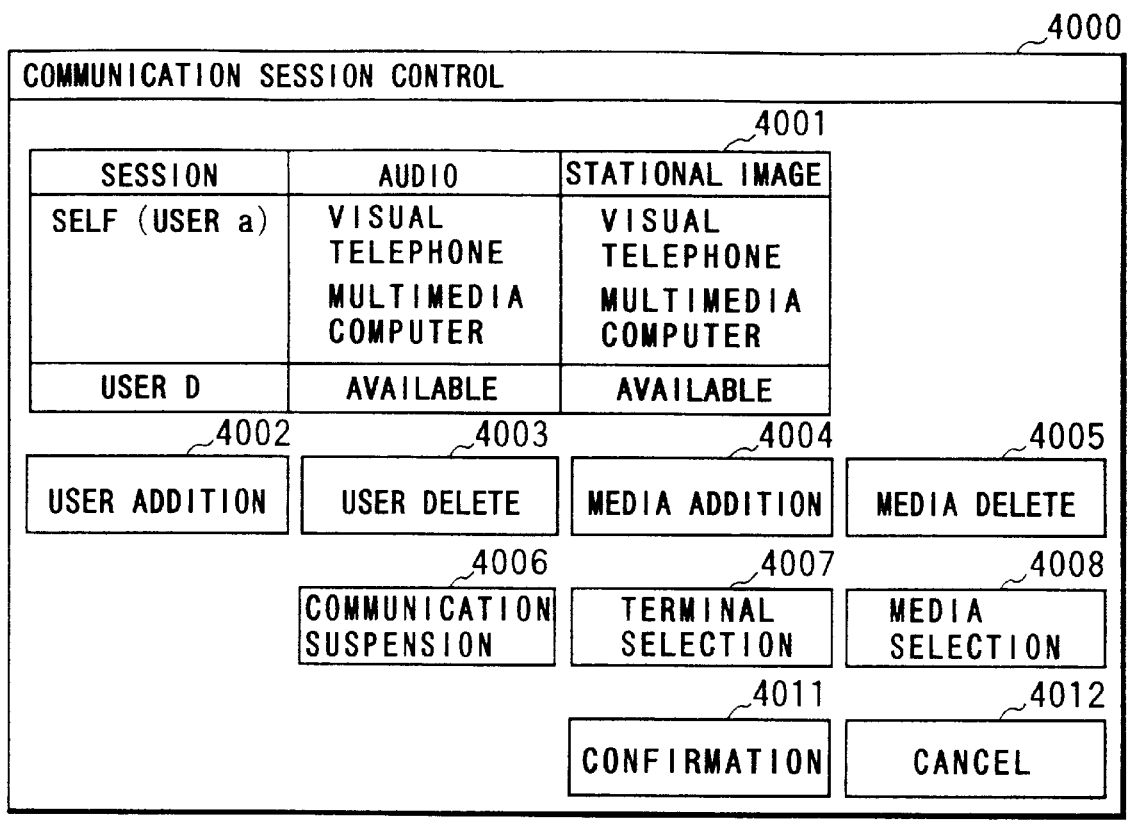
F I G. 31
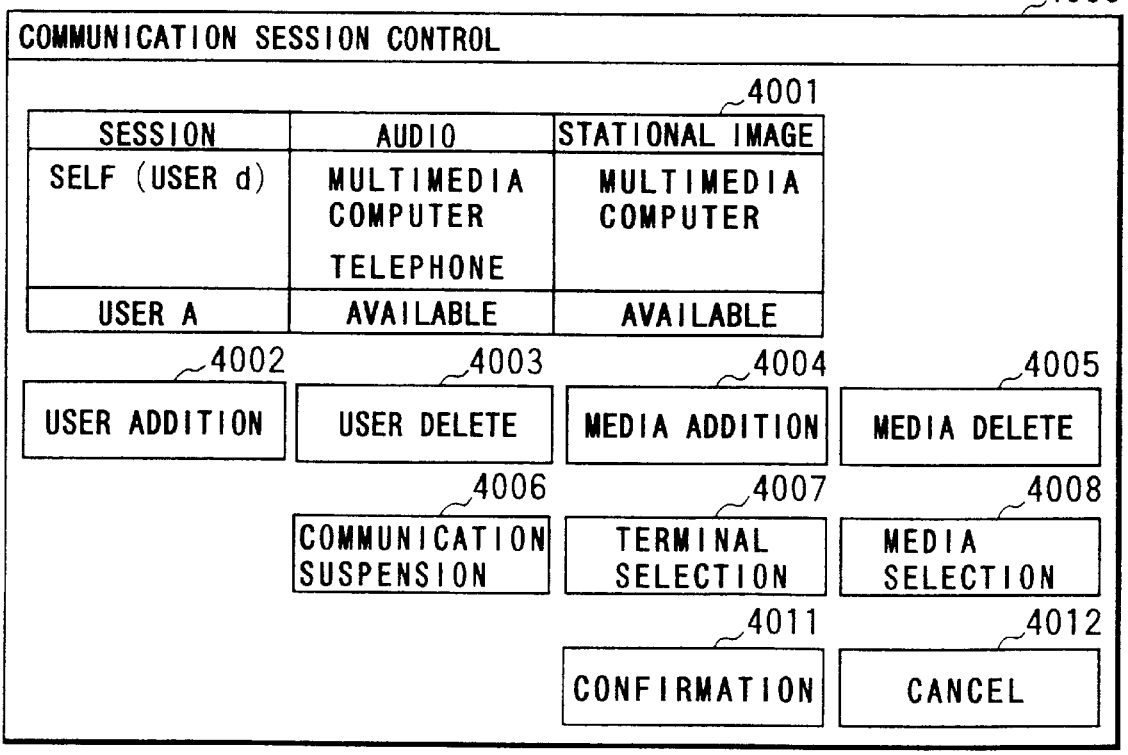
F I G. 32

FIG. 36

| COMMUNICATION SESSION CONTROL | | |
|---|---|---|
| SESSION | AUDIO | VIDEO IMAGE |
| SELF (USER a) | VISUAL TELEPHONE | VISUAL TELEPHONE |
| USER d | AVAILABLE | AVAILABLE |
| USER b | COINCIDENCE | |
| SELF | MISSING | MISSING |
| USER d | PRESENCE | PRESENCE |
| CANDIDATE | MISSING | MISSING |

4000
4001
4005

[USER ADDITION] 4002
[USER DELETE] 4003
[MEDIA ADDITION] 4004
[MEDIA DELETE]
[COMMUNICATION SUSPENSION] 4006
[TERMINAL SELECTION] 4007
[MEDIA SELECTION] 4008
[AGREE] 4009
[REJECT] 4010
[CONFIRMATION] 4011
[CANCEL] 4012

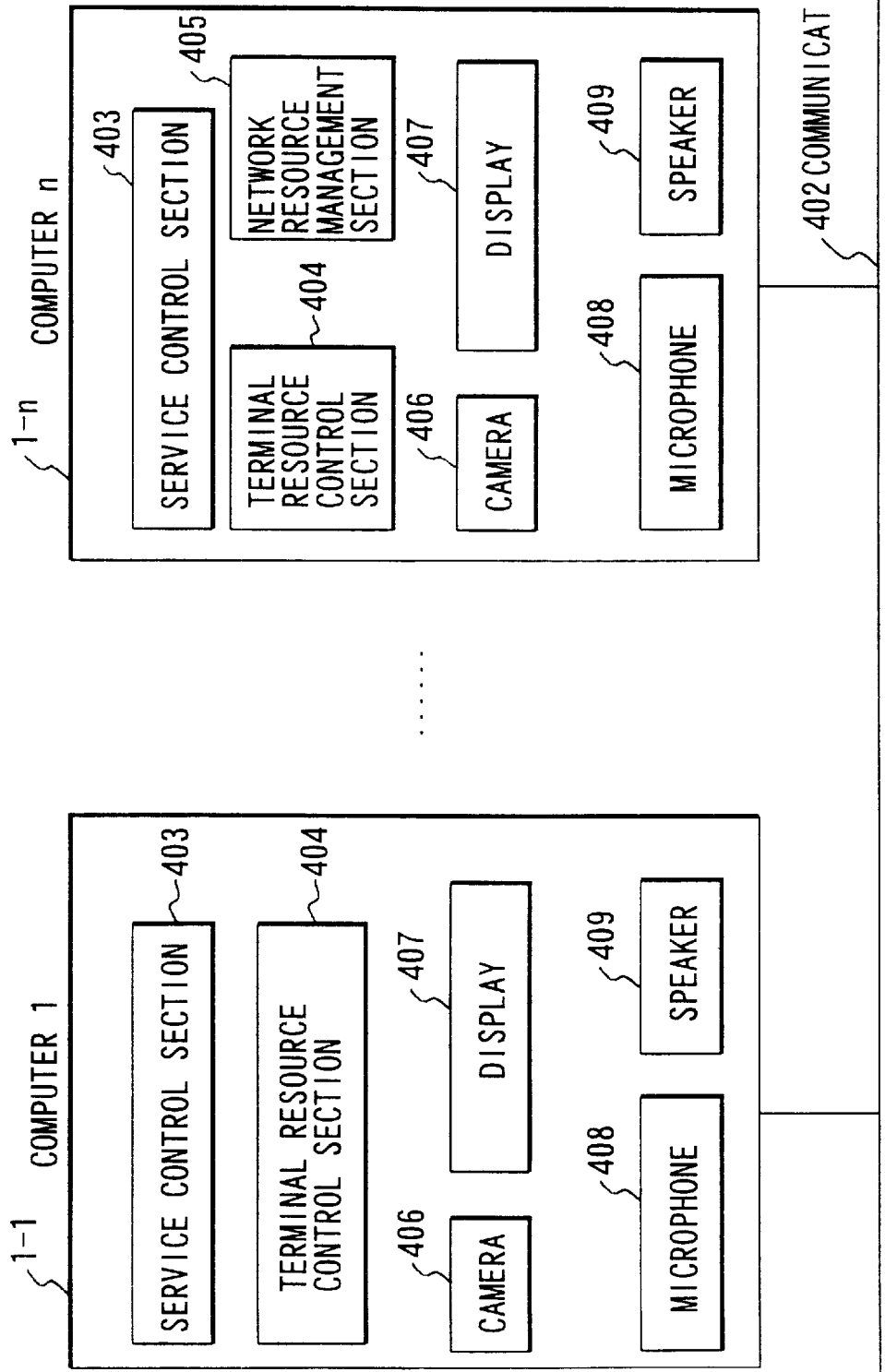
F I G. 38

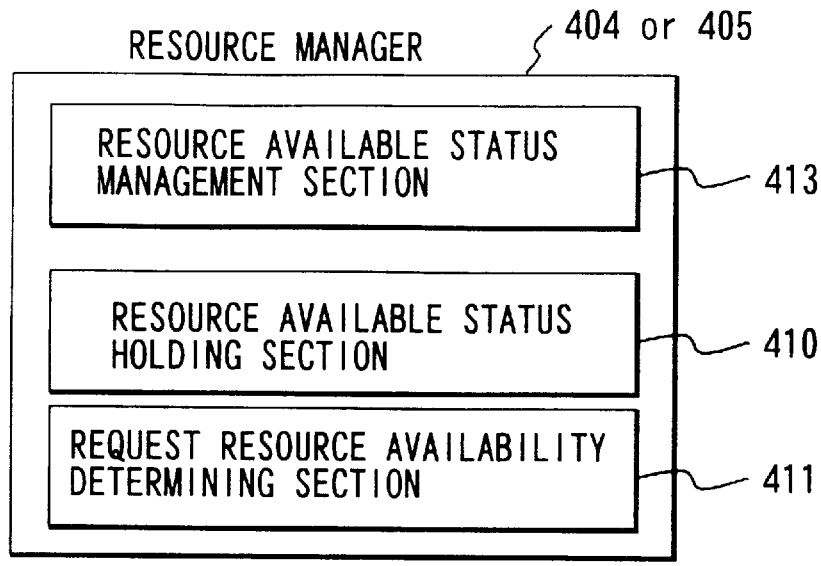
F I G. 39
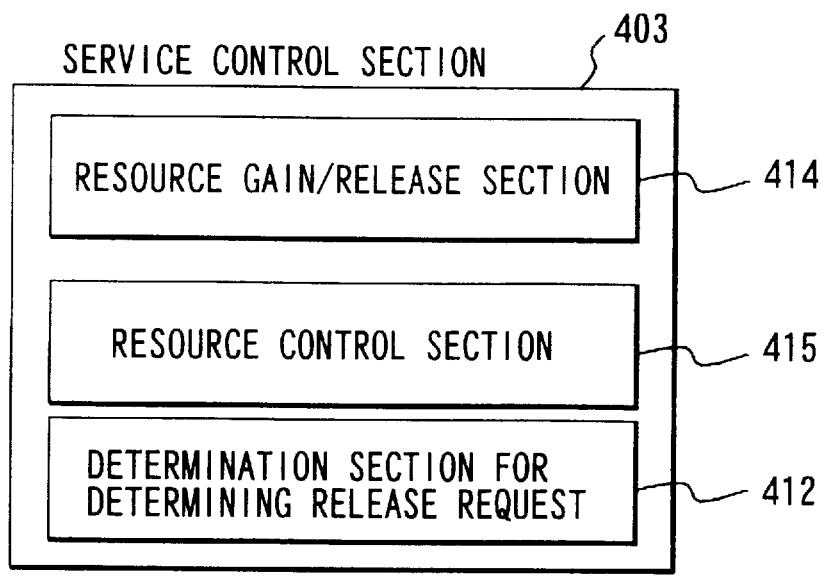
F I G. 42

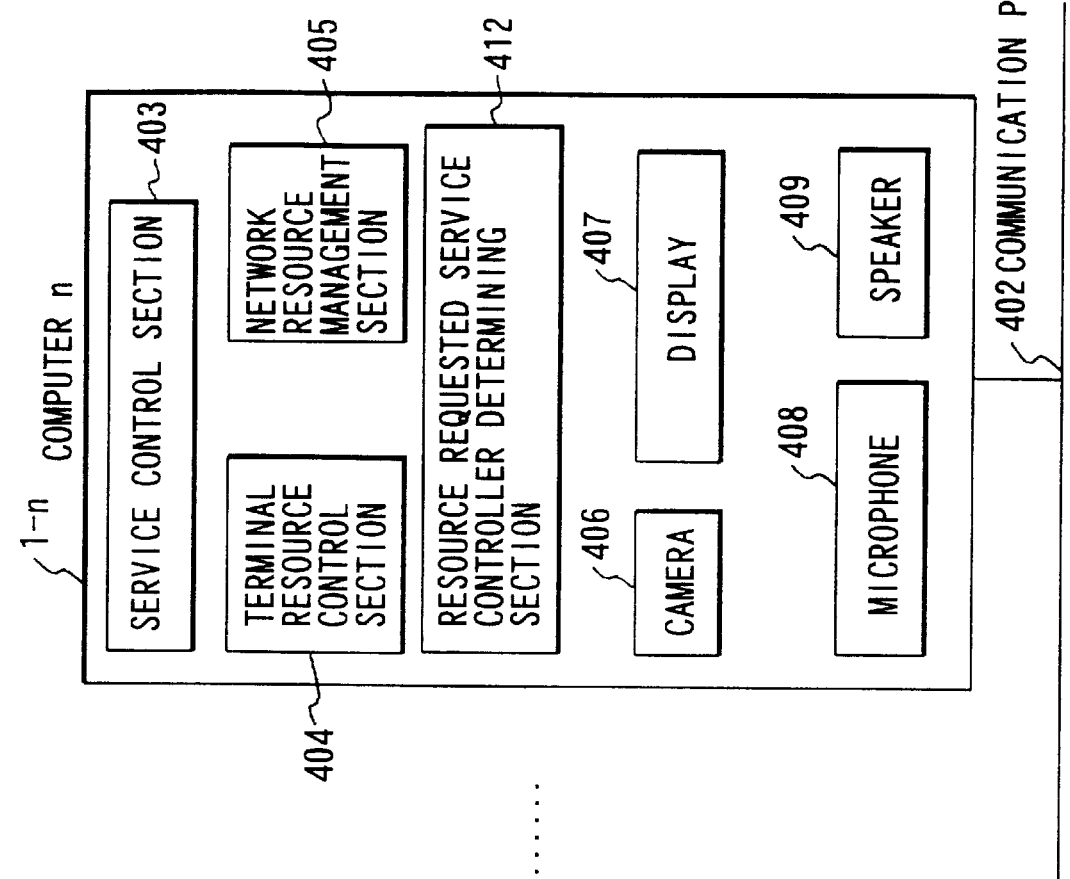
F I G. 41

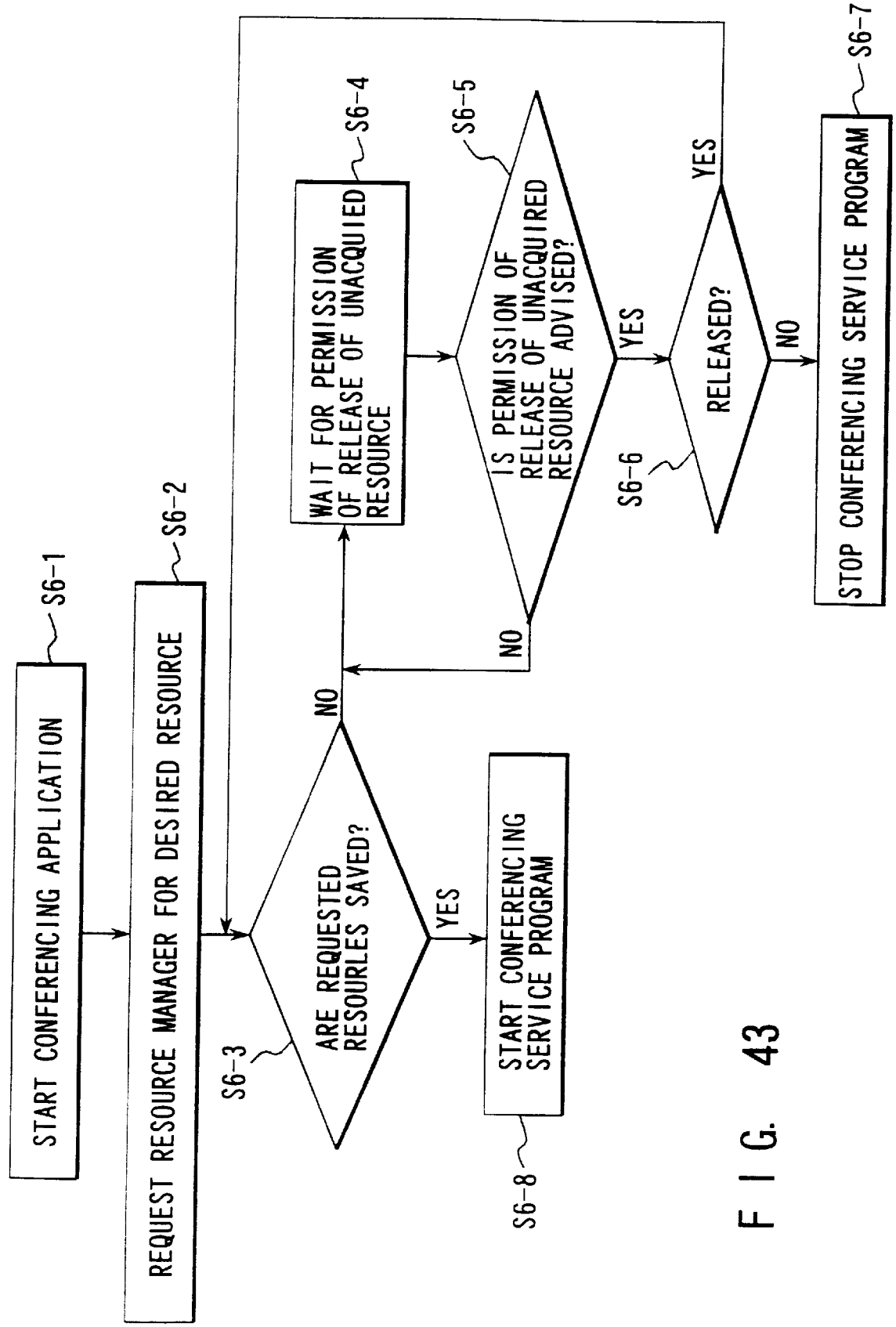
F I G. 43

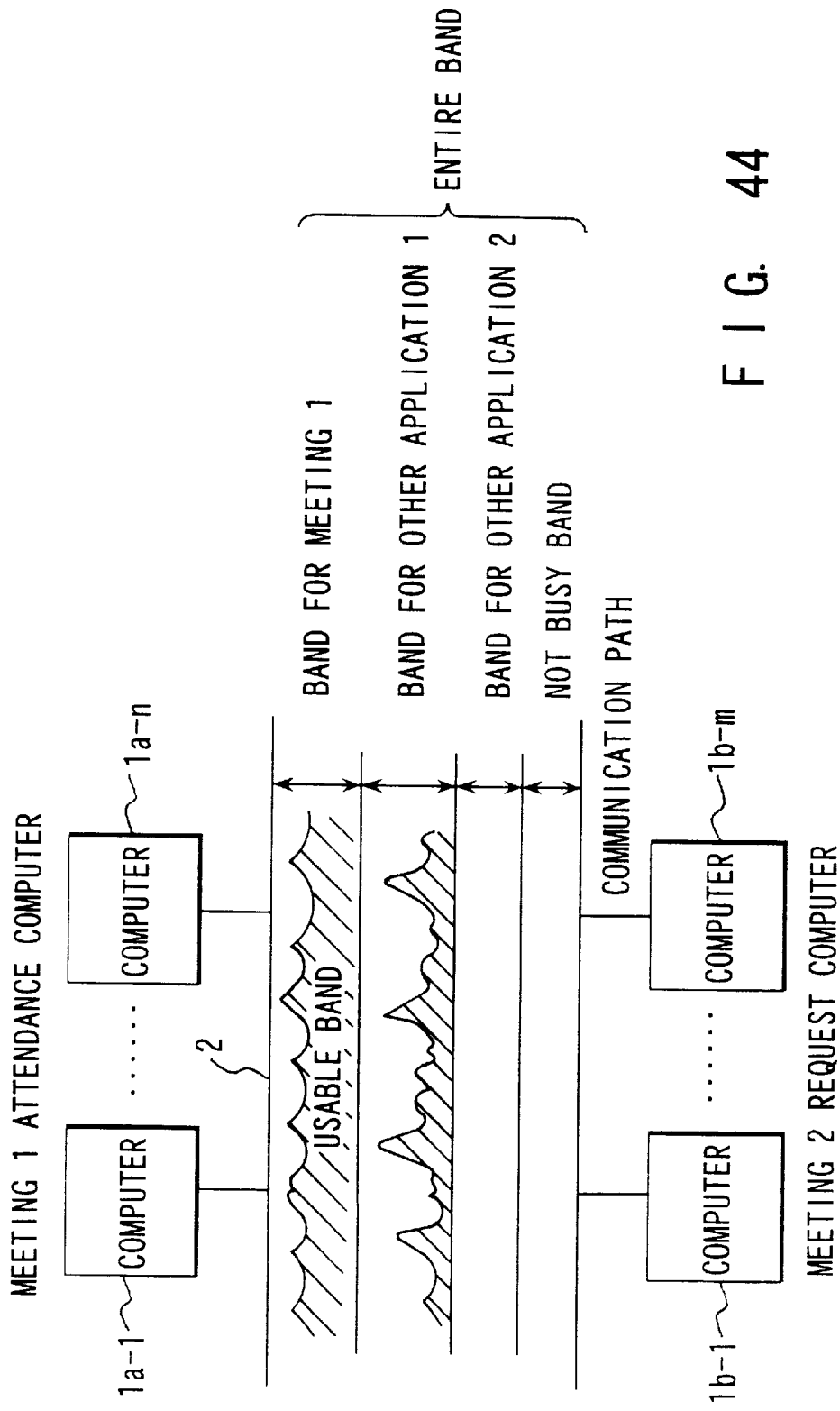
F I G. 44

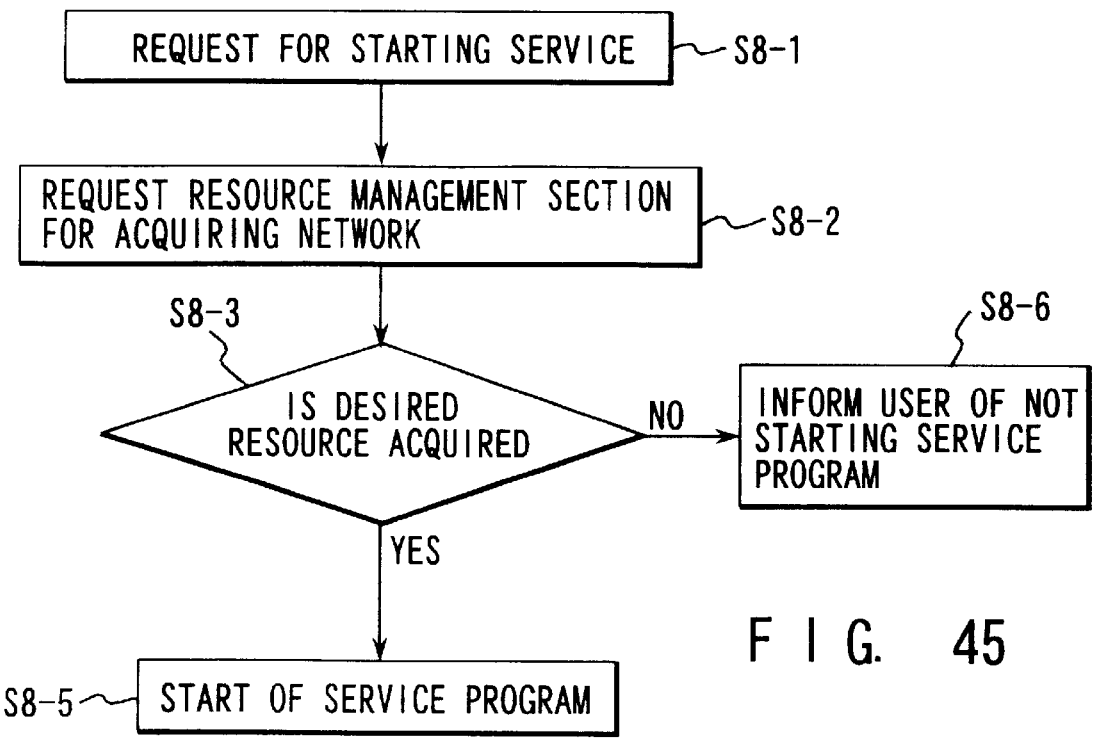
F I G. 45
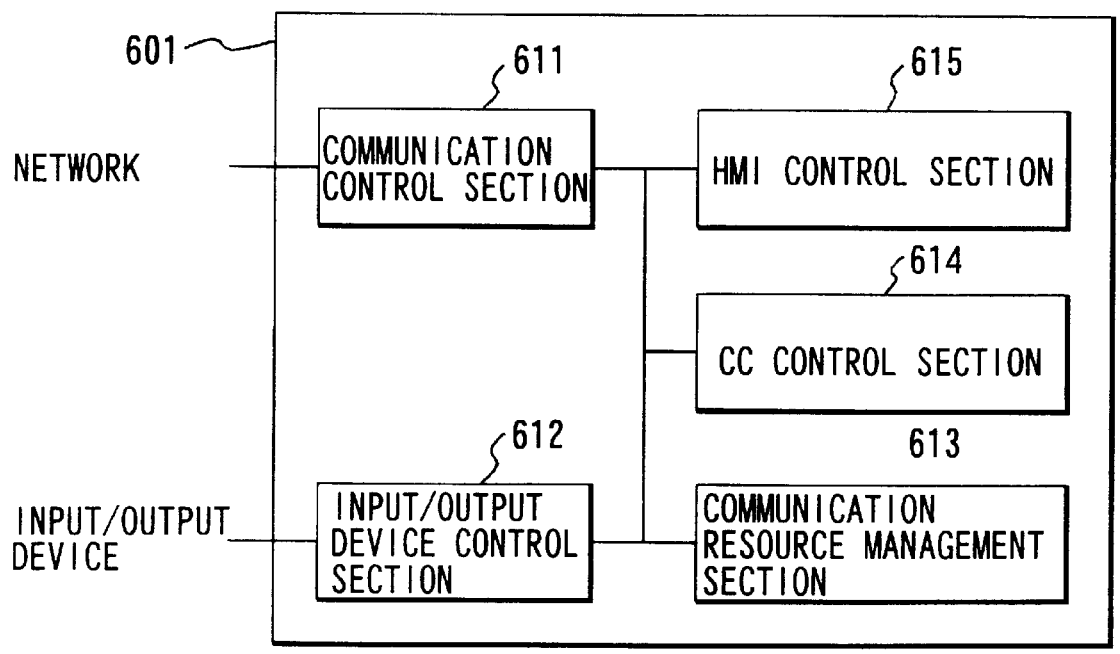
F I G. 47

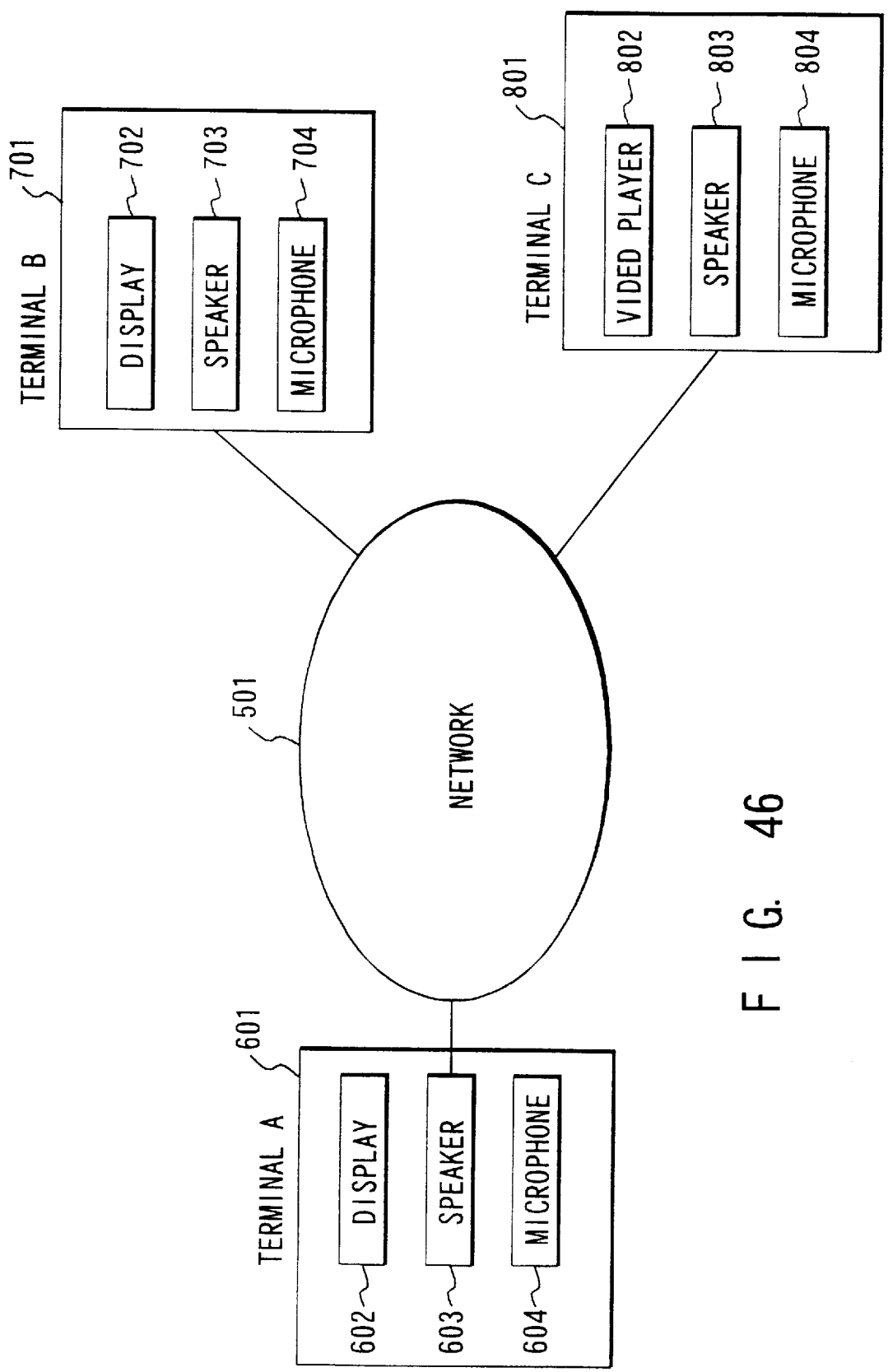
F I G. 46

FIG. 49A

TERMINAL A

COMMUNICATION RESOURCE MANAGEMENT TABLE

| COMMUNICATION RESOURCE | CALL REFERENCE | USED/UNUSED | AVAILABLE COMMUNICATION BAND | RESIDUAL COMMUNICATION BAND | COMMUNICATION RECEIVER |
|---|---|---|---|---|---|
| DISPLAY | | UNUSED | | | |
| SPEAKER | | UNUSED | | | |
| MICROPHONE | | UNUSED | | | |
| COMMUNICATION BAND (RECEIVE) | | | | 3Mbps | |
| COMMUNICATION BAND (TRANSMIT) | | | | 3Mbps | |

FIG. 49B

TERMINAL B

| COMMUNICATION RESOURCE | CALL REFERENCE | USED/UNUSED | AVAILABLE COMMUNICATION BAND | RESIDUAL COMMUNICATION BAND | COMMUNICATION RECEIVER |
|---|---|---|---|---|---|
| DISPLAY | | UNUSED | | | |
| SPEAKER | | UNUSED | | | |
| MICROPHONE | | UNUSED | | | |
| COMMUNICATION BAND (RECEIVE) | | | | 3Mbps | |
| COMMUNICATION BAND (TRANSMIT) | | | | 3Mbps | |

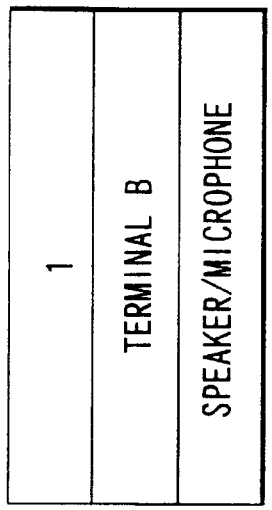

FIG. 51

CCB OF TERMINAL A

| 1 |
| TERMINAL B |
| SPEAKER/MICROPHONE |

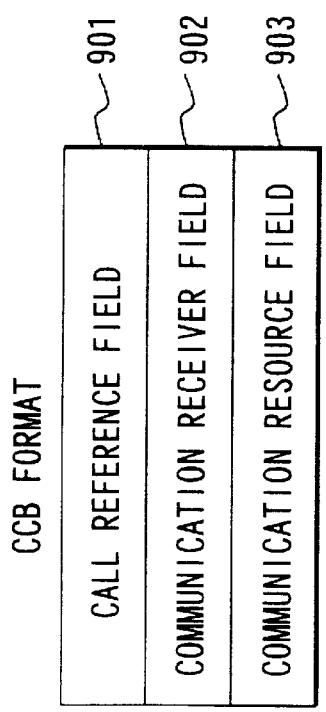

FIG. 50

CCB FORMAT

| CALL REFERENCE FIELD | 901 |
| COMMUNICATION RECEIVER FIELD | 902 |
| COMMUNICATION RESOURCE FIELD | 903 |

FIG. 52

TERMINAL A

| COMMUNICATION RESOURCE | CALL REFERENCE | USED/UNUSED | AVAILABLE COMMUNICATION BAND | RESIDUAL COMMUNICATION BAND | COMMUNICATION RECEIVER |
|---|---|---|---|---|---|
| DISPLAY | | UNUSED | | | |
| SPEAKER | 1 | USED | 1Mpbs | | TERMINAL B |
| MICROPHONE | 1 | USED | 1Mpbs | | TERMINAL B |
| COMMUNICATION BAND (RECEIVE) | | | | 2Mpbs | |
| COMMUNICATION BAND (TRANSMIT) | | | | 2Mpbs | |

F I G. 56

COMMUNICATION RESOURCE MANAGEMENT TABLE OF TERMINAL A

| TERMINAL A | COMMUNICATION RESOURCE | CALL REFERENCE | USED/UNUSED | AVAILABLE COMMUNICATION BAND | RESIDUAL COMMUNICATION BAND | COMMUNICATION RECEIVER |
|---|---|---|---|---|---|---|
| | DISPLAY | | UNUSED | | | |
| | SPEAKER | 1 | USED | 1Mpbs | | TERMINAL B |
| | MICROPHONE | 1 | USED | 1Mpbs | | TERMINAL B |
| | COMMUNICATION BAND (RECEIVE) | | | | 2Mbps | |
| | COMMUNICATION BAND (TRANSMIT) | | | | 2Mbps | |

F I G. 59

COMMUNICATION RESOURCE DISPLAY

USING STATE COMMUNICATION RESOURCE

| COMMUNICATION RESOURCE | CALL REFERENCE | USED/UNUSED | AVAILABLE COMMUNICATION BAND | RESIDUAL COMMUNICATION BAND | COMMUNICATION RECEIVER |
|---|---|---|---|---|---|
| DISPLAY | | UNUSED | | | |
| SPEAKER | 1 | USED | 1Mpbs | | TERMINAL B |
| MICROPHONE | 1 | USED | 1Mpbs | | TERMINAL B |
| COMMUNICATION BAND (RECEIVE) | | | | 2Mbps | |
| COMMUNICATION BAND (TRANSMIT) | | | | 2Mbps | |

REQUESTED COMMUNICATION RESOURCE

| COMMUNICATION RESOURCE | USE REQUEST | AVAILABLE COMMUNICATION BAND | COMMUNICATION RECEIVER |
|---|---|---|---|
| DISPLAY | NO | | |
| SPEAKER | YES | 1Mpbs | TERMINAL C |
| MICROPHONE | YES | 1Mpbs | TERMINAL C |

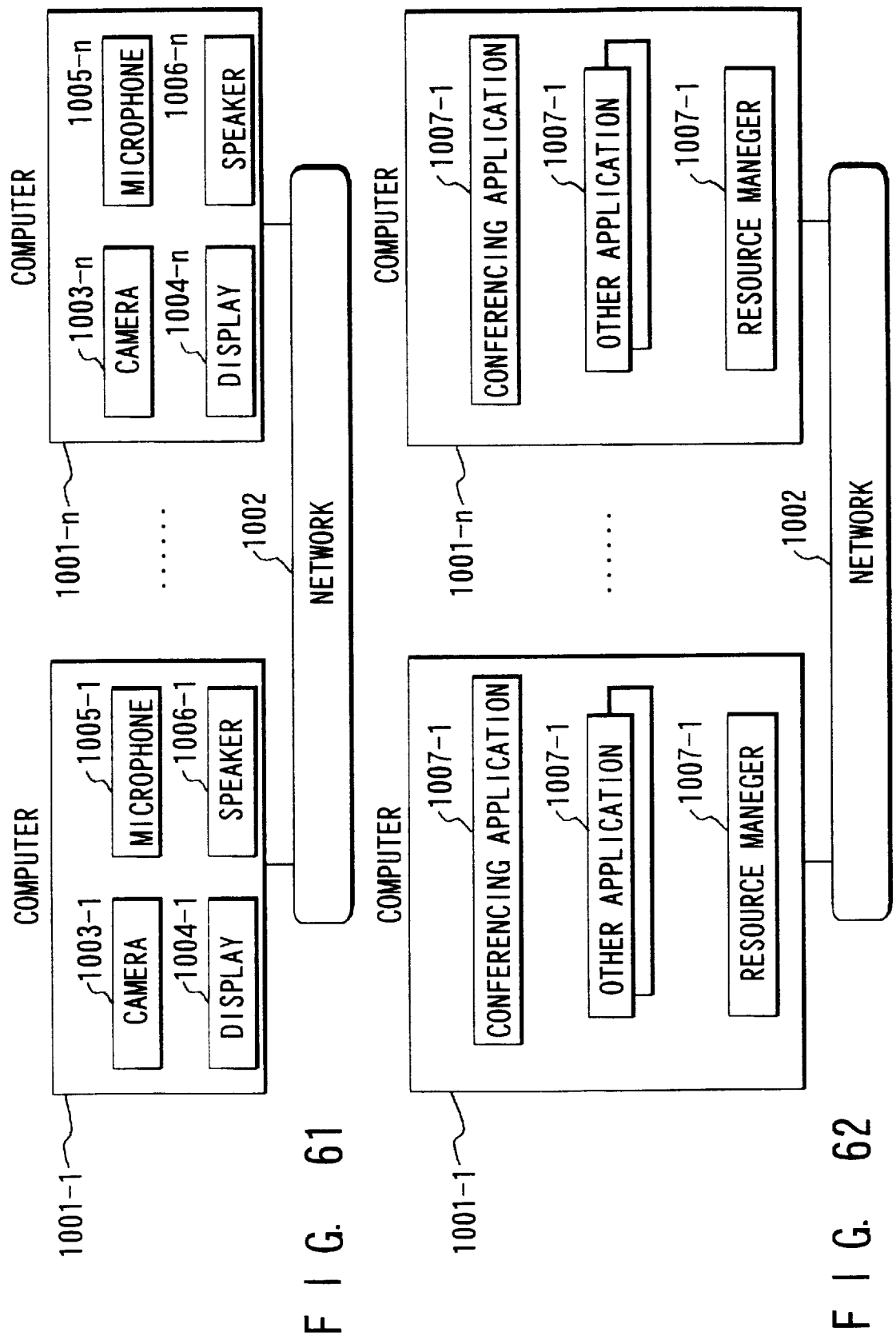

| REQUEST id | RESOURCE id | WITING |
|---|---|---|
| id_A | audio out | ON |
| id_B | vudio out | OFF |
| id_A | audio in | ON |
| .. | .. | .. |

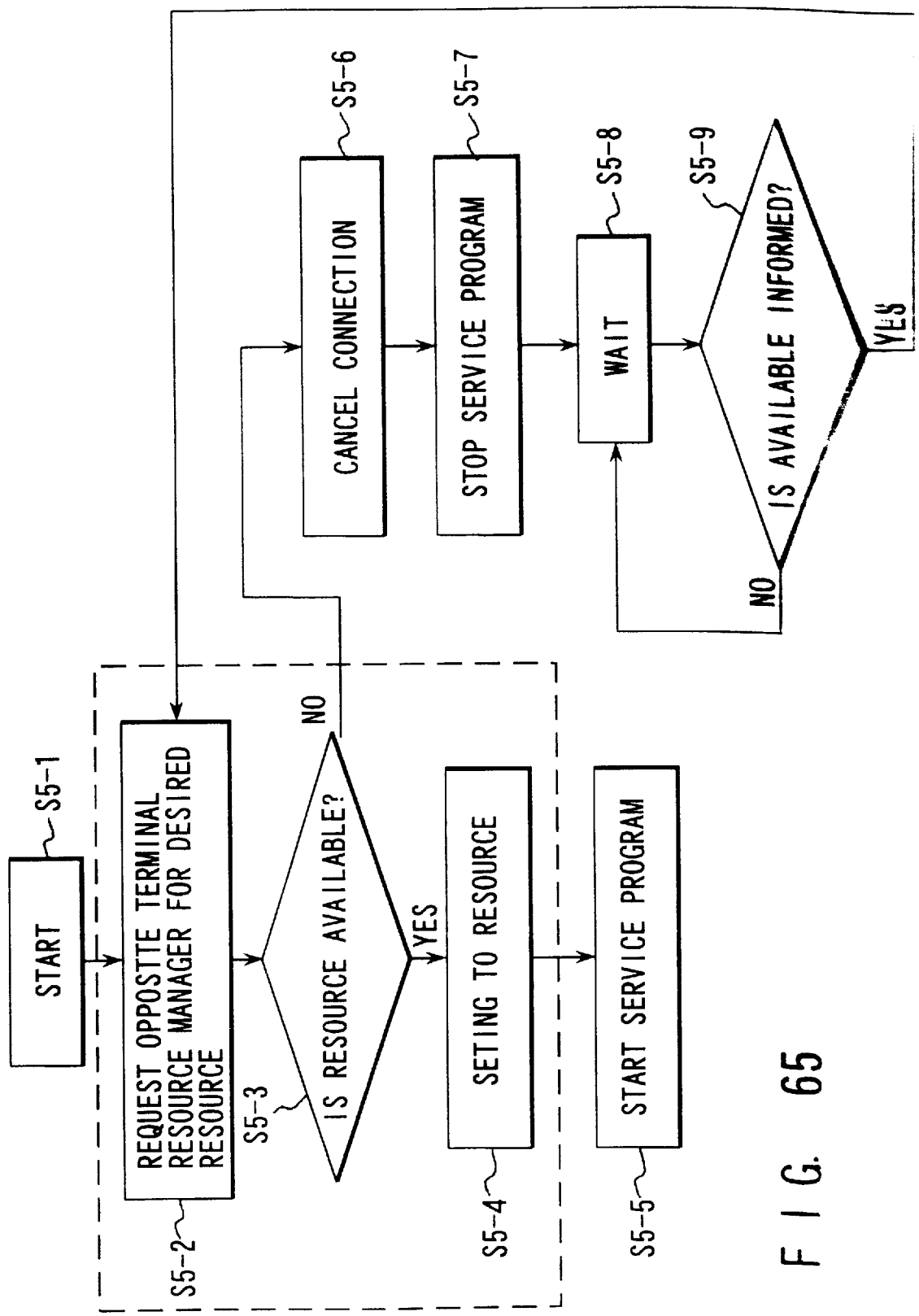
F I G. 65

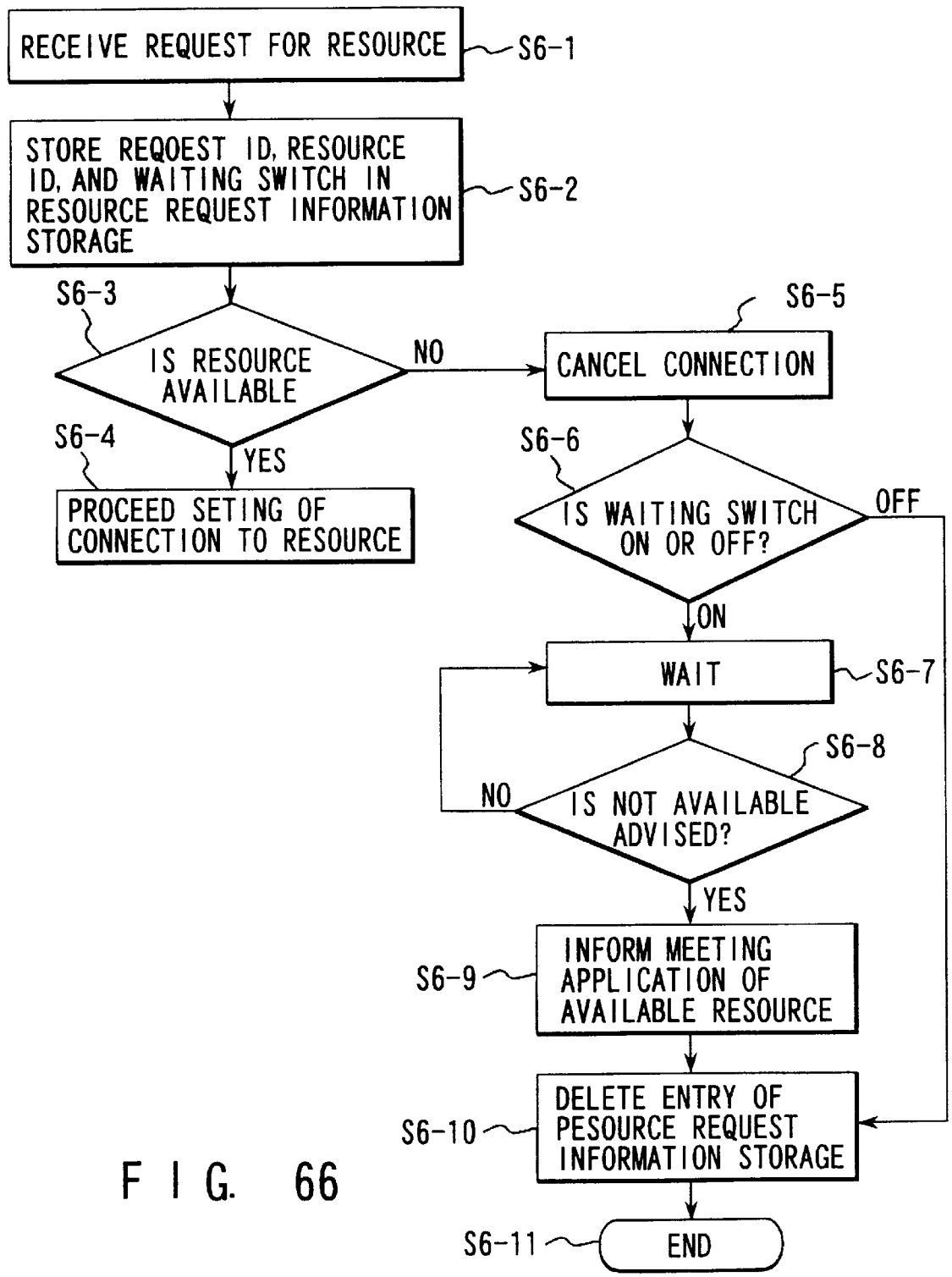
F I G. 66

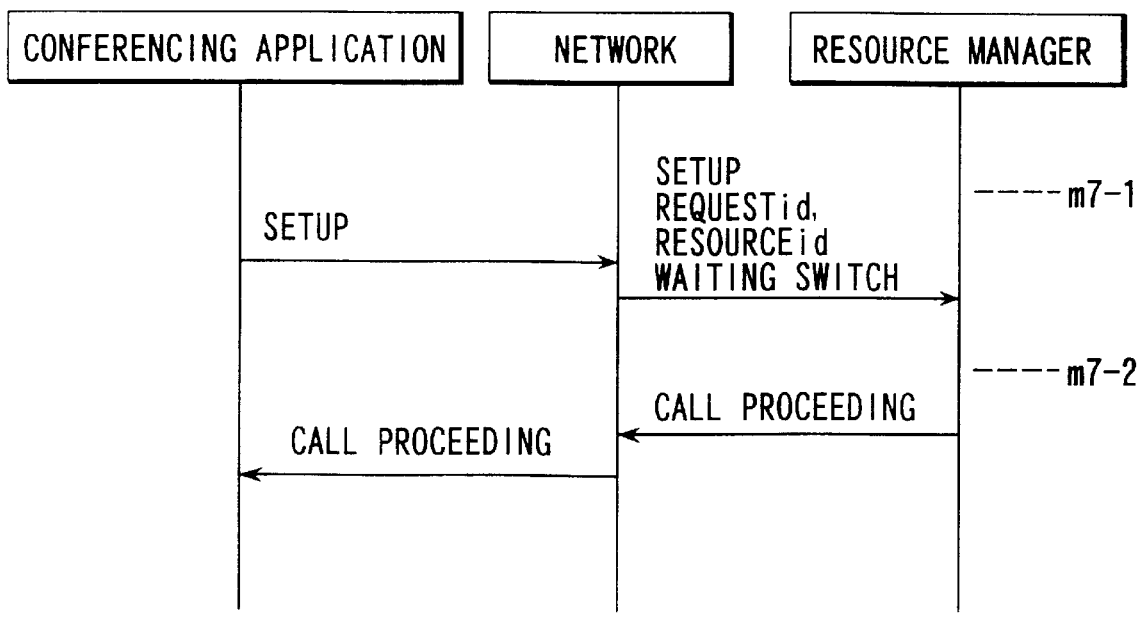
F I G. 67

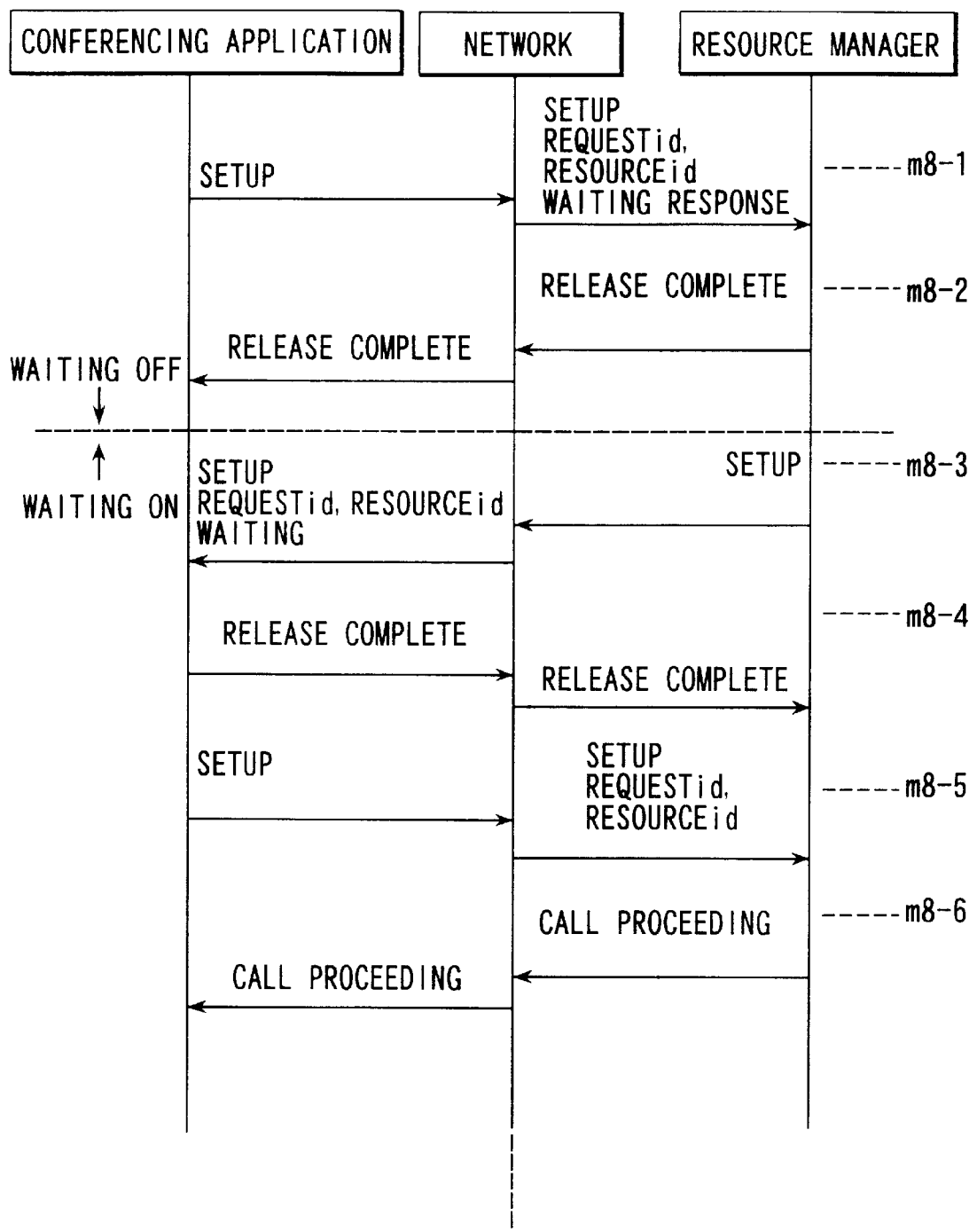
F I G. 68

| FIRST RESERVATION IDENTIFIER | RESERVATION RESOURCE NAME |
|---|---|
| X | abc |
| X | def |

FIG. 70

| FIRST RESERVATION IDENTIFIER | MENBER |
|---|---|
| X | 1234567890 |
| X | 0987654321 |
| X | 3456789012 |

FIG. 71

| RESERVATION IDENTIFIER | RESERVATION RESOURCE |
|---|---|
| 0123 | a |
| 0123 | b |

F I G. 72

| SELF-TERMINAL RESEVATION IDENTIFIER | FIRST RESERVATION IDENTIFIER |
|---|---|
| 0123 | X |
| 7890 | Y |

F I G. 73

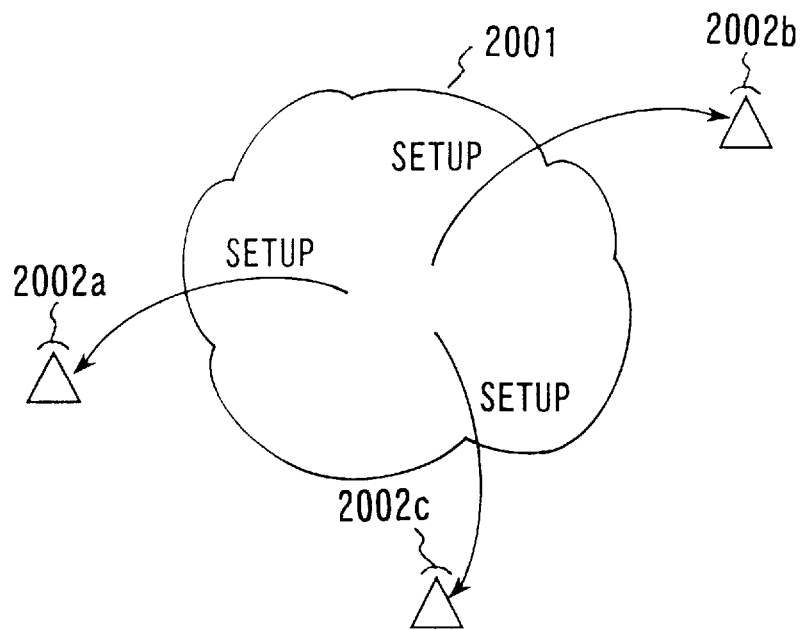
F I G. 74
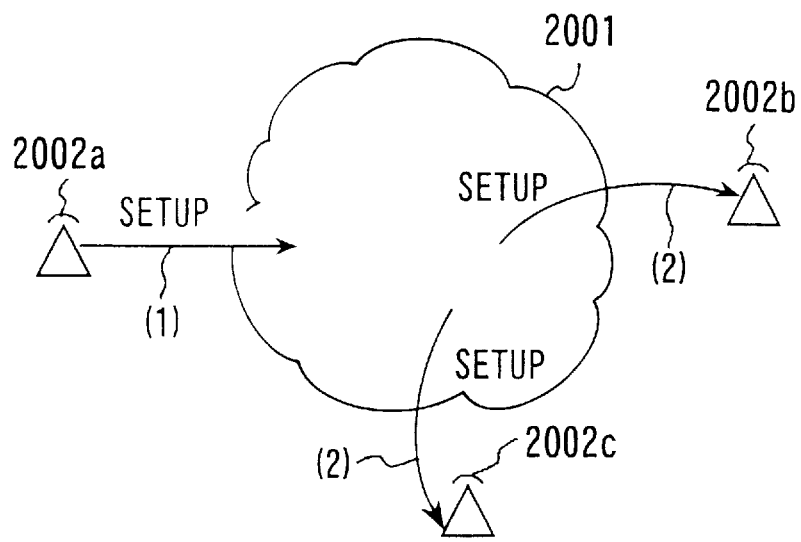
F I G. 75

COMMUNICATION SYSTEM AND COMMUNICATION CONTROL METHOD FOR THE SAME

BACKGROUND OF THE INVENTION

1. Field of the Invention

The present invention relates to a communication system for providing multimedia services and a communication control method of controlling the same.

2. Description of the Related Art

The developments of electronic equipment, computer technology and communication technology in recent years enable us to transfer various media, including not only sounds but also images (video and still images) and data, among terminals. Multimedia services can now be provided for allowing us to freely transfer these.

It is needless to say that in order to use various media when attempting to utilize such services, called users must be fully equipped to accept such media. Terminals used by called users may not function to respond to communication requests including a plurality of media. The called users may be equipped with terminal devices capable of dealing with all kinds of media, telephone terminal for processing simply sounds, visual telephone terminals and the like for processing video and still images and sounds or facsimile and telephone sets for processing image information and sounds. Indeed, functions vary in accordance with the kinds of terminal units built up on the called user.

Individual terminals may not be able to process all of the plurality of media contained in the communication request. However, by combining the functions of various terminals, it is possible to deal with the plurality of media contained in such requests.

Conventionally, in such situations, in order to accept the plurality of media contained in the communication requests, it was necessary for users (calling users) sending such communication request to recognize what kinds of media the terminals used by the called users could process and then start a connection request for each terminal. For this reason, it has been difficult to perform predetermined communications due to complexity of preparatory states for practical purposes.

Therefore, in order to utilize various media when attempting to use multimedia services, the terminal units built in the called user must be fully corresponded to the various media.

For conferencing communication by using an audio terminal and a data terminal, there is available a technique disclosed in Japanese Unexamined Patent Publication No. 63-1140, which provides a method of making connections to these terminals when a request for starting conference is made. According to this method, upon receiving a particular number indicating a request for starting conference conducted by combining sounds and data, connections are made to the prefixed audio and data terminals.

Consequently, this method lacks general applicability and thus may not provide a high level of freedom for combined connections.

SUMMARY OF THE INVENTION

It is an object of the invention to provide a communication system and a communication control method for the same, wherein according to media specified when a user issues a communication request containing a combination of various media, necessary combinations of a plurality of terminals having different processing capabilities at called user sides can be automatically determined for each request and connections can be automatically made to such combinations of the terminals.

It is another object of the invention to provide a communication system and a communication control method for the same, wherein when a communication using a combination of a plurality of media is requested without designating a terminal and the media contained in the communication request is realized by a terminal or a combination of a plurality of terminals, the communication unexpected by users can be prevented and communications reflecting the wish of a user or the wishes of a plurality of users can be brought about.

According to an aspect of the invention, there is provided a communication system comprising: a plurality of terminals capable of processing a medium or media; a terminal information storage section for storing a terminal or terminals available for each user; a media information storage section for storing the medium or media available for each terminal; a determination section for determining, on the basis of contents of the terminal information storage section and the media information storage section, at least one of a combination of one or more media and a combination one or more terminals which are available for each of users participating in communication in accordance with a communication request; and a call/connection control section for setting a call/connection for some of the terminals which correspond to the at least one combination determined by the determination section.

According to another aspect of the invention, there is provided a communication control method for a communication system comprising the steps of: preparing a media conversion section for performing a media conversion among plural media information objects and a storage section for respectively storing a terminal available for each user and media available for each terminal; obtaining one or more terminals available for respective users participating in communication on the basis of a content of the storage section in accordance with a communication request containing information for identifying the users participating in the communication and information for identifying types of the media; obtaining one or more media realization schemes available for the respective users participating in the communication on the basis of information of the storage section for portions or all of the obtained terminals; determining one or more media realization schemes and a combination of terminals used by the respective users participating in the communication and a media conversion section for performing a media conversion; and setting a call/connection based on a determination result.

According to another aspect of the invention, there is provided a communication control method for a communication system comprising the steps of: inputting a communication request containing information regarding at least one or more called users and one or more media that the user wishes to communicate with; adjusting and determining at least one of a media combination of one or more media and a terminal combination of one or more terminals among users participating in the communication according to the communication request; and setting call/connections for at least one of the media combination and the terminal combination when at least one of the media combination and the determined terminal combination is available.

According to another aspect of the invention, there is provided a communication system comprising: a communication request input section for accepting the input of the communication request containing information regarding one or more called users and one or more media the user wishes to communicate with; a candidate determination section for determining one or more sets each including at least one of a media combination of one or more media and a combination of one or more terminals which are available for each of users participating in a communication in order to satisfy a part of a communication request; a user intention reflex section for reporting to the user or a different user participating in the communication at least one of a candidate of the combination of one or more media and a candidate of the combination of terminals, selecting one of the candidates and determining permission of the communications based on the selected candidate or a change of the communication request in accordance with an input of the user who has received the report; and a setting section for setting call/connections on the basis of a determination result of the user intention reflex section.

According to another aspect of the invention, there is provided a communication system comprising as one of a plurality of terminals interconnected by a network a terminal unit capable of processing one or more media, wherein the terminal unit includes: a communication request input section for inputting by a user information regarding one or more called users and one or more media the user wishes to communicate with; a user intention reflex section for reporting to the user or a different user participating in a communication at least one of a combination of one or more media and a combination of terminals which are available for satisfying at least portions of the communication request at the time of issuance thereof, selecting one of the combinations, and determining permission of the communications based on the selected combination or a change of the communication request in accordance with an input of the user who has received the report; and a setting section for setting call/connections based on a determination result of the user intention reflex section.

According to another aspect of the invention, there is a communication system comprising: a plurality of service control sections for connecting a plurality of terminals having various resources to a communication network and providing services by using resources of this communication network or various resources of the terminals connected to the communication network; a reservation section for reserving resources which one of the service control sections needs to provide desired services when the resources are not available because another service control section has acquired the same; a management section for managing use of the resources; and a report section for reporting, when the reserved resources are released, the release thereof to the service control section for providing the desired services based on information of the management section.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 2 is a view illustrating a structure of an available terminal information storage section of the first embodiment;

FIG. 3 is a view illustrating a structure of an available media information storage section of the first embodiment;

FIG. 5 is a view illustrating a connection mode as a first operation example of the communication system of the first embodiment;

FIG. 7 is a view illustrating a connection mode as a second operation example of the communication system of the first embodiment;

FIG. 9 is a view illustrating a structural example of a media conversion storage section of the communication system of the first embodiment;

FIG. 10 is a view illustrating a connection mode as a third operation example of the communication system of the first embodiment;

FIG. 12 is a view illustrating a structural example of an available multi-point media processing information storage section of the communication system of the first embodiment;

FIG. 14 is a view illustrating a message sequence as a fifth operation example of the communication system of the first embodiment;

FIG. 19 is a block diagram illustrating a structural example of a multimedia communication system applied in the second embodiment;

FIG. 31 is a view illustrating a display example of the communication session processing section for the user (a) in the third operation example of the communication system;

FIG. 32 is a display example of the communication session processing section for the user (d) in the third operate example of the communication system;

FIG. 36 is a display example of the communication session processing section for the user (a) in the fourth operation example of the communication system;

FIG. 38 is a block diagram of a communication system of the third embodiment of the invention;

FIG. 39 is a view illustrating a structure of a resource management section of the embodiment of FIG. 38;

FIG. 41 is a block diagram of a communication system of the fourth embodiment;

FIG. 42 is a view illustrating a structure of a service control section of the fourth embodiment;

FIG. 43 is a view illustrating processing of the service control section of the fourth embodiment;

FIG. 44 is a block diagram of a communication system of a fifth embodiment;

FIG. 45 is a view illustrating processing for resource acquisition in a conventional communication system;

FIG. 46 is a view illustrating a system structure of the communication system of the fifth embodiment;

FIG. 47 is a view illustrating a structural example of a terminal (A) of the communication system of the invention;

FIGS. 49A and 49B are views illustrating examples of a communication resource management table used in the communication system of the invention;

FIG. 50 is a view illustrating a CCB format used in the communication system of the sixth embodiment;

FIG. 51 is a view illustrating a CCB example of the terminal (A) used in the communication system of the sixth embodiment;

FIG. 52 is a view illustrating an example of a communication resource management table after a change;

FIG. 56 is a view illustrating an example of a communication resource management table of the terminal (A) used in the seventh embodiment;

FIG. 59 is a view illustrating an example of a communication resource display used in the communication system of the eighth embodiment;

FIG. 61 is a view illustrating an example of a hardware structure of a communication system of a ninth embodiment of the invention;

FIG. 62 is a view illustrating a software structure of the communication system of the ninth embodiment;

FIG. 65 is a flow chart illustrating resource acquisition processing of conferencing application in the communication system of the ninth embodiment;

FIG. 66 is a flow chart illustrating processing of the resource manager in the communication system of the ninth embodiment;

FIG. 67 is a view illustrating a transmission sequence of signaling messages in the communication system of the ninth embodiment (resources are available);

FIG. 68 is a view illustrating a transmission sequence of signaling messages in the ninth embodiment (resources are not available);

FIG. 70 is a diagram showing an example of a data stream stored in the first storage section;

FIG. 71 is a diagram of another example of a data stream stored in the first storage section;

FIG. 72 is a diagram showing an example of a data stream stored in the second storage section;

FIG. 73 is a diagram of another example of a data stream stored in the second storage section;

FIG. 74 is a diagram illustrating a communication setting operation from a network to all associated terminals; and FIG. 75 is a diagram illustrating after the communication setting from a terminal to a network a communication setting operation from the network to the remaining terminals.

DETAILED DESCRIPTION OF THE PREFERRED EMBODIMENTS

Figure 1:
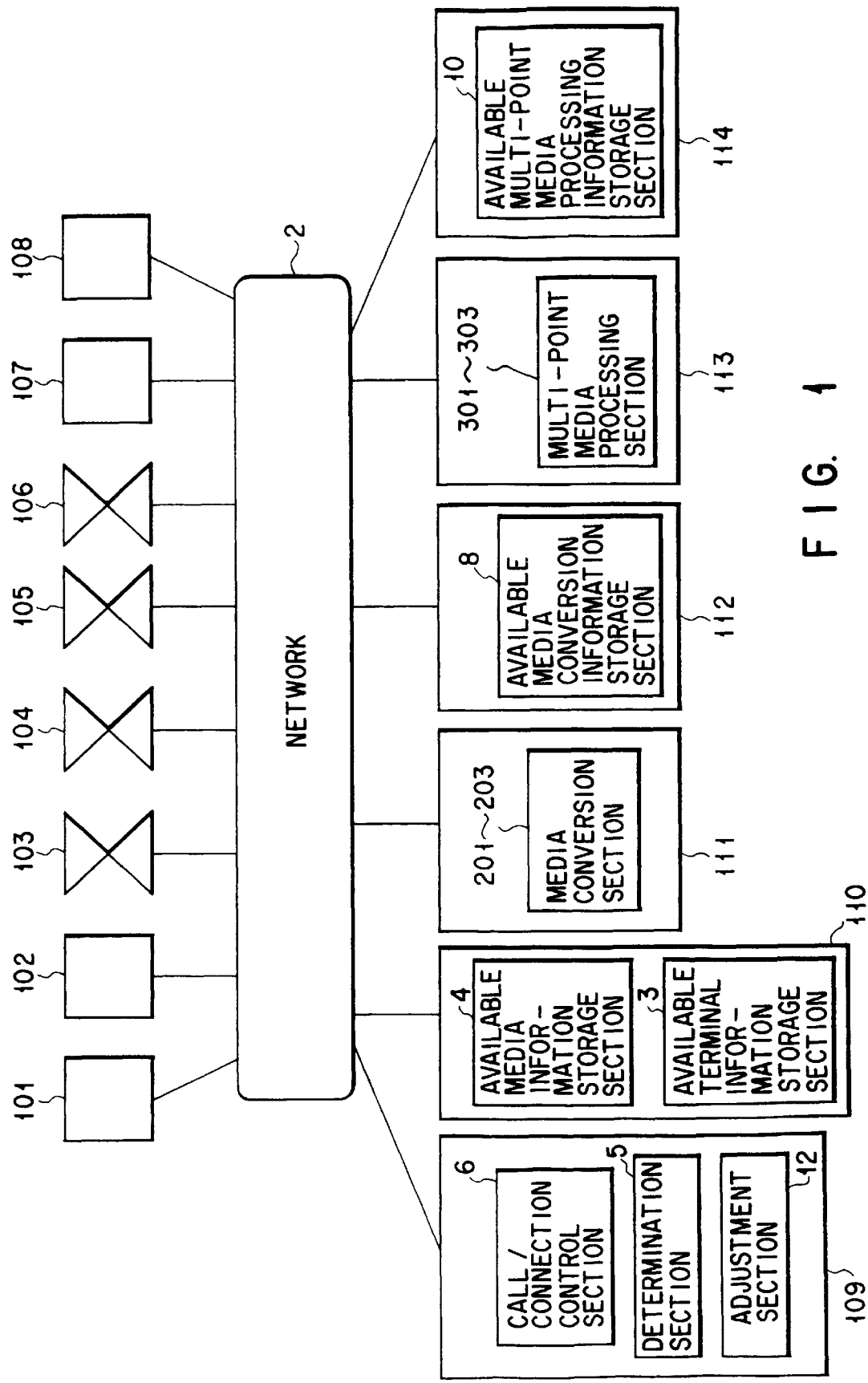
FIG. 1 is a block diagram illustrating a structure of a multimedia communication system applied in a first embodiment of the invention.

FIG. 1 is a view showing the construction of a hardware block of a multimedia communication system in the present invention. In this construction, terminals 101 to 108 are connected to terminals 109 to 114 through a network 2. The terminal 109 has a determination section 5, a call connection control section 6 and an adjustment section 12. The terminal 110 has an available terminal information storage section 3 and an available media information storage section 4. The terminal 111 has media conversion sections 201 to 203. The terminal 112 has an available media conversion information/ storage section 8. The terminal 113 has multi-point media processing sections 301 to 303. The terminal 114 has an available multi-point media processing section. The media conversion sections 201 and 202 among these sections are used to convert audio coding schemes and video coding schemes. The multi-point media processing sections 301 to 303 are used to perform a conferencing communication and a multicast communication by the audio object (speech and/or sound) and the video image.

An available multi-point media processing information storage section 10 stores a media processing classification, a classification of available media or media realizing scheme, and location information within the communication system such as a destination address used at a connecting time every available multi-point media processing section. The available multi-point media processing information storage section 10 also retrievably stores a media processing classification executable by the available multi-point media processing section from an identifier for specifying the available multi-point media processing section, a classification of available media or media realizing scheme, and location information within the communication system.

The available terminal information storage section 3 stores terminal information available for each user, and can retrieve the terminal available for this user from the identifier for specifying the user.

The available media information storage section 4 stores media or a media realizing scheme available for each of the terminals, and can retrieve the media or the media realizing scheme usable in each of the terminals from the identifier for specifying the terminal.

The determination section 5 retrieves a combination of available terminals or media by using the above available terminal information storage section 3 and the available media information storage section 4 with respect to each user participating in communication. The determination section 5 then selects the combination of the terminals or media really used in the communication from retrieved results. Namely, the determination section 5 has a function for referring to the available media information storage section 4 and determining a terminal available for the user, available media, a coding scheme, a terminal available for a called user to be connected, and how to set a combination of used terminals.

The call connection control section 6 has a function for setting and releasing a connection for transmitting designated media between designated terminals, and sets a call/ connection in accordance with commanded contents from the determination section 5.

The available media conversion information/storage section 8 stores functional information, etc. every media conversion section of each terminal connected to a communication network, and also stores a conversion media (including a coding scheme) classification and an address (a destination at a connecting time) every media conversion section. The available multi-point media processing section 113 performs arithmetic processing such as copy, synthesis, or addition between one input media information or plural input media information, and generates and outputs one or plural media information.

An adjustment section 12 has a function for adjusting and determining at least one of a media combination of one or more media or one or more media realizing schemes, and a combination of one or more terminals between users relative to communication. In other words, the adjustment section 12 determines a medium or a combination of media or a media realizing scheme or a combination of media realizing schemes and/or a terminal or a combination of terminals. The available multi-point media processing information storage section 114 stores a media processing classification, a classification of treatable media or media realizing scheme, and location information within the communication system such as a destination address used at a connecting time every available multi-point media processing section 113. The available multi-point media processing information storage section 114 also retrievably stores a media processing classification executable by the available multi-point media processing section 113 from the identifier for specifying the available multi-point media processing section, a classification of treatable media or media realizing system, and location information within the communication system.

The above terminals 101 to 104 are connected to each other through the communication network 2. Each of these terminals 101 to 104 has an inherent terminal ID (an identification code). Here, terminal ID "101" is added to the terminal 101, terminal ID "102" is added to the terminal 102, and terminal ID "103" is added to the terminal 103.

The terminal 101 among these terminals is a multimedia terminal capable of treating an audio object and a video image. The terminals 102 and 107 is a computer terminal (a personal computer, a work station, etc.) capable of treating the video image. The terminals 103, 104, 105 and 106 are telephone terminals capable of treating the audio object.

The terminal 108 is a computer terminal capable of treating the audio object and the video image. The terminal 109 is a terminal having functions of the above determination section 5, the adjustment section 12 and the call/ connection control section 6. The terminal 110 is a terminal having functions of the above available terminal information storage section 3 and the available media information storage section 4. The terminal 111 has media conversion sections 201, 202 for converting audio and video coding schemes. The terminal 112 has a function of the above media conversion storage section 8. The terminal 113 is a terminal having functions of multi-point media processing sections 301 to 303 for performing a conferencing communication and a multicast communication by the audio object and the video image. The terminal 114 is a terminal having a function of the available multi-point media processing information storage section 10.

The available terminal information storage section 3, the available media information storage section 4, the determination section 5, the call/connection control section 6, the media conversion sections 201, 202, the media conversion storage section 8, the multi-point media processing sections 301 to 303, the available multi-point media processing information storage section 10 and the adjustment section 12 are not necessarily arranged in a computer terminal. For example, one portion or all of these sections may be arranged in a network facility such as an exchanger and a server device.

FIG. 2 shows a stored information example of the available terminal information storage section 3. FIG. 3 shows a stored information example of the available media information storage section 4. As shown in FIG. 2, a user ID (an identification code) and a terminal ID available for this user are stored to the available terminal information storage section 3. As shown in FIG. 3, an ID for each terminal and a media classification of this terminal are stored to the available media information storage section 4 together with information of the coding scheme.

An example of various kinds of concrete operations in the communication system in the first embodiment having such a construction will next be explained. For example, a first operation example will be first explained in a case in which a user A starts a communication request with a user B by an audio object and a video image.

Figure 4:
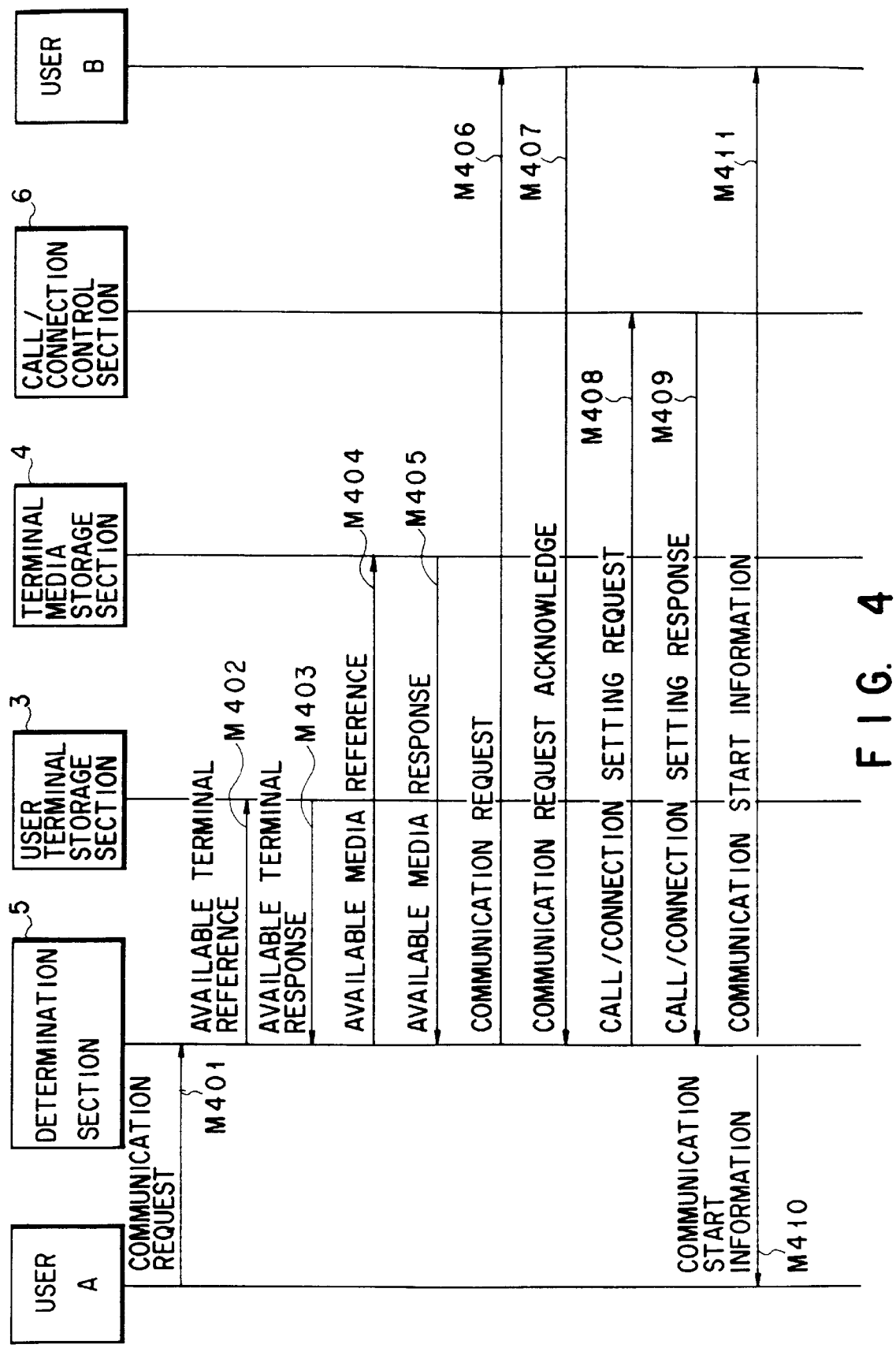
FIG. 4 is a view illustrating a message sequence as a first operation example of the communication system of the first embodiment.

The user A can use a terminal of terminal ID "101". The user B can use terminals of terminal IDs "102", "103" and "104". The following example relates to a case in which this user A starts a communication request with this user B by an audio object and a video image. The terminal 101 of the terminal ID "101" is a multimedia terminal capable of treating the audio object and the video image. The terminal 102 of the terminal ID "102" is a computer terminal (a personal computer, a work station, etc.) capable of treating the video image. The terminals 103 and 104 of terminal IDs "103" and "104" are telephone terminals capable of treating the audio object. FIG. 4 shows a message sequence in this example.

In this case, first, the user A starting the communication request sends this communication request to the communication network 2 by designating the user B as a called user and the audio object and the video image as used media in this communication request. Then, the communication network 2 transmits this communication request to the terminal 109 having a function of the determination section. Further, this terminal 109 transmits this communication request to its own determination section 5 (message M401 in FIG. 4).

The determination section 5 receiving this communication request refers to the available terminal information storage section 3 (M402) and recognizes by a reference response (M403) that the user A can use the terminal 101 and the user B can use the terminals 102, 103 and 104.

Next, the determination section 5 refers to the available media information storage section 4 of the terminal 110 (M404). The determination section 5 then recognizes by a reference response (M405) from the available media information storage section 4 that the terminal 101 available for the user A can be used by respectively setting the video image and the audio object in coding schemes v1 and a1; the terminal 102 available for the user B can be used by setting the video image in the coding scheme v1; the terminal 103 can be used by setting the audio object in the coding scheme a1; and the terminal 104 can be used by setting the audio object in a coding scheme a2.

Based on these recognized results, the determination section 5 transmits the communication request to the user B (M406). The user B transmits an approval notice (M407) in response to this communication request.

Next, when the determination section 5 receives the approval notice (M407) from the user B in response to the above communication request, the determination section 5 determines that the terminal 101 capable of treating the audio coding scheme a1 and the video coding scheme v1 is used on a side of the user A, and the terminal 103 capable of treating the coding scheme a1 to treat an audio object and the terminal 102 capable of treating the coding scheme v1 to treat a video image are used on a side of the user B. The determination section 5 transmits these determined contents to the call/connection control section 6 (M408). Then, the call/connection control section 6 sets a call/connection in accordance with the transmitted notice contents from this determination section 5 such that the terminals 101 and 103 are connected to each other with respect to the audio object, and the terminals 101 and 102 are connected to each other with respect to the video image. When the setting of the call/connection is normally terminated, the call/connection control section 6 transmits a call/connection setting response to the determination section 5 (M409). When the determination section 5 receives this call/connection setting response, the determination section 5 transmits a communication start to the users A and B (M410, M411).

FIG. 5 shows a setting state of such a set connection. In FIG. 5, reference numeral 11 designates the connection. The terminal 101 capable of treating the audio coding scheme a1 and the video coding scheme v1 is used on the user A side. The terminal 103 capable of treating the coding scheme a1 is used to treat an audio object on the user B side. The connection 11 is formed by using the audio coding scheme a1 with respect to both the users A and B. The terminal 102 capable of treating the coding scheme v1 is used to treat the video image on the user B side. In FIG. 5, communication is performed by forming the connection 11 using the terminal 101 and the coding scheme v1 on the user A side.

The above operation example relates to a case in which the user A starts the communication request with the user B, using the audio object and the video image. Next, for example, a second operation example will be explained in a case in which the user A starts a communication request with a user C, using an audio object and a video image.

Here, the second operation example in the communication system in the first embodiment relates to a case in which the user A capable of using the terminal of terminal ID "101" starts the communication request with the user C capable of using the terminal of terminal ID "105" via the audio object and the video image. The terminal 101 of terminal ID "101" is a multimedia terminal capable of treating the audio object and the video image. The terminal 105 of terminal ID "105" is a telephone terminal capable of treating only the audio object.

Figure 6:
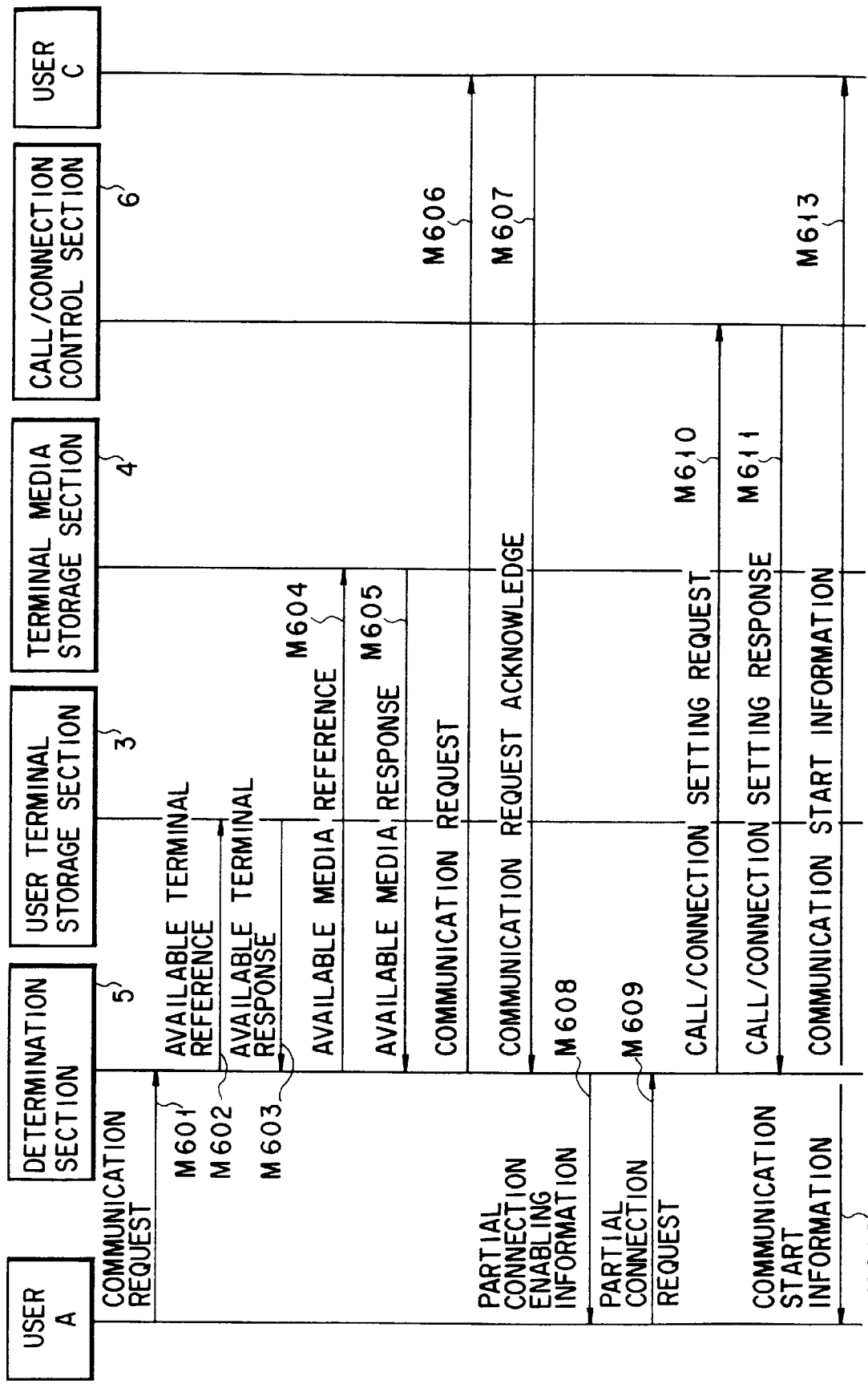
FIG. 6 is a view illustrating a message sequence as a second operation example of the communication system of the first embodiment.

FIG. 6 shows a message sequence in this example.

When the communication request with the user C via the audio object and the video image is started, the user A designates the user C as a called user and the audio object and the video image as used media in the communication request. This communication request is transmitted to the determination section 5 (message M601 in FIG. 6). Then, the determination section 5 refers to contents of the available terminal information storage section 3 (M602) and recognizes on the basis of its reference response (M603) that the user A can use the terminal 101 and the user C can use the terminal 105.

Next, the determination section 5 refers to the available media information storage section 4 (M604). Then, the determination section 5 recognizes on the basis of a reference response (M605) that the terminal 101 available for the user A can be used by respectively setting the video image and the audio object in the coding schemes v1 and a1, and the terminal 105 available for the user C can be used by setting the audio object in the coding scheme a1. As a result, the determination section 5 determines that media commonly available between the users A and C are only the audio object in coding scheme a1. Based on this recognized result, the determination section 5 transmits the communication request to the user C (M606).

When there is the communication request by the audio object and the video image from the user A to the user C, the determination section 5 determines an available terminal and media commonly available between the users A and C. The determination section 5 knows from the determined results that communication can be performed by only the audio object, and transmits that communication is performed by only the audio object (M606).

After the determination section 5 receives an approval notice (M607) from the user C with respect to the above communication request, the determination section 5 transmits that a connection can be performed by only the audio object with respect to the user A ((a partial connectable notice)M608). The user A requires the connection used by only the audio object with respect to this notice (M609). Thus, the determination section 5 sends commands to the call/connection control section 6 such that the terminals 101 and 105 are connected to each other by the audio object in the coding scheme a1 (M610). The call/connection control section 6 sets a call/connection according to notice contents. When the setting of the call/connection is normally terminated, the call/connection control section 6 transmits a call/connection setting response to the determination section 5 (M611). When the determination section 5 receives this response, the determination section 5 transmits a communication start to the users A and C (M612, M613). Thus, an audio communication can be performed between the terminals 101 and 105.

FIG. 7 shows a setting state of such a set connection. FIG. 7 shows a situation in which the connection using the coding scheme a1 is formed between the terminals 101 and 105, and the audio communication can be performed between the terminals 101 and 105.

The above second operation example relates to a case in which the user A starts the communication request with the user C via the audio object and the video image. Next, for example, a third operation example will be explained in a case in which the user A starts a communication request with a user D via an audio object and a video image.

Here, the third operation example in this communication system in the first embodiment relates to a case in which the user A capable of using the terminal of terminal ID "101" starts the communication request with the user D capable of using the terminals of terminal IDs "106" and "107" via the audio object and the video image. The terminal 101 of terminal ID "101" is a multimedia terminal capable of treating the audio object and the video image. The terminal 106 of terminal ID "106" is a telephone terminal capable of treating only the audio object. The terminal 107 of terminal ID "107" is a computer terminal (a personal computer, a work station, etc.) capable of treating the video image.

Figure 8:
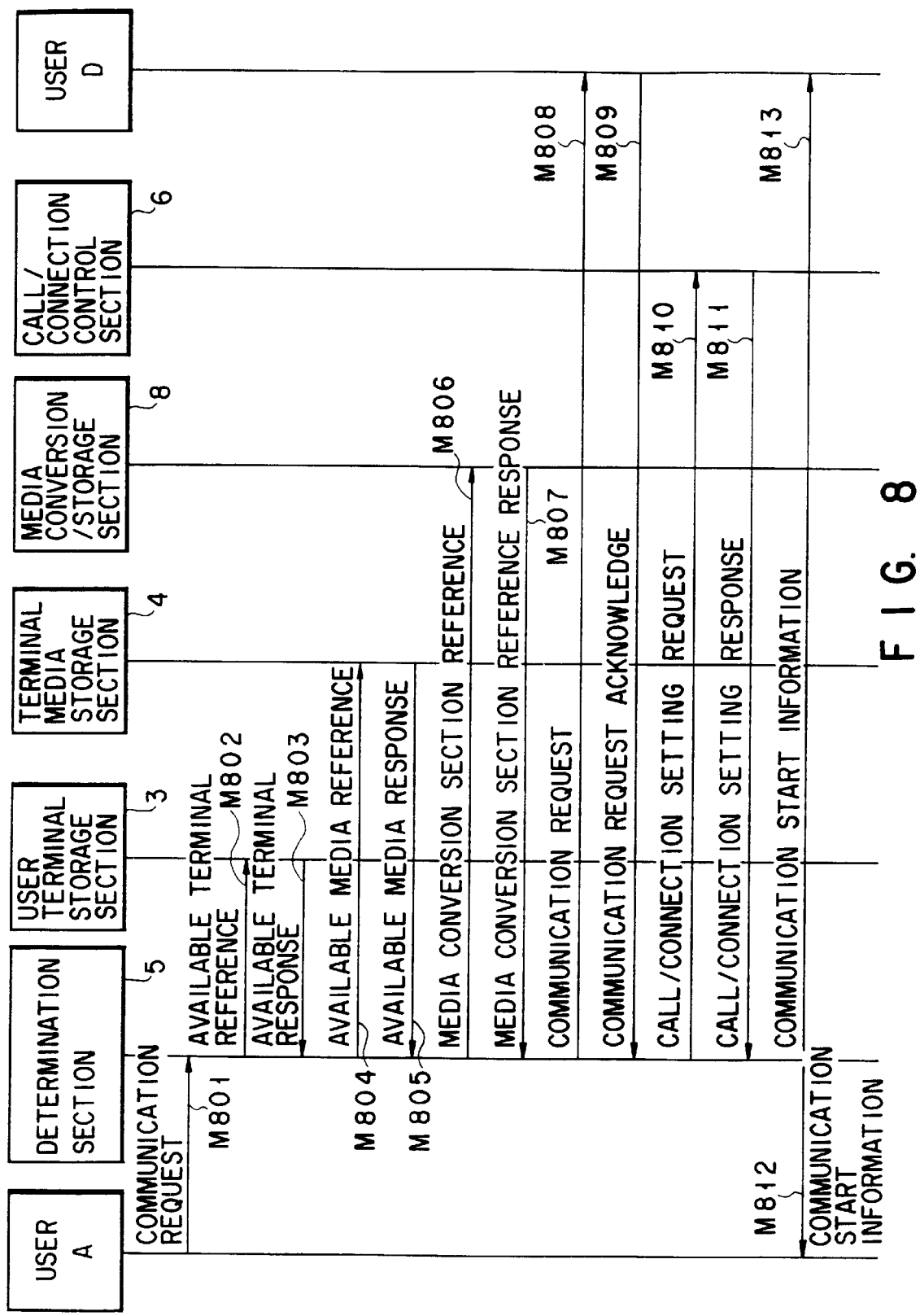
FIG. 8 is a view illustrating a message sequence as a third operation example of the communication system of the first embodiment.

FIG. 8 shows a message sequence as one example of the case in which the user A starts the communication request with the user D by the audio object and the video image. The third operation example will be explained with reference to FIG. 8.

It is assumed that the user A designates the user D as a communication called and the audio object and the video image as used media in the communication request. This communication request is transmitted to the determination section 5 in the terminal 108 (message M801 in FIG. 8). Then, the determination section 5 refers to the available terminal information storage section 3 (M802), and recognizes on the basis of its reference response (M803) that the user A can use the terminal 101 and the user D can use the terminals 106 and 107.

Next, the determination section 5 refers to the available media information storage section 4 (M804), and recognizes on the basis of its reference response (M805) that the terminal 101 available for the user A can be used by respectively setting the video image and the audio object in the coding schemes v1 and a1; and the terminal 106 available for the user D can be used by setting the audio object in the coding scheme a2; and the terminal 107 available for the user D can be used by setting the video image in a coding scheme v2. As a result, the determination section 5 determines that no media commonly available between the users A and D exist. Then, the determination section 5 refers to the media conversion storage section 10 (M806).

FIG. 9 shows the construction of the available media conversion information storage section 8. As shown in this figure, the available media conversion information storage section 8 stores a conversion media (including a coding scheme) classification and an address (a destination at a connecting time) for each media conversion section. Media conversion sections 201 and 203 among media conversion sections stored to the available media conversion information storage section 8 are used by a reference response (M807) of the available media conversion information storage section 8 so that the coding scheme can be mutually converted from a1 to a2 and from a2 to a1 with respect to the audio object. Further, the coding scheme can be mutually converted from v1 to v2 and from v2 to v1 with respect to the video image. As a result, it is recognized that, if this is utilized, the available media of the users A and D can be connected to each other. Based on these recognized contents, the determination section 5 determines a selection of media conversion sections 301 and 303. Therefore, the determination section 5 transmits a communication request to the user D (M808). When the determination section 5 receives an approval notice (M809) from the user D with respect to the above communication request, the determination section 5 sends commands to the call/connection control section 6 such that the terminal 101 and the media conversion section 301 are connected to each other through the audio object in the coding scheme a1; and the terminal 101 and the media conversion section 303 are connected to each other through the video image in the coding scheme v1; and the media conversion section 201 and the terminal 106 are connected to each other through the audio object in the coding scheme a2; and the media conversion section 203 and the terminal 107 are connected to each other through the video image in the coding scheme v2 (M810). The call/connection control section 6 sets a call/connection according to contents commanded from the determination section 5. When the setting of the call/connection is normally terminated, the call/connection control section 6 transmits a set response of the call/connection to the determination section 5 (M811). When the determination section 5 receives this set response, the determination section 5 transmits a communication start to the users A and D (M812, M813).

FIG. 10 shows a setting state of such a set connection. Namely, an audio communication path using mutual conversion of the coding schemes a1 and a2 is provided for an audio communication by a connection 11 formed through the media conversion section 201 between the terminals 101 and 106. A path for transmitting and receiving the video image by using mutual conversion of the coding schemes v1 and v2 is provided for the video image by the connection 11 formed through the media conversion section 203 between the terminals 101 and 107. The audio object in the coding scheme a1 is transmitted between the terminal 101 and the media conversion section 301. The video image in the coding scheme v1 is transmitted between the terminal 101 and the media conversion section 303. The audio object in the coding scheme a2 is transmitted between the media conversion section 201 and the terminal 106. Further, the video image in the coding scheme v2 is transmitted between the media conversion section 203 and the terminal 107. As a result, the audio objects and the video images in the coding schemes different from each other can be transmitted between the users A and C.

The above third operation example relates to a case in which the user A starts the communication request with the user D via the audio object and the moving image. Next, for example, a fourth operation example will be explained in a case in which the user A requires a conference communication with users B and D via the audio object and the video image.

Here, the fourth operation example in the communication system in the first embodiment relates to a case in which the user A capable of using the terminal of terminal ID "101" requires a conference communication with the user B capable of using the terminals of terminal IDs "102", "103", "104" and the user D capable of using the terminals of terminal IDs "106", "107".

In the conference communication, it is necessary to communicate by an audio object and a video image. The terminal 101 of terminal ID "101" is a multimedia terminal capable of treating the audio object and the video image. The terminal 102 of terminal ID "102" is a computer terminal (a personal computer, a work station, etc.) capable of treating the video image. The terminal 103 of terminal ID "103" and the terminal 104 of terminal ID "104" are telephone terminals capable of treating the audio object.

The terminal 106 of terminal ID "106" is a telephone terminal capable of treating only the audio object. The terminal 107 of terminal ID "107" is a computer terminal (a personal computer, a work station, etc.) capable of treating the video image.

Figure 11A:
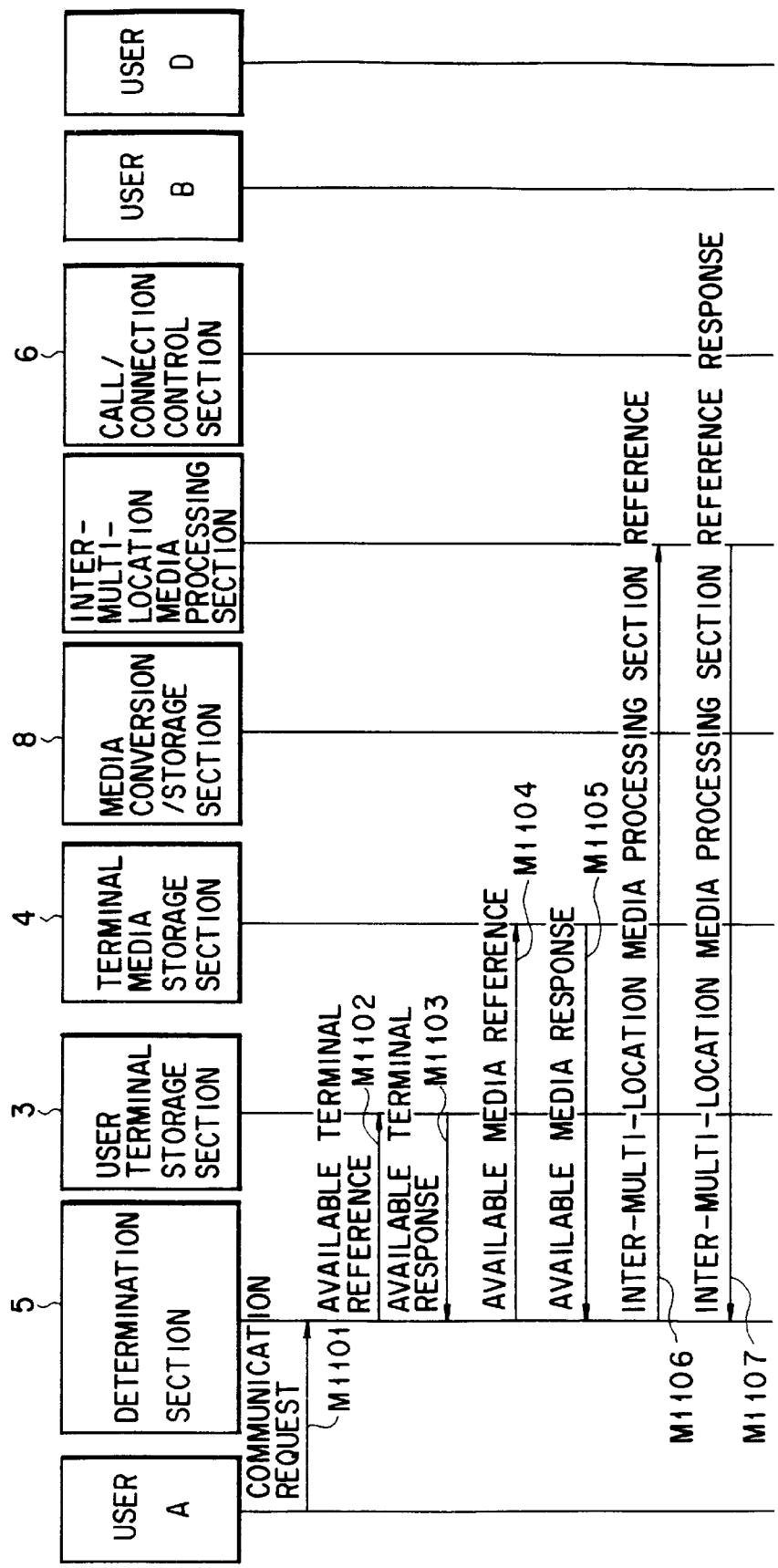
FIGS. 11A and 11B are views illustrating a message sequence as a fourth operation example of the communication system of the first embodiment.
Figure 11B:
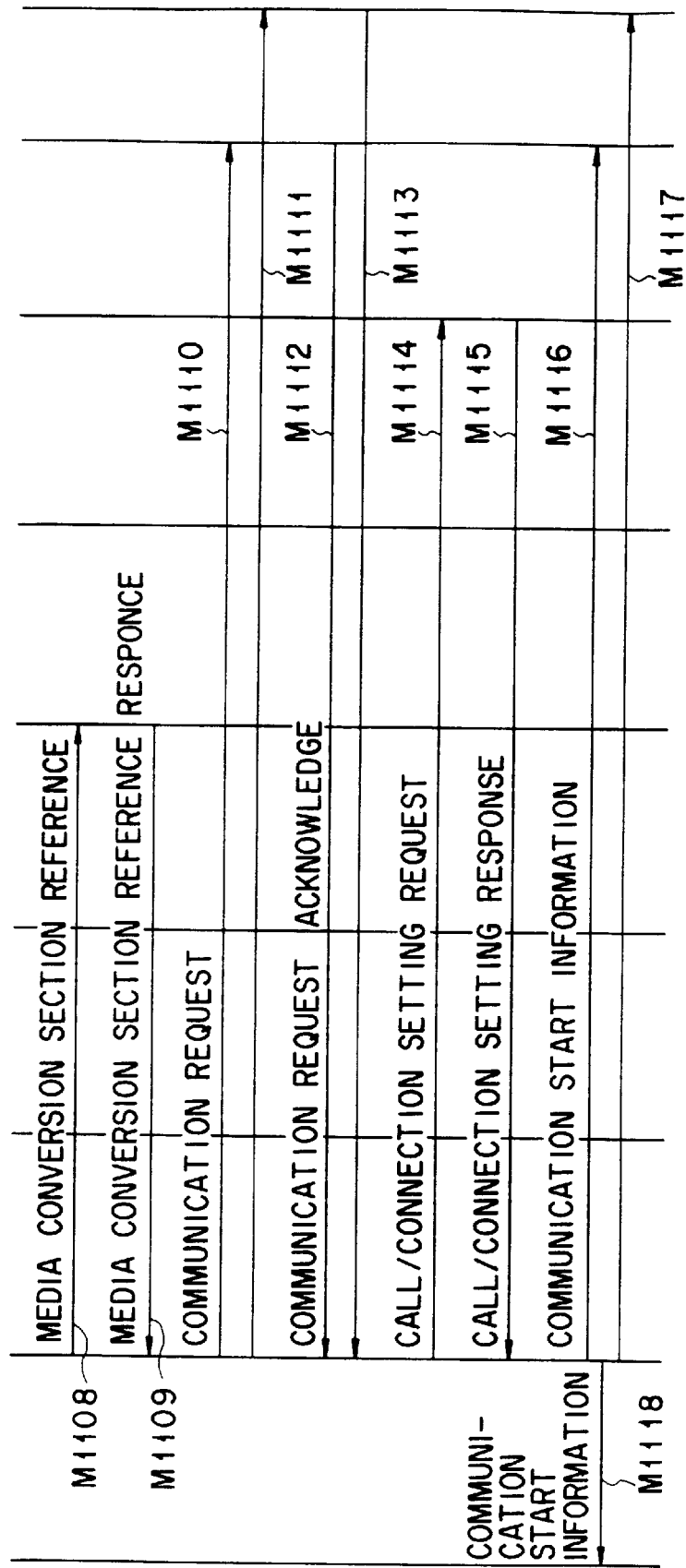

The following example relates to a case in which the user A requires a conference communication with the users B and D via the audio object and the video image. FIGS. 11A and 11B show a message sequence in this embodiment.

When the conference communication is required, the user A designates the users B and D as called users, the audio object and the video image as used media, and conference as a communication form in the communication request. This communication request is transmitted to the determination section 5 in the terminal 108 (message M1101 in FIG. 11A). Then, the determination section 5 refers to the available terminal information storage section 3 (M1102), and recognizes on the basis of a reference response (M1103) that the user A can use the terminal 101, the user B can use the terminals 102, 103 and 104, and the user D can use the terminal 106.

Next, the determination section 5 refers to the available media information storage section 4 (M1104), and recognizes on the basis of its reference response (M1105) that the terminal 101 available for the user A can be used by respectively setting the video image and the audio object in the coding schemes v1 and a1; the terminal 102 available for the user B can be used by setting the video image in the coding scheme v1; the terminal 103 can be used by setting the audio object in the coding scheme a1; and the terminal 104 can be used by setting the audio object in the coding scheme a2; and the terminal 106 available for the user D can be used by setting the audio object in the coding scheme a2; and the terminal 107 can be used by setting the video image in the coding scheme v2. Further, when the determination section 5 receives the conference communication as a communication form, the determination section 5 refers to the available multi-point media processing information storage section 10 (M1106).

FIG. 12 shows the construction of the available multi-point media processing information storage section 10. As shown in this figure, the available multi-point media processing information storage section 10 stores a media processing classification (conference, broadcast, etc.), a treating coding scheme and an address (a destination at a connecting time) every available multi-point media processing section. The determination section 5 knows by a reference response (M1107) from the available multi-point media processing information storage section 10 that an available multi-point media processing section 301 supports conference media processing and can use the coding schemes a1 and v1 among available multi-point media processing sections stored to the available multi-point media processing information storage section 10. Thus, the determination section 5 selects this available multi-point media processing section 301. Further, the determination section 5 refers to the available media conversion information storage section 10 to connect the available multi-point media processing section 301 and the terminals 106, 107 (M1108), and knows by its reference response (M1109) that there is a media conversion section 201 as a media conversion section for converting audio coding schemes a1 and a2 and there is a media conversion section 203 as a media conversion section for converting video coding schemes v1 and v2. Therefore, the determination section 5 selects the media conversion sections 201 and 203 as media conversion sections for respectively converting the audio coding schemes a1 and a2 and the video coding schemes v1 and v2.

When these selections are terminated, the determination section 5 transmits a communication request to the users B and D (M1110, M1111). An approval notice (M1112, M1113) with respect to the communication request is transmitted to the determination section 5 from each of the users B and D.

When the determination section 5 receives the approval notice (M1112, M1113) from each of the users B and D with respect to the above communication request, the determination section 5 sends commands to the call/connection control section 6 such that the audio object coded by the coding scheme a1 and the video image coded by the coding scheme v1 are transmitted between the terminal 101 and the available multi-point media processing section 301; the video image coded by the coding scheme v1 is transmitted between the terminal 102 and the available multi-point media processing section 301; the audio object coded by the coding scheme a1 is transmitted between the terminal 103 and the available multi-point media processing section 301; the audio object coded by the coding scheme a2 is transmitted between the terminal 106 and the media conversion section 201; the audio object coded by the coding scheme a1 is transmitted between the media conversion section 201 and the available multi-point media processing section 301; the video image coded by the coding scheme v2 is transmitted between the terminal 107 and the media conversion section 203; and the video image coded by the coding scheme v1 is transmitted between the media conversion section 203 and the available multi-point media processing section 301 (M1114). Then, the call/connection control section 6 sets a call/connection according to contents commanded from the determination section 5. When the setting of the call/connection is normally terminated, the call/connection control section 6 transmits a set response of the call/connection to the determination section 5 (M1115). When the determination section 5 receives this set response, the determination section 5 transmits a communication start to the users A, B and D (M1115, M1116, M1117).

Figure 13:
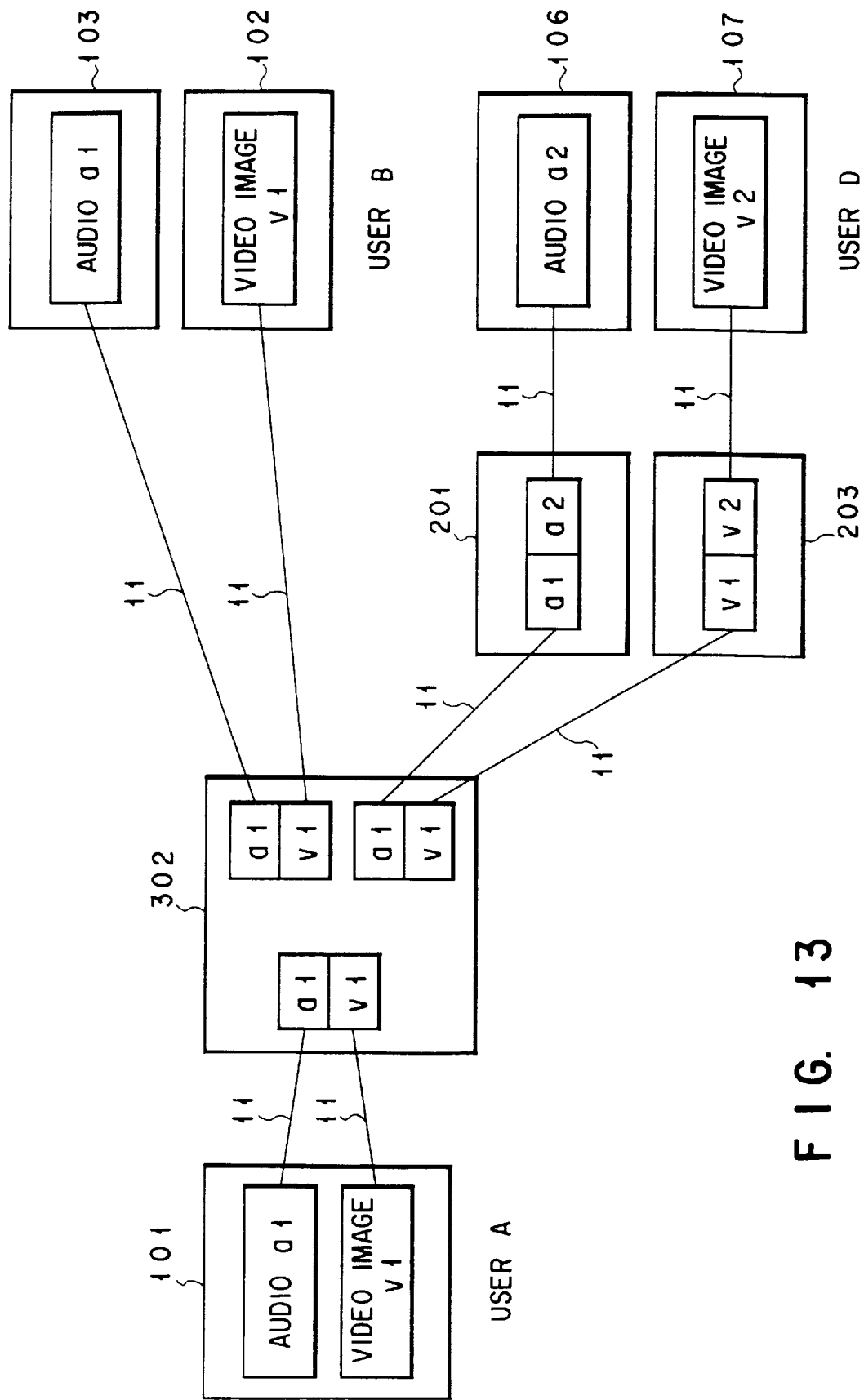
FIG. 13 is a view illustrating a connection mode as a fourth operation example of the communication system of the first embodiment.

FIG. 13 shows a setting state of such a set connection. This figure shows a situation in which the audio object coded by the coding scheme a1 and the video image coded by the coding scheme v1 are transmitted between the terminal 101 and the available multi-point media processing section 301; the video image coded by the coding scheme v1 is transmitted between the terminal 102 and the available multi-point media processing section 301; the audio object coded by the coding scheme a1 is transmitted between the terminal 103 and the available multi-point media processing section 301; the audio object coded by the coding scheme a2 is transmitted between the terminal 106 and the media conversion section 201; the audio object coded by the coding scheme a1 is transmitted between the media conversion section 201 and the available multi-point media processing section 301; the video image coded by the coding scheme v2 is transmitted between the terminal 107 and the media conversion section 203; and the video image coded by the coding scheme v1 is transmitted between the media conversion section 203 and the available multi-point media processing section 301.

As a result, the audio object coded by the coding scheme a1 and the video image coded by the coding scheme v1 are transmitted between the terminal 101 and the available multi-point media processing section 301. The video image coded by the coding scheme v1 is transmitted between the terminal 102 and the available multi-point media processing section 301. The audio object coded by the coding scheme a1 is transmitted between the terminal 103 and the available multi-point media processing section 301. The audio object coded by the coding scheme a2 is transmitted between the terminal 106 and the media conversion section 201. The audio object coded by the coding scheme a1 is transmitted between the media conversion section 201 and the available multi-point media processing section 301. The video image coded by the coding scheme v2 is transmitted between the terminal 107 and the media conversion section 203. The video image coded by the coding scheme v1 is transmitted between the media conversion section 203 and the available multi-point media processing section 301. Thus, it is possible to perform a conference communication via the audio object and the video image irrespective of differences in coding schemes and terminal functions between the users.

The above fourth operation example relates to a case in which the conference communication can be performed irrespective of the differences in coding schemes and terminal functions usable between the users. Next, for example, a fifth operation example will be explained in a case in which the user A starts a communication request with a user E via an audio object and a video image.

Here, the fifth operation example in the communication system in the first embodiment relates to a case in which the user A capable of using the terminal of terminal ID "101" starts a communication request with a user E capable of using the terminal of terminal ID "108" via an audio object and a video image.

The terminal 101 of terminal ID "101" is a multimedia terminal capable of treating the audio object and the video image. The terminal 108 of terminal ID "108" is a terminal capable of treating the audio object and the video image. However, it is assumed that the terminal 101 treats the video image in the coding scheme v1 and the audio object in the coding scheme a1, but the terminal 108 treats the video image and the audio object in a coding scheme av1 as a single integrated coding scheme.

FIG. 14 shows a message sequence in this example.

An explanation will be made with reference to FIG. 14. The user A designates the user E as a called user and the audio object and the video image as used media in the communication request. This communication request is transmitted to the determination section 5 (message M1401 in FIG. 14). Thus, the determination section 5 refers to the available terminal information storage section 3 (M1402) and recognizes on the basis of its reference response (M1403) that the user A can use the terminal 101 and the user E can use the terminal 108.

Next, the determination section 5 refers to the available media information storage section 4 (M1404) and recognizes on the basis of its reference response (M1405) that the terminal 101 available for the user A can be used by respectively setting the video image and the audio object in the coding schemes v1 and a1, and the terminal 108 available for the user E can be used by setting the video image and the audio object in the coding scheme av1 as a single integrated coding scheme. As a result of this recognition, the determination section 5 knows that the available coding schemes of the users A and E are different from each other, and refers to the available media conversion information storage section 10 to investigate whether media conversion can be performed or not (M1406).

The available media conversion information storage section 10 has the same construction as FIG. 9 used in the third operation example. The determination section 5 recognizes on the basis of a reference response (M1407) that there is no media conversion section capable of mutually converting the coding schemes a1, v1 and the coding scheme av1. As a result, the determination section 5 determines that there is no coding scheme mutually connectable between the users A and E, and transmits incommunicability to the user A (M1408). Therefore, no communication is formed between the users A and E.

The above fifth operation example relates to a case in which the treatable coding schemes do not agree with each other, and there is no media conversion section capable of converting the coding schemes. Next, a processing procedure for automatically reflecting the used terminal of a user in the available terminal information storage section 3 will be explained as a sixth operation example.

The processing procedure for automatically reflecting the terminal used by a user in the available terminal information storage section 3 will be explained as the sixth operation example in the communication system in the first embodiment. When the terminal is a computer terminal and this user logs in this computer terminal, the communication system is constructed such that the available terminal information storage section 3 is updated by a log-in procedure. For example, when the user A normally uses the terminal 101 as a multimedia terminal, but logs in another computer terminal in a certain case, the terminal 101 is normally set as a terminal corresponding to the user C in the available terminal information storage section 3. For example, when the user A logs in the terminal 107, a change in used terminal of the user A is transmitted from the terminal 107 to the available terminal information storage section 3 in accordance with the log-in procedure. Thus, the terminal corresponding to the user A in the available terminal information storage section 3 is changed to the terminal 107.

Similarly, when the user A logs out of the terminal 107, a change in the terminal used by the user A is transmitted from the terminal 107 to the available terminal information storage section 3 in accordance with a log-out procedure. Thus, the terminal corresponding to the user A in the available terminal information storage section 3 is changed to the terminal 101 as a default.

In this example, the change in the used terminal is transmitted from the terminal to the available terminal information storage section 3 by log-in/log-out with respect to the terminal. However, the used terminal may be updated by a construction in which the available terminal information storage section 3 periodically inquires of each of terminals about a log-in situation of the user. The communication system may not be necessarily constructed such that use or non-use of the user terminal is updated by the log-in situation of the user. For example, use or non-use of the user terminal may be updated by turning-on and turning-off operations of power of the terminal, location information of the user, or detected results of connection/disconnection, etc. with respect to a subscriber's loop of the terminal. In accordance with the method in this embodiment, the available terminal information storage section can be suitably updated automatically on the basis of a state of which terminal the user is using.

Next, a processing procedure for automatically reflecting presence or absence of media input-output ability of a terminal in the available media information storage section 4 will be explained as a seventh operation example.

The processing procedure for automatically reflecting existence or non-existence of media input-output ability of a terminal in the available media information storage section 4 will be explained as the seventh operation example in the communication system in the first embodiment.

In a computer terminal, etc., a kind and contents of available media depend on what function a mounted input/output (I/O) device (interface) has. Accordingly, it is necessary to manage the input/output device mounted at present and whether this device can be used or not. In this case, when the input/output device is attached/detached with respect to this terminal, the communication system is constructed such that addition/deletion of used media or coding schemes is transmitted from an input/output (I/O) management function on this terminal to the available media information storage section 4. For example, when an audio input/output (I/O) device is mounted to the terminal 107 and audio information is coded/decoded and software (driver) for driving this input/output device is mounted, an additional directory request of a using coding scheme is transmitted from the input/output management function on this software or terminal to the available media information storage section 4 so that the available media information storage section 4 is updated.

Conversely, when the audio input/output device is detached, the input/output management function on this terminal detects the detachment of this input/output device, and a deletion request of the using coding scheme is transmitted to the available media information storage section 4 so that the available media information storage section 4 is updated. As a result, for example, when the audio input/output device is mounted to the terminal 107 and audio information is coded/decoded and software for driving this input/output device is mounted, the additional directory request of the using coding scheme is transmitted from the input/output management function on this software or terminal to the available media information storage section 4 so that the available media information storage section 4 is updated. When the audio input/output device is detached, the input/output management function on this terminal detects the detachment of this input/output device and the deletion request of the using coding scheme is transmitted to the available media information storage section 4 so that the available media information storage section 4 is updated.

Next, for example, an eighth operation example will be explained in another case in which the user A starts a communication request with the user D via an audio object and a video image.

The eighth operation example in the communication system in the first embodiment relates to another case in which the user A starts a communication request with the user D via an audio object and a video image.

The terminal 101 available for the user A is a terminal capable of treating an audio object and a video image. The terminals 106 and 107 available for the user D are respectively a telephone terminal capable of treating only the audio object and a computer terminal able to treat the video image, but unable to treat the audio object.

Figure 15A:
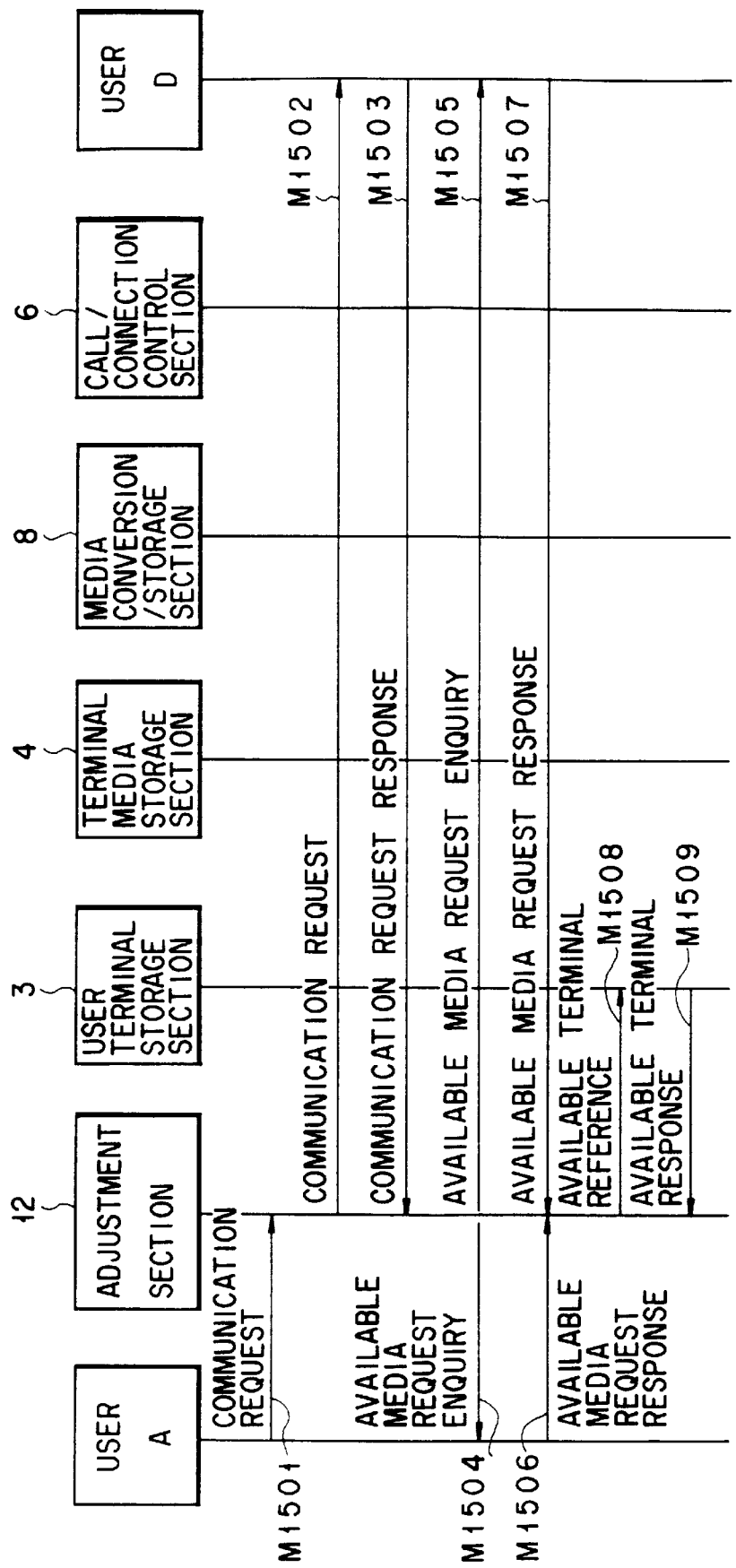
FIGS. 15A and 15B are views illustrating a message sequence as a sixth operation example of the communication system of the first embodiment.
Figure 15B:
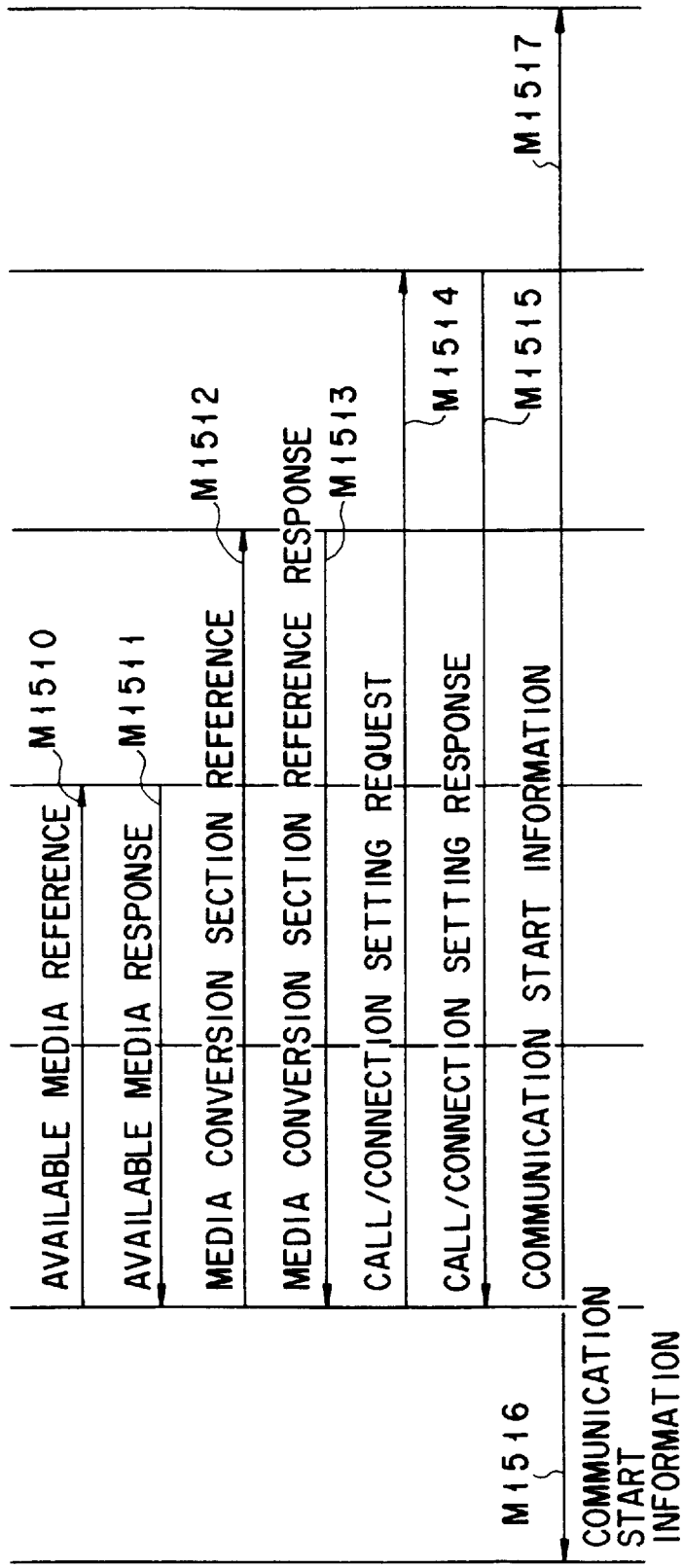

FIGS. 15A and 15B show a message sequence in this example. This example uses an adjustment section 12 having a function for adjusting and determining at least one of a combination of one or more media or a combination of the media and a media realizing scheme and a combination of one or more terminals, between users relative to communication. More specifically, the adjustment section 12 determines a medium or a combination of media or a media realizing scheme or a combination of media realizing schemes and/or a terminal or a combination of terminals.

The explanation will be made with reference to FIGS. 15A and 15B. The user A designates the user D as a called user and an audio object and a video image as used media in a communication request. This communication request is transmitted to the adjustment section 12 (message M1501 in FIG. 15A). Then, the adjustment section 12 transmits a start of the communication request from the user A to the user D (M1502). In response to this communication request, the user D transmits that it is communicable by only the audio object (M1503). When the adjustment section 12 receives this response, the adjustment section 12 knows that it is a combination of media in which the communication request from the user A is different from that from the user D. Thus, the adjustment section 12 inquires of the users A and D whether both the users communicate with each other through only the audio object as common desirable media (M1504, M1505). In this example, it is assumed that the user A approves of this inquiry. Accordingly, the user A transmits the approval of this inquiry to the adjustment section 12

(M1506). The user D responds to the adjustment section 12 such that the user D also approves of this inquiry since it is first required media (M1507). When the inquired contents of each user are the same as the initial request of this user as in the user D in this example, inquiry and approval procedures may be omitted.

Since the adjustment section 12 obtains the approval response from both the users A and D, the adjustment section 12 next refers to the available terminal information storage section 3 (M1508) and recognizes on the basis of its reference response (M1509) that the user A can use the terminal 101 and the user D can use the terminals 106 and 107.

Next, the adjustment section 12 refers to the available media information storage section 4 (M1510) and recognizes on the basis of its reference response (M1511) that the terminal 101 available for the user A can be used by setting the audio object in the coding scheme a1, and the terminal 106 available for the user D can be used by setting the audio object in the coding scheme a2. As a result, the adjustment section 12 determines that there is no coding scheme commonly available between the users A and D, and refers to the available media conversion information storage section 10 (M1512). The construction of the media conversion storage section 10 is similar to that explained in the third operation example.

The adjustment section 12 recognizes on the basis of a reference response (M1513) of the media conversion storage section 10 that the coding scheme of the audio object can be converted from a1 to a2 and from a2 to a1 by using the media conversion section 201 among media conversion sections stored in the available media conversion information storage section 10, and the users A and D can communicate with each other through audio media. Based on these recognized results, the adjustment section 12 sends commands to the call/connection control section 6 such that the media conversion section 201 is selected as a media conversion section capable of mutually converting the coding schemes of the audio object; the terminal 101 and the media conversion section 201 are connected to each other through the audio object in the coding scheme a1; and the media conversion section 201 and the terminal 106 are connected to each other through the audio object in the coding scheme a2 (M1514). The call/connection control section 6 sets a call/connection according to the commanded contents. When the setting of the call/connection is normally terminated, the call/connection control section 6 transmits a set response of the call/connection to the adjustment section 12 (M1515). When the adjustment section 12 receives this set response, the adjustment section 12 transmits a communication start to the users A and D (M1516, M1517).

Figure 16:
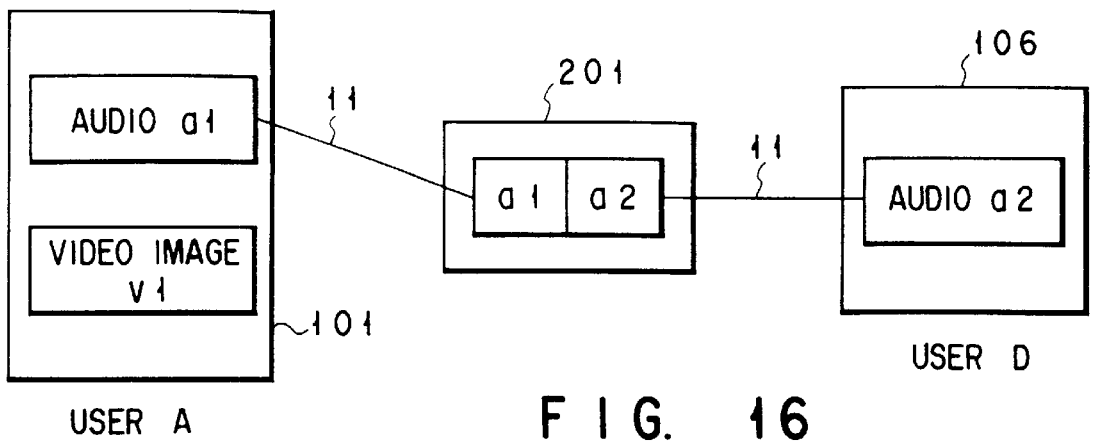
FIG. 16 is a view illustrating a connection mode as a sixth operation example of the communication system of the first embodiment.

FIG. 16 shows a setting state of such a set connection. This figure shows a situation in which the audio object is transmitted through the media conversion section 201 as a media conversion section capable of mutually converting the coding schemes a1 and a2 of the audio object; the terminal 101 and the media conversion section 201 are connected to each other via the audio object coded by the coding scheme a1; and the media conversion section 201 and the terminal 106 are connected to each other via the audio object coded by the coding scheme a2.

As explained above, in accordance with the first embodiment, when communication including plural media is required, a user designates users participating in the communication, used media, and a communication form according to necessity in one communication request. Thus, a suitable terminal combination can be selected every user participating in the communication without considering a terminal environment of another user participating in the communication, an available coding scheme, etc. A call/connection with respect to the selected terminal can be set.

In the above example, media available in association with a called user are automatically selected on a system side and then the call/connection is set. The next explanation relates to a second embodiment in which these media are not selected automatically, but can be selected by a user.

In the second embodiment, when communication to be performed by a combination of media is required without designating a using terminal in advance, and the media in this communication request are realized by a terminal or a combination of terminals, media available in communication with a called user are presented and selected by a user. Thus, it is possible to prevent the communication from being realized in an unexpectable form of the user. Further, the communication is realized in a shape reflecting an intention of one or more users.

Therefore, in this second embodiment, a communication system comprises a plurality of terminals capable of treating one or more media, a communication request input section for receiving a communication request including information regarding one or more called users and one or more media, a candidate determination section for determining in accordance with the communication request a group or plural groups each including at least one of a media combination containing one or more media or media realization schemes which are available for each user participating in communication to satisfy a part of the communication request and a terminal combination of one or more terminals, and a user intention reflection section for informing the user or a different user participating the communication of at least a candidate of combination of one or more media determined for at least one user participating in communication or a candidate of combination of terminals, selecting either one of the combination candidates, and making the user determine whether a communication is allowed by the selected combination candidate or the communication request should be changed, and a call/connection setting section for setting a call/connection on the basis of the determination result of the user intention reflection section.

When the change in communication request is selected by the above user intention reflection section, a communication request changing section for enabling the input of changed contents by the user is more preferably arranged.

When a mismatch is caused between the inputs of plural users in the above user intention reflection section, or there is a possibility of such a mismatch, a user adjustment section capable of adjusting a selection of the above combination candidate or the change in communication request between at least two users relative to the above communication is more preferably arranged.

Further, a terminal unit is connected to a network and can treat one or more media. This terminal unit has a communication request input section, a user intention reflection section and a setting section. This communication request input section inputs a communication request including information relative to at least one called user desiring communication and one or more media by a user. The user intention reflection section transmits at least one of a combination of one or more media available for the user to satisfy at least one portion of the communication request at a generating time point of the communication request with respect to at least one user participating in the above communication, and a combination of terminals to this user or a different user participating in the communication. The user intention reflection section selects any one of these combinations and determines a selection of an approval of the communication in this selected combination, or a desire of a change in communication request by an input of the user receiving this transmitted notice. The setting section sets a call/connection based on this determination.

Figure 17:
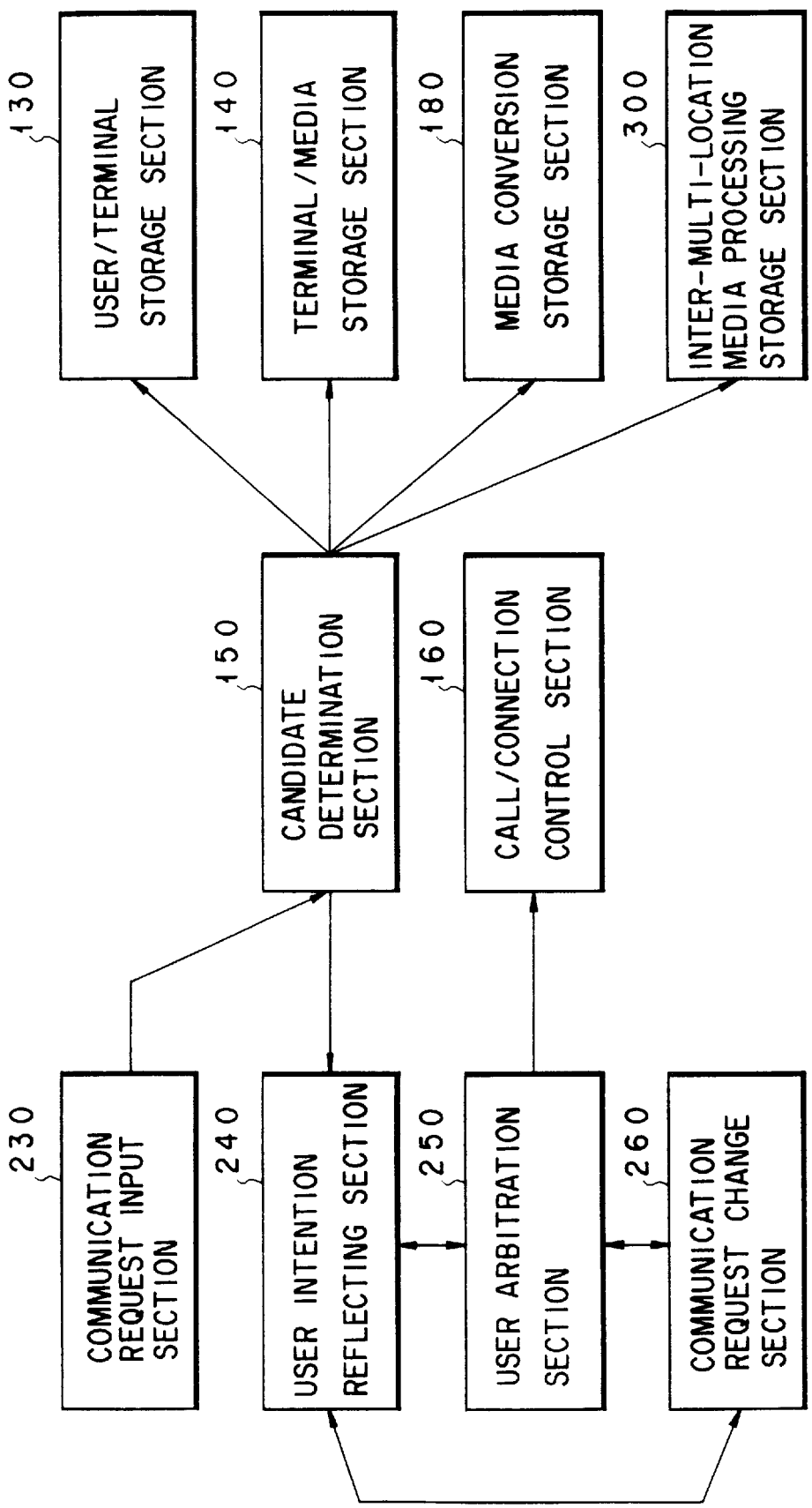
FIG. 17 is a block diagram illustrating an outline of a second embodiment of the invention.

FIG. 17 is a block diagram showing a constructional example of the communication system in the second embodiment. In this figure, the communication system is constructed by an available terminal information storage section 130, an available media information storage section 140, a candidate determination section 150, a call/connection control section 160, an available media conversion information storage section 180, a communication request input section 230, a user intention reflection section 240, a user adjusting section 250, a communication request changing section 260, and an available multi-point media processing information storage section 300.

The communication request input section 230 among these sections has a function for receiving an input of a user in a communication request including information relative to at least one called user desiring communication and one or more media. The candidate determination section 150 has a function for determining one or more sets of candidates, each set including at least one of a media combination of one or more media and at least one media realizing scheme and a terminal combination of one or more terminals which are available for each user participating in communication according to the communication request to satisfy at least one portion of this communication request. In other words, the candidate determination section 150 determines one or more sets of candidates each including a medium or a combination of media or a media realizing scheme or a combination of media realizing schemes and/or a terminal or a combination of terminals.

More concretely, the above candidate determination section 150 determines at least one of a candidate for combination of one or more media and a candidate of combination of terminals which are available for each user participating in communication, on the basis of the available terminal information storage section 130 and the available media information storage section 140. Further, when media or a media realizing scheme commonly available between the users participating in the communication does not exist, the candidate determination section 150 connects and the media or the media realizing scheme used by a first user and those or that used by a second user via one or more media conversion sections (201, 202, 203), and repeatedly starts the available media conversion information storage section 180 to search a media conversion section for converting to the media capable of using media or media realization scheme used by the second user. For example, the video image used by the first user can be converted to a still image used by the second user. Thus, the candidate determination section 150 obtains information as to whether or not there is a media conversion section for connecting media or media realizing schemes used by the respective users in communication between the plural users. The candidate determination section 150 may be constructed by a system for determining a candidate in consideration of this information. Otherwise, the candidate determination section 150 may be constructed by a system for starting the available multi-point media processing information storage section 300 by a communication form designated in the communication request and the media or the media realizing scheme used by each user participating in the communication, and determining an available multi-point media processing section in accordance with necessity.

The user intention reflection section 240 informs the above determined at least one of the candidate for combination of one or more media and the candidate of combination of the terminals, which are relative to at least one user participating in the above communication, of the user or a different user participating in the communication. The user intention reflection section 240 selects any one of the combination candidates, and inputs and determines a selection of an approval of the communication by this combination, or a desire of a change in communication request by the user receiving this informed notice. The communication request changing section 260 enables an input of changed contents of the communication request by the user. When a mismatch is caused between the inputs of plural users in the above user intention reflection section, or there is a possibility of this mismatch, the user adjustment section 250 can adjust the section of the above combination candidate or the change in communication request between at least two users participating in the above communication.

The call/connection control section 160 sets and releases a call/connection based on the selection of the user in the above user intention reflection section from the combination candidate for the above media or the combination candidate for terminals. The communication request input section 230, the user intention reflection section 240, the user adjustment section 250, and the communication request changing section 260 provide information to the user through a user I/F (interface) available for at least one terminal used by the user, and receive an input from the user.

For example, the user I/F is constructed by a screen, a keyboard, and a mouse of a personal computer, a work station, or a display screen, a dial and a button of a multi-function telephone, or a combination of an earpiece/speaker of a normal telephone and a speech recognizing/synthetic function arranged within an exchanger, etc. The above sections are respectively realized by such a user I/F and a function for controlling this user I/F. The control function is substantially a program stored to a computer for control added to the personal computer, the work station, the exchanger, etc. and executed in this computer.

Figure 18:
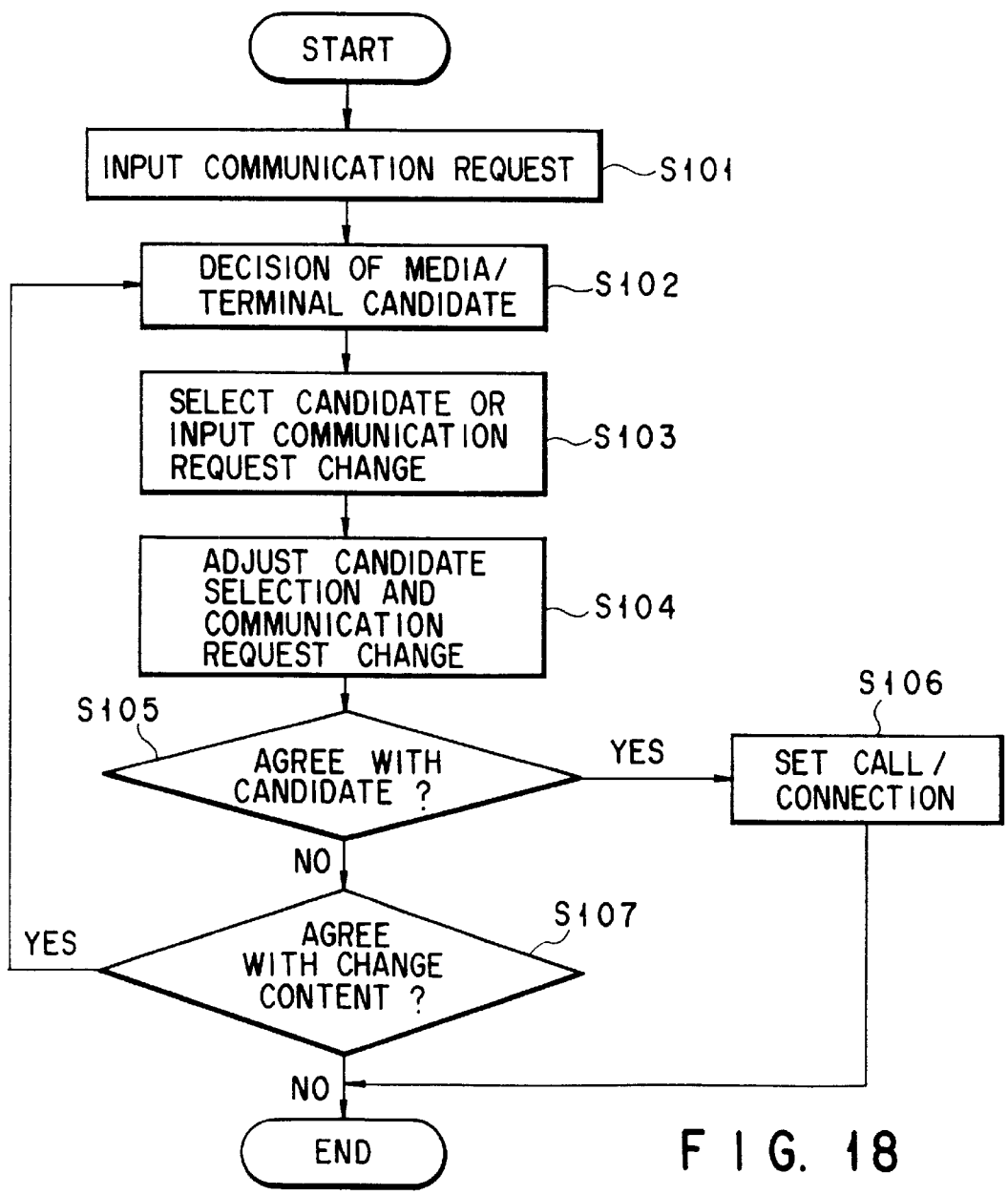
FIG. 18 is a flow chart illustrating processing performed in the simplified second embodiment of FIG. 17.

FIG. 18 is a flow chart showing processing of the communication system in the present invention.

The following explanation will be made with reference to this figure. In a step S101, an input of a communication request including information relative to at least one called user and one or more media by a user is received. In a step S102, at least one of a combination of one or more media or media and a media realizing scheme and a combination of one or more terminals, which are available for each user participating in communication according to the communication request to satisfy at least one portion of the communication request, is determined as one or plural sets of candidates. Next, the above determined at least one of the combination candidate for one or plural media with respect to at least one user participating in the communication, and the combination candidate for terminals is transmitted to this user or a different user participating in the communication. In a step S103, any one of the combination candidates is selected and a selection of the user about an approval of the communication by this combination or a desire of a change in communication request is inputted. In a S104, when a mismatch is caused between the inputs of plural users or there is a possibility of this mismatch, the selection of the above combination candidates or the change in communication request is adjusted between at least two users participating in the above communication. When an agreement between the users is obtained in the candidate selection in a step S105, a call/connection is set on the basis of the agreed terminal combination or media combination in a step S106. When an agreement is obtained with respect to the changed contents of the communication request in a step S107, processing subsequent to the step S102 are again executed.

Such a second embodiment will next be explained further in detail.

FIG. 19 shows the construction of a multimedia communication system in the second embodiment of the present invention.

FIG. 19 shows one example of concrete units corresponding to the sections shown in FIG. 17. Accordingly, another correspondence except for this example can be provided within a range not departing from features of the present invention. FIG. 19 includes constructional elements (a network 120, a media conversion section 171, an available multi-point media processing section 191) relative to transmission of information, conversion, synthesis or separation of the transmitted information in addition to the construction of FIG. 17 mainly describing a control side.

Terminals 101 and 107 are multimedia computer terminals capable of treating an audio object, a video image, a still image and data. Terminals 102 and 105 are computer terminals capable of treating data. Terminals 103, 104 and 106 are visual telephone terminals capable of treating an audio object, a video image and a still image. A terminal 108 is a telephone terminal capable of treating an audio object.

Each of the terminals 101, 105 and 107 among the above terminals has a communication request input section 230, a user intention reflection section 240, a user adjustment section 250, and a communication request changing section 260.

A server device 109 realizes a call/connection control section 160 and a candidate determination section 150. A server unit 110 has an available media information storage section 141 and an available terminal information storage section 131. The available media information storage section 141 stores the above media treatable by each terminal and a state of whether or not each terminal can treat the respective media at that time point (whether required resources are empty or not).

In this communication system, it is assumed that a user a can use terminals 101, 102 and 103, a user b can use terminals 104 and 105, a user c can use terminal 106, and a user d can use terminals 107 and 1108. In this case, the available terminal information storage section 131 stores that the user a can use terminals 101, 102 and 103, the user b can use terminals 104 and 105, the user c can use terminal 106, and the user d can use terminals 107 and 108.

A server unit 111 has a multi-point multimedia processing section 191 and a media conversion section 171. A terminal 112 has a multi-point multimedia processing information storage section 301 and a media conversion storage section 181. The multi-point multimedia processing information storage section 301 stores that the multi-point multimedia processing section 191 is arranged in the server unit 111. The media conversion storage section 181 stores that the media conversion section 171 is arranged in the server unit 111. These server units 109, 110, 111 and 112 may be constructed by terminal units directly used by users, or may be constructed such that one portions of terminal units arranged on a user side are used as servers. Further, these server units 109, 110, 111 and 112 may be constructed by exchangers arranged on a network side or units added to these exchangers.

An operation example of the communication system having such a construction will next be explained. First, for example, an operation example 1 will be explained in a case in which a user a requires a communication with a user b by an audio object, a video image and data.

The operation example 1 will be explained in a case in which a user a requires a communication with a user b by an audio object, a video image and data in a multimedia communication system as a detailed explanation in the second embodiment.

Figure 20:
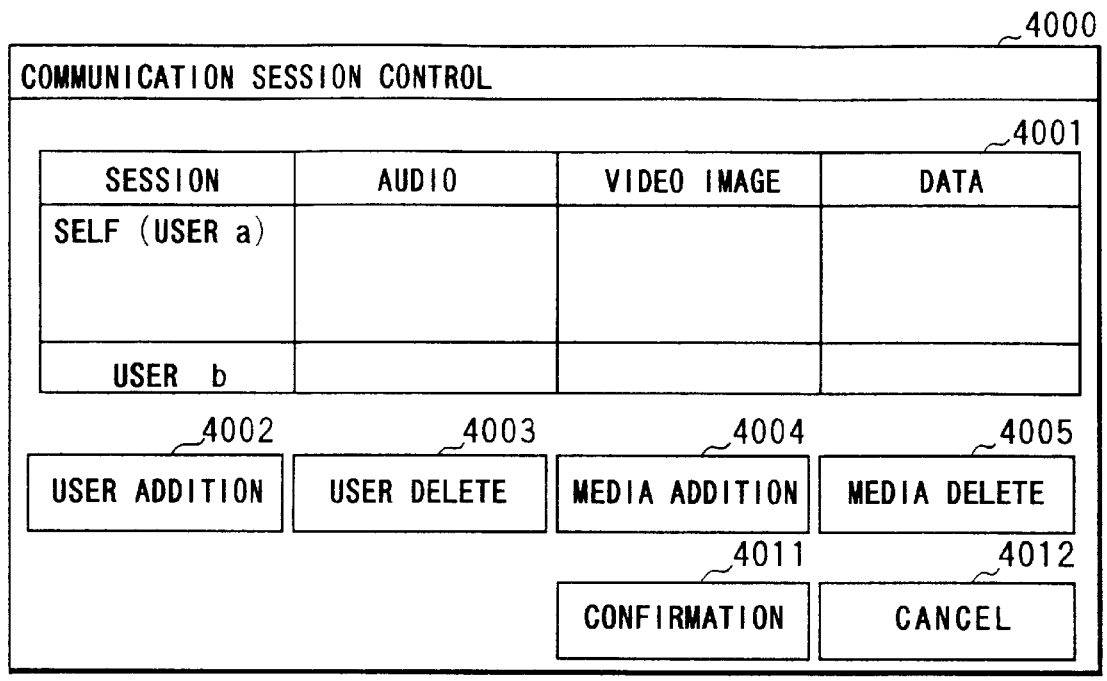
FIG. 20 is a view illustrating a display example of a communication session processing section for a user (a) in the first operation example of the communication system of the invention.

FIG. 20 shows a communication session control screen example shown to the user a at an inputting time of a communication request (S101 in FIG. 18) in this operation example 1. A communication session control screen 4000 as shown in FIG. 20 is displayed on one portion of a display screen of the terminal 101. At this time point, a communication request input section 230 of the terminal 101 is operated and the communication request can be inputted by using this screen. Namely, a user addition button 4002, a user deletion button 4003, a media addition button 4004 and a media deletion button 4005 are displayed on the communication session control screen 4000. For example, the user a can add and delete a user to communicate with by operating the user addition button 4002 and the user deletion button 4003 using a pointing unit such as a mouse, etc. The user a can also add and delete media desiring communication by operating the media addition button 4004 and the media deletion button 4005. Further, a cancel button 4012 for canceling an operation and a confirmation button 4011 for confirming an operation are arranged.

For example, in a concrete procedure, when a button is pushed in addition, a new display for inputting detailed data is shown. In deletion, a button is pushed after an object is designated.

An input situation of such communication requests is displayed in a communication session state control section 4001 on the communication session control screen 4000. FIG. 20 shows a state after all the communication requests in this example are set. The user a can cancel a communication request by the cancel button 4012. However, here, it is assumed that input completion of the communication request is shown by the confirmation button 4011.

The inputted communication request is transmitted to a candidate determination section 150 of the server unit 109. The candidate determination section 150 refers to the available terminal information storage section 131 of the server unit 110, and recognizes that the user a can use the terminals 101, 102 and 103, and the user b can use the terminals 104 and 105.

Next, the candidate determination section 150 of the server unit 109 refers to the available media information storage section 141 of the server unit 110, recognizes that the terminal 101 available for the user a is usable with respect to an audio object, a still image and data; the terminal 102 is usable with respect to data; the terminal 103 is usable with respect to an audio object, a video image or a still image; the terminal 104 available for the user b is usable with respect to an audio object, a video image or a still image; and the terminal 105 is usable with respect to data. Here, the terminal 101 has an ability for treating the video image. However, since resources for realizing this ability are utilized for another object at this time point, it is not recognized that the terminal 101 is usable.

The candidate determination section 150 determines provision of data by the terminal 102 (computer), an audio object and a video image by the terminal 103 (visual telephone), and an audio object and data by the terminal 101 (multimedia computer) as candidates for the user a. The candidate determination section 150 also determines provision of an audio object and a video image by the terminal 104 (visual telephone), and data by the terminal 105 (computer) as candidates for the user b (S102 in FIG. 18).

Figure 21:
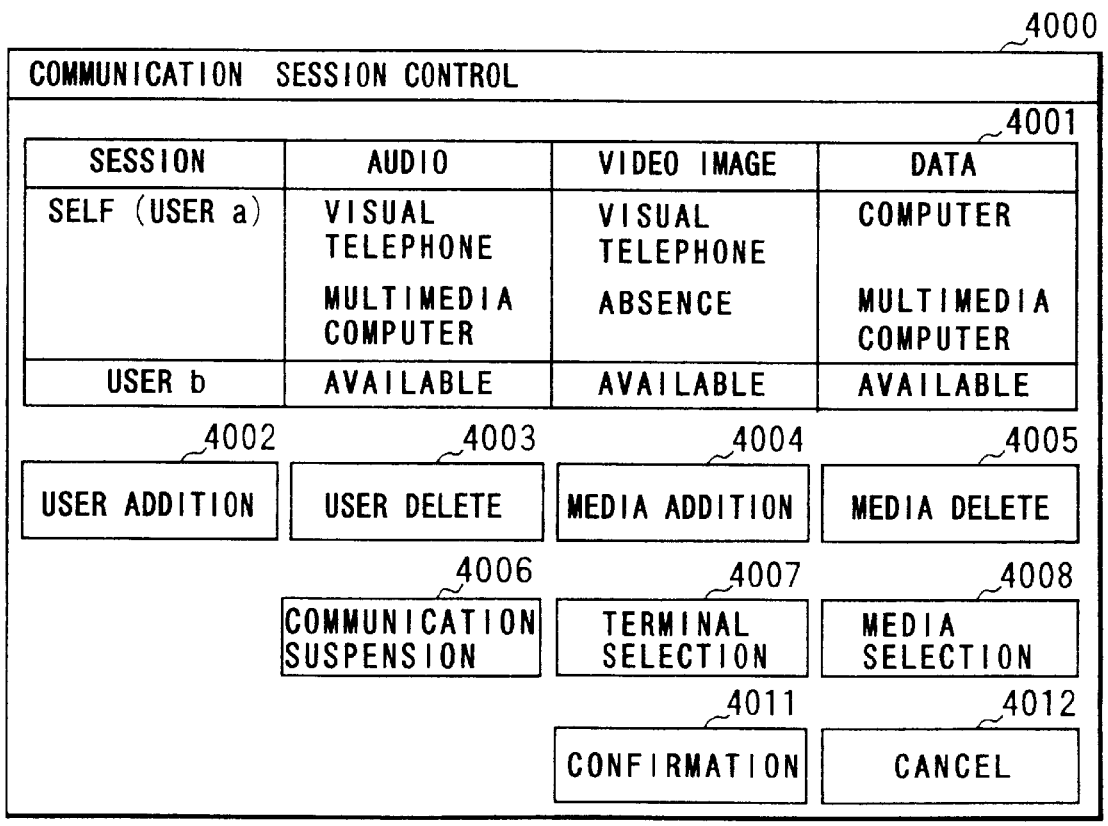
FIG. 21 is a view illustrating a display example of the communication session processing section for the user (a) in the first operation example of the communication system.

FIG. 21 shows the communication session control section 4001 shown to the user a in a candidate selection or at an inputting time of the change in communication request (S101 in FIG. 18) in this example. The communication session control section 4001 is displayed on one portion of the screen of the terminal 101. The communication session control section 4001 is operated as the user intention reflection section 2401 at this time point. The communication session state display section 4001 displays information of a candidate for combination of the above terminals and a candidate for combination of media on a side of the user a obtained from the candidate determination section 150, and also displays a candidate for combination of media on a side of the user b. Terminals transversally arranged are candidates for combinations of terminals. In many cases, it is not so important for the user a to display the candidate for combination of terminals on the user b side. Accordingly, here, only a possibility of the provision of media is displayed, but the candidate for combination of the terminals on the user b side may be also displayed.

It is meaningful in a scenario as shown in this embodiment that only information on the user a side is simply displayed and no information on the user b side is displayed at all. The user a expected that an audio object, a video image and data can be simultaneously treated by the terminal 101 (multimedia computer), but recognizes that this treatment is impossible for some reasons (for example, resources required to treat the video image were utilized for another object at that time point as mentioned above).

The user a can select a combination (visual telephone and computer, or multimedia computer) of terminals shown as a candidate available for himself, or one portion of this combination (only visual telephone from combination-visual telephone and computer-) by the terminal selection button 4007. Further, media (audio object, video image, and/or data) can be selected by the media selection button 4008. When a single terminal provides plural media, only one portion of a terminal and media can be also selected by selecting both the terminal and the media. (For example, when the visual telephone is selected as a terminal and an audio object is selected as media, the TV telephone provides only the audio object.)

It is considered that a communication request with respect to a video image is changed to a communication request with respect to a still image in a certain case since the user a recognizes that it is impossible to communicate in an expected shape. To do this, the video image is deleted by operating the media deletion button 4005 and the still image is added by operating the media addition button 4004. Further, communication can be stopped by operating the communication stoppage button 4006. Namely, the communication session control screen 4000 of FIG. 21 can be also used as an operating screen of the communication request changing section 2601 by displaying the media addition button, the media deletion button, a member addition button, a member deletion button and a communication stoppage button and using these buttons in accordance with necessity. The selection and the change in communication request are canceled by operating the cancel button 4012 and input completion is shown by operating the confirmation button 4011.

In the scenario in this example, it is assumed that there is no input of a user's intention from the user b (no opportunity of the input is provided). Therefore, it is not necessary to adjust the candidate selection and the change in communication request inputted from the user a (S104 in FIG. 18). Accordingly, it is considered that the candidate selection and the change in communication request are immediately agreed (S105 or S107 in FIG. 18). When the candidate is selected, processing is terminated after a call/connection is set (S106 in FIG. 18). When the communication request is changed, the media and the terminal candidate are again determined (S102 in FIG. 18). When the communication is stopped, it is considered that no agreement is obtained so that processing is terminated as it is.

Figure 22:
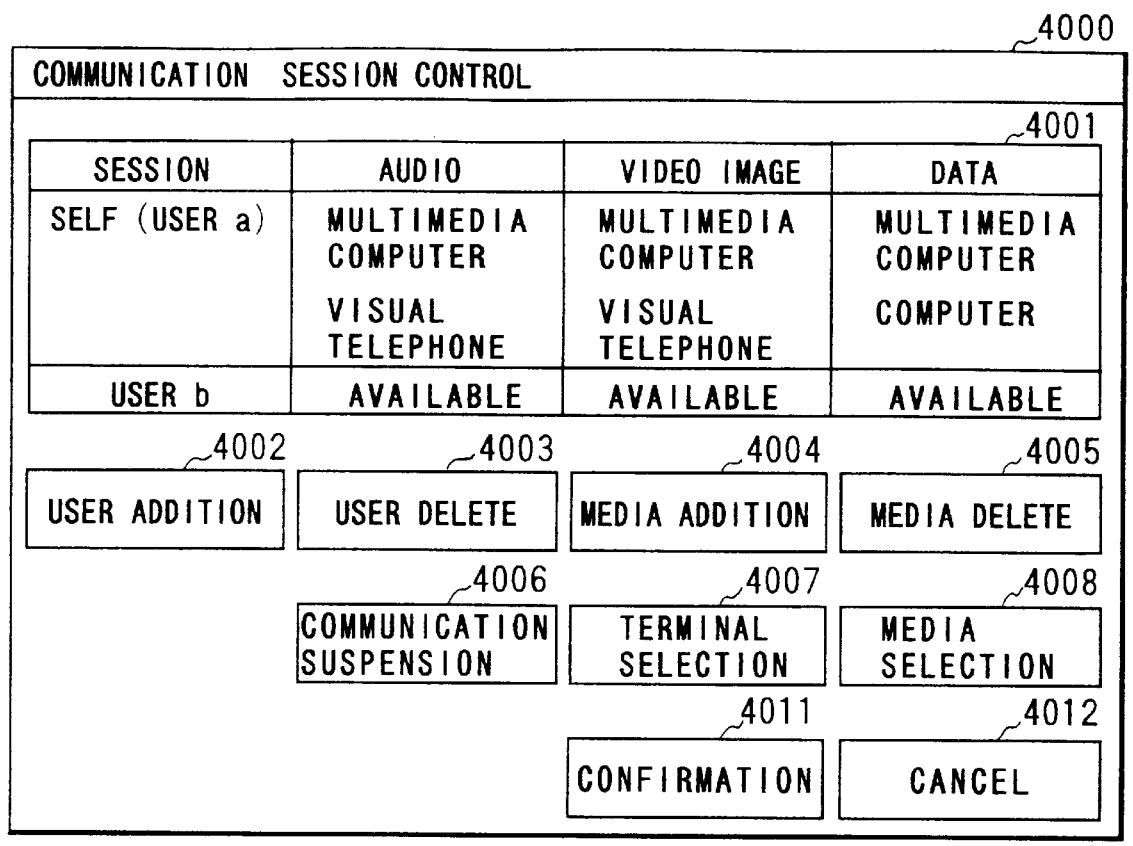
FIG. 22 is a view illustrating a display example of the communication session processing section for the user (a) in the first operation example of the communication system.

FIG. 22 shows a communication session control screen shown to the user in the candidate selection or at an inputting time (S103 in FIG. 18) of the communication request after the communication request is once changed as mentioned above in this operation example. The communication session control screen 4000 as shown in this figure is displayed on one portion of the display screen of the terminal 101. Here, if the user a selects a multimedia computer by the above method, the call/connection is set after the above procedure (S106 in FIG. 18), and communication is started by the multimedia computer. As a result, when communication including a combination of plural media is required without designating a terminal in advance and the plural media of this communication request are realized by a combination of one or plural terminals in the communication system for enabling a multimedia service, it is possible to prevent the communication from being realized in a shape unexpectable by a user by presenting media usable in the communication with a called user and selecting the media by the user. Further, it is possible to realize the communication in a shape reflecting an intention of one or plural users.

The above operation example 1 relates to a case in which the user a requires communication with the user b by an audio object, a video image and data. Next, for example, an operation example 2 will be explained in a case in which the user a requires communication with a user c by an audio object and data.

The operation example 2 relates to a case in which the user a requires communication with a user c by an audio object and data in the multimedia communication system as a more detailed explanation of the second embodiment.

Figure 23:
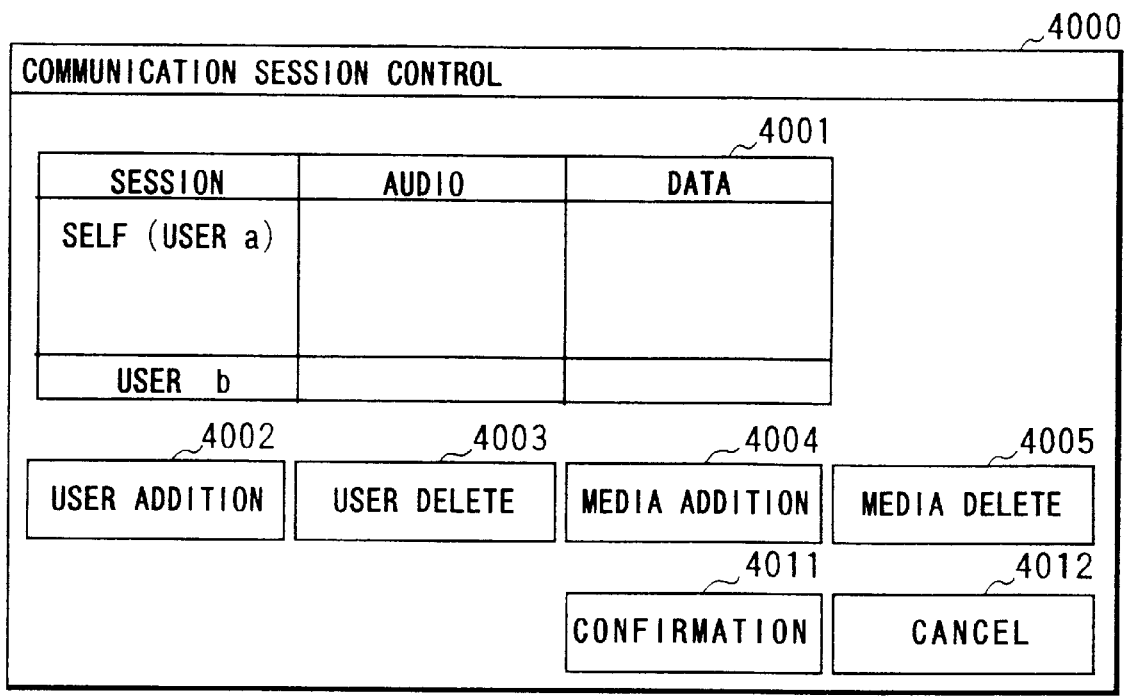
FIG. 23 is a view illustrating a display example of the communication session processing section for the user (a) in the second operation example of the communication system.

FIG. 23 shows an example of the communication session control screen shown to the user a at an inputting time of the communication request (S101 in FIG. 18) in this example. This communication session control screen 4000 is displayed on one portion of the display screen of the terminal 101. At this time point, the terminal 101 is operated as a communication request input section 230 by using this screen. The user a inputs the communication request by a method similar to that in the operation example 1.

FIG. 23 shows a state after all communication requests in this example are set. In the following description, it is assumed that input completion of the communication requests is shown by the confirmation button.

An inputted communication request is transmitted to the candidate determination section 150 of the server unit 109. The candidate determination section 150 refers to the available terminal information storage section 131 of the server unit 110, and recognizes that the user a can use the terminals 101, 102 and 103, and the user c can use the terminal 106. Next, the candidate determination section 150 refers to the available media information storage section 141 of the server unit 110, and recognizes that the terminal 101 available for the user a is usable with respect to an audio object, a video image, a still image and data; the terminal 102 is usable with respect to data; the terminal 103 is usable with respect to an audio object, a video image or a still image; and the terminal 106 available for the user c is usable with respect to an audio object, a video image or a still image. Since the user c cannot treat data from these recognized results, the candidate determination section 150 determines that it is meaningless to provide data on the user a side. Therefore, the candidate determination section 150 determines provision of the audio object by the terminal 101 (multimedia computer) and provision of the audio object by the terminal 103 (visual telephone) for the user a, and provision of the audio object by the terminal 106 (visual telephone) for the user c as candidates. However, it is also shown that data can be provided for the user a by the terminal 101 (multimedia computer) or the terminal 102 (computer)(S102 in FIG. 18).

Figure 24:
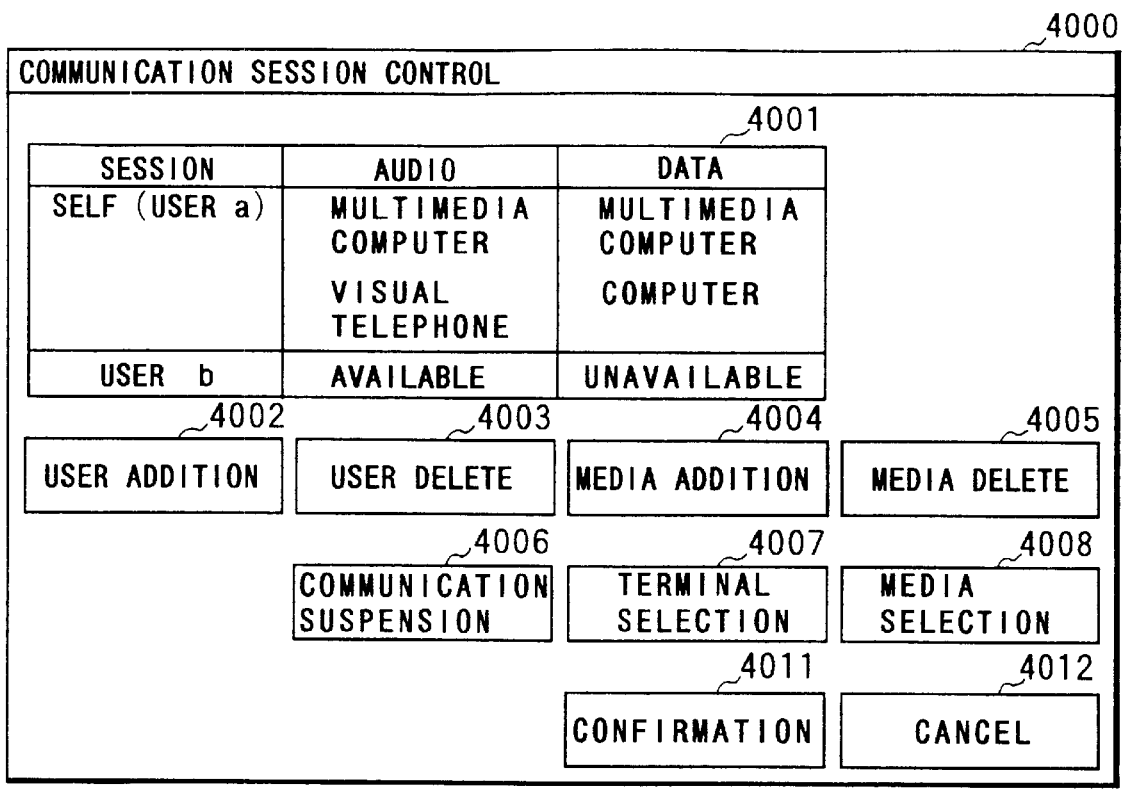
FIG. 24 is a view illustrating a display example of the communication session processing section for the user (a) in the second operation example of the communication system.

FIG. 24 shows a communication session control screen shown to the user a in a candidate selection or at an inputting time of a change in communication request (S101 in FIG. 18) in this example. The communication session control screen 4000 as shown in this figure is displayed on one portion of the display screen of the terminal 101. At this time point, the terminal 101 is operated as the user intention reflection section 2401 by using this screen.

The above operation example 1 lays emphasis on an operation as a result in which the user a obtains information relative to its own media or a terminal candidate. In comparison with this operation example 1, this example as described in the following explanation lays emphasis on an operation as a result in which the user a obtains information relative to media or a terminal candidate with respect to the user c as a called user.

Similar to the above operation example 1, the communication session state display screen 4001 shows candidate information except that terminals on the user a side capable of treating media usable on the user a side but unusable on the user c side are also shown, and information on the user c side is displayed at any time. The user a recognizes that no user c can treat data.

The user a can select only the audio object by the media selection button 4008. When a visual telephone as a terminal of the user c is clearly displayed as an operation for the user c on a called user side of the user a, the visual telephone of the user c can be also selected by the terminal selection button 4007. Further, similar to the operation example 1, the user a can change a communication request with respect to data to a communication request with respect to a still image by operating the media deletion button 4005 and the media addition button 4004, and can stop communication by operating the communication stoppage button 4006. In this case, the communication session control screen 4000 of FIG. 24 is operated as the communication request changing section 2601 by using this communication session control screen. Input completion of the selection or the change in communication request is set to be shown by operating the confirmation button 4011.

In a scenario in this example, it is assumed that there is no input of a user's intention from the user c (no opportunity of the input is provided). Therefore, it is not necessary to adjust the candidate selection and the change in communication request inputted from the user a (S104 in FIG. 18). Accordingly, it is considered that the candidate selection and the change in communication request are immediately agreed (S105 or S107 in FIG. 18). When the candidate is selected, a call/connection is set (S106 in FIG. 18) and processing is then terminated. When the communication request is changed, media and a terminal candidate are again determined (S102 in FIG. 18). When the communication is stopped, it is considered that no agreement is obtained so that processing is terminated as it is.

Figure 25:
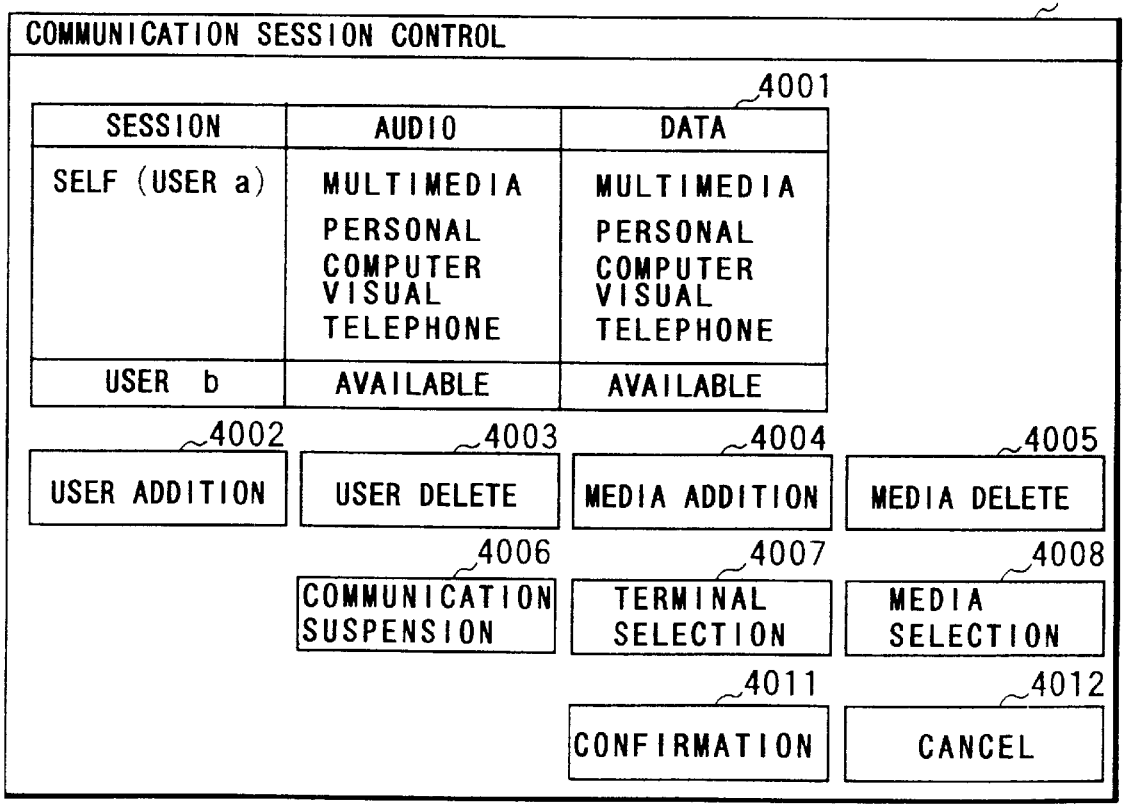
FIG. 25 is a view illustrating a display example of the communication session processing section for the user (a) in the second operation example of the communication system.

FIG. 25 shows an example of the communication session control screen shown to the user a in the candidate selection or at an inputting time (S101 in FIG. 18) of the communication request after the communication request is once changed as mentioned above in this example. The communication session control screen 4000 as shown in this figure is displayed on one portion of the display screen of the terminal 101.

Here, if the user a selects a multimedia computer or a visual telephone as its own terminal by the above method, or selects an audio object and/or a still image as media, a call/connection is set (S106 in FIG. 18) and communication is started after the above procedure. As a result, when communication including a combination of media is required without designating a terminal in advance and the media of this communication request are realized by a combination of one or more terminals in the communication system for enabling a multimedia service, it is possible to prevent the communication from being realized in a shape unexpectable by a user by presenting media usable in the communication with a called user and selecting the media by the user. Further, it is possible to realize the communication in a shape reflecting an intention of one or plural users.

Next, for example, a third operation example will be explained in a case in which the user a requires communication with a user d by an audio object and a video image. This third operation example lays emphasis on reflection of an intention of the called user d and an adjustment between the users a and d.

The user a inputs the above communication request in a method similar to that described in each of the operation examples 1 and 2 (S101 in FIG. 18). The inputted communication request is transmitted to the candidate determination section 150 of the server unit 109. Then, the candidate determination section 150 refers to the available terminal information storage section 131 of the server unit 110, and recognizes that the user a can use the terminals 101, 102 and 103, and the user d can use the terminals 107 and 108. Next, the candidate determination section 150 refers to the available media information storage section 141 of the server unit 110, and recognizes that the terminal 101 available for the user a is usable with respect to an audio object, a video image, a still image and data; the terminal 102 is usable with respect to data; the terminal 103 is usable with respect to an audio object, a video image or a still image; the terminal 107 available for the user d is usable with respect to an audio object, a video image, a still image and data; and the terminal 108 is usable with respect to an audio object. From this recognition, the candidate determination section 150 next determines provision of the audio object and the video image by the terminal 101 (multimedia computer) and the audio object and the video image by the terminal 103 (visual telephone) for the user a, and provision of the audio object and the video image by the terminal 107 (multimedia computer) for the user c as candidates (S102 in FIG. 18).

Similar to the explanation in each of the operation examples 1 and 2, this information is also shown to the user a by the user intention reflection section 2401, but a detailed explanation thereof is omitted. Here, it is assumed that the user a selects communication of the audio object and the video image by the visual telephone.

Figure 26:
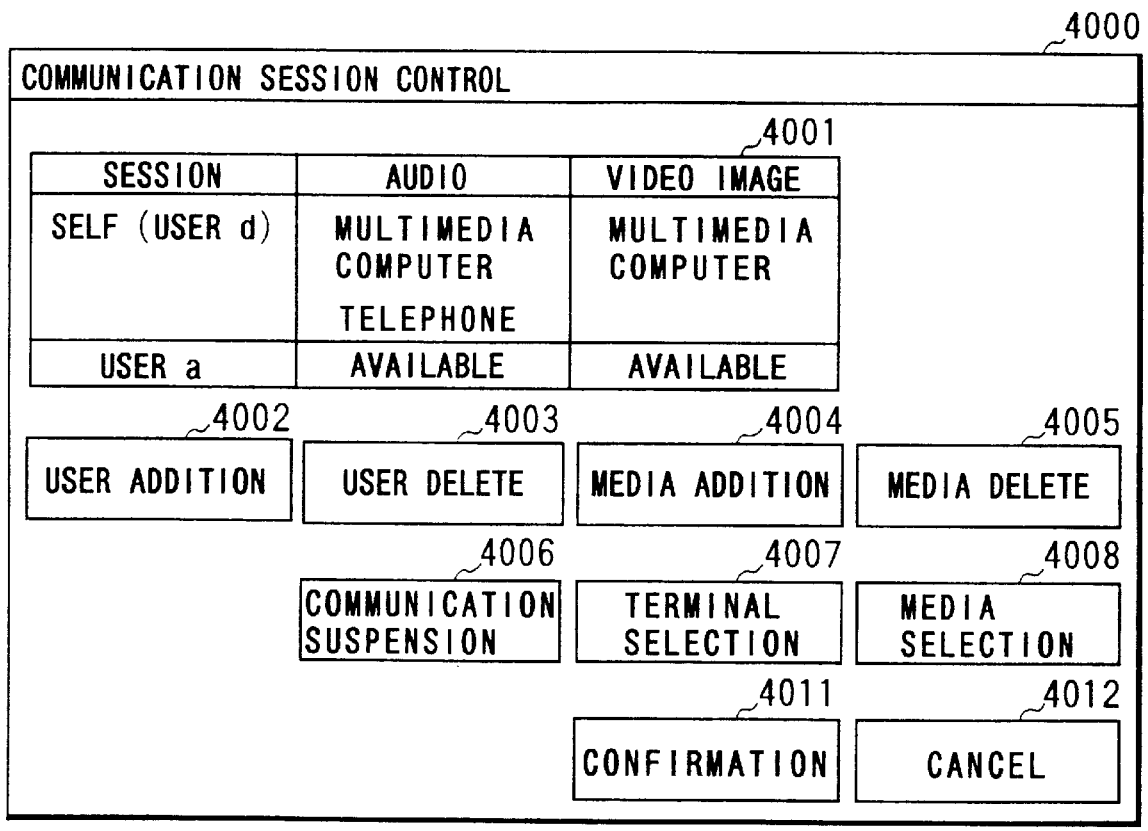
FIG. 26 is a view illustrating a display example of the communication session processing section for a user (d) in the third operation example of the communication system.

FIG. 26 shows an example of the communication session control screen shown to the user d in a candidate selection or at an inputting time of a change in communication request (S103 in FIG. 18) in this example. The communication session control screen 4000 as shown in this figure is displayed on one portion of the display screen of the terminal 107. At this time point, the terminal 107 is operated as the user intention reflection section 2407 by using this screen.

Figure 27:
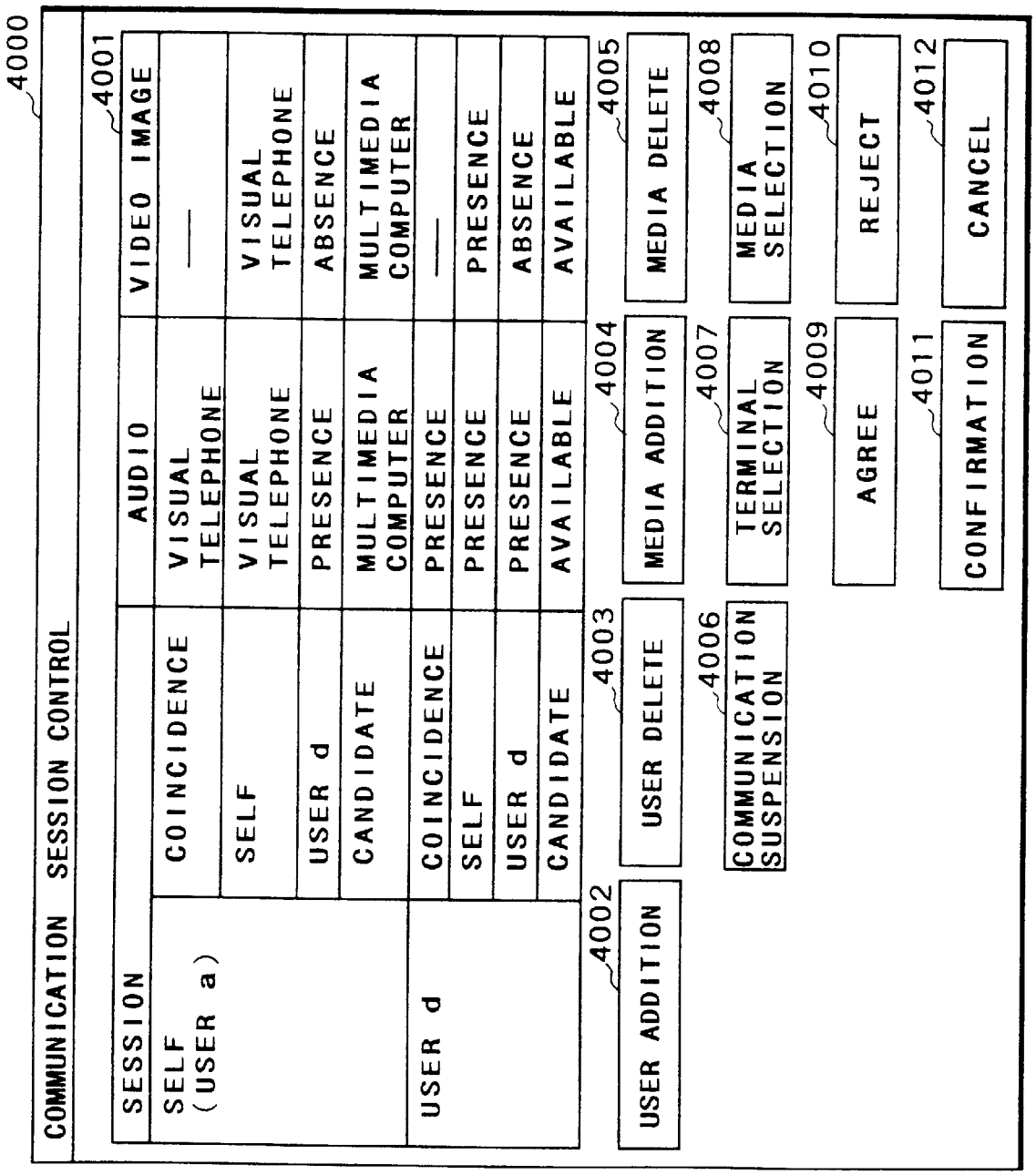
FIG. 27 is a view illustrating a display example of the communication session processing section for the user (a) in the third operation example of the communication system.
Figure 28:
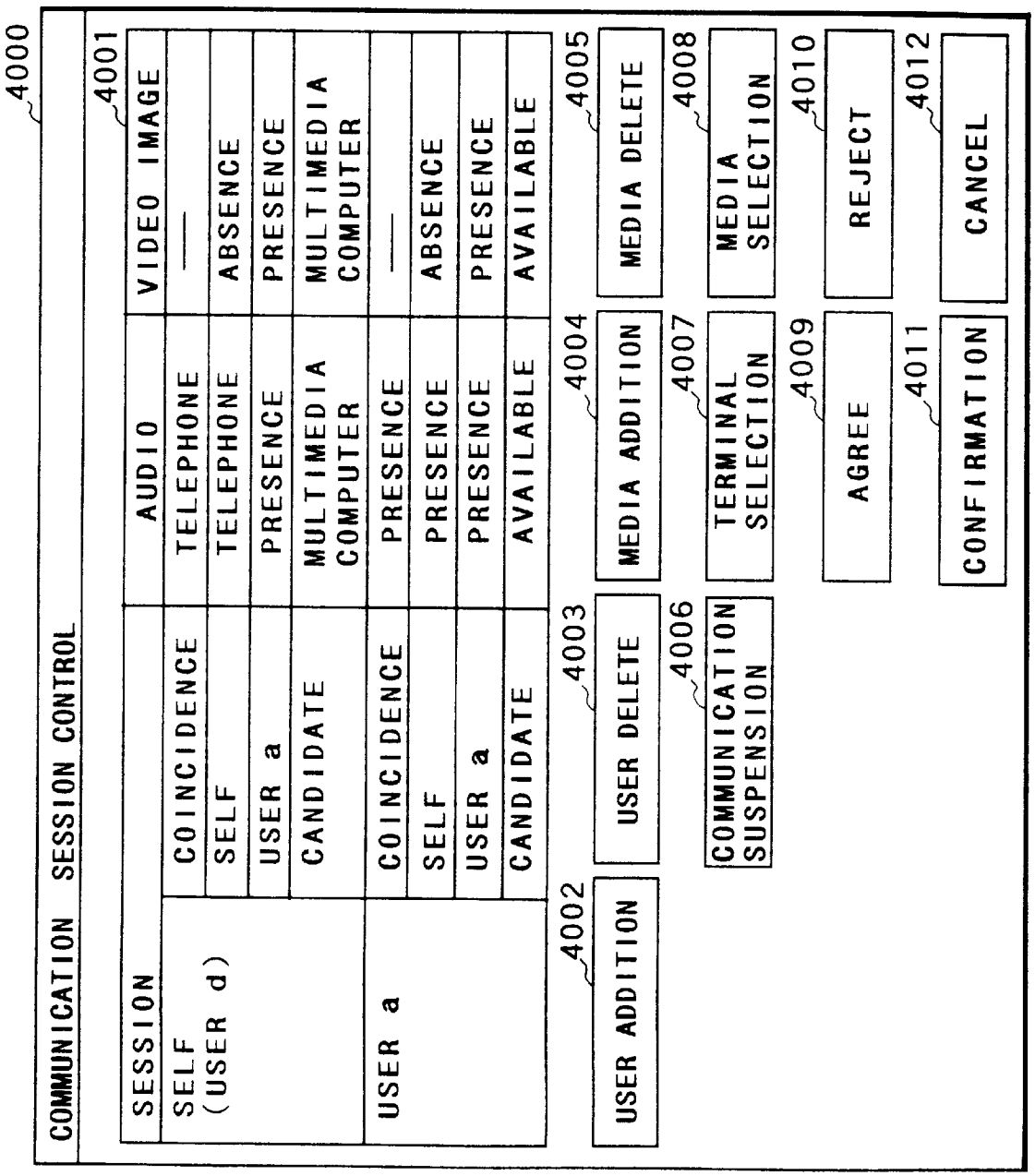
FIG. 28 is a view illustrating a display example of the communication session processing section for the user (d) in the third operation example of the communication system.

If the user a desires communication by the audio object and the video image and the user d selects the multimedia computer by displayed contents of the communication session state display screen 4001, it is recognized that this request can be satisfied. The user d can also select the multimedia computer. However, here, it is assumed that the user d does not desire the communication by the video image at that time point, and selects the telephone by using the terminal selection button 4007 (S103 in FIG. 18). The selected results (the audio object and the video image by the visual telephone) of the user a are transmitted to the user adjustment section 2501 of the terminal 101, and the selected results (the audio object by the telephone) of the user d are transmitted to the user adjustment section 250 of the terminal 107. These two user adjustment sections 250 of the terminals 101 and 107 mutually exchange these results and recognize that no selections between these users a and d agree with each other. The user adjustment section 250 of the terminal 107 presents contents as shown in FIG. 27 to the user a, and the user adjustment section 250 of the terminal 101 presents contents as shown in FIG. 28 to the user d.

With respect to these contents shown in the communication session state display section 4001 in this figure, state displays are further subdivided into "agreement", "self (user a or d)", "called user (user d or a)", and "candidate" for each user. A line of "agreement" shows an agreement portion of opinions between users (i.e., users a and d) relative to the adjustment. A line of "self" shows a request or a selection of a user (user a in FIG. 27, user d in FIG. 28) displayed in this figure. A line of "called user" shows a request or a selection of a called user (user d in FIG. 27, user a in FIG. 28). A line of "candidate" shows a terminal or media presented as a candidate by the candidate determination section 150. The above contents may be displayed except for contents selected by the user.

Figure 29:
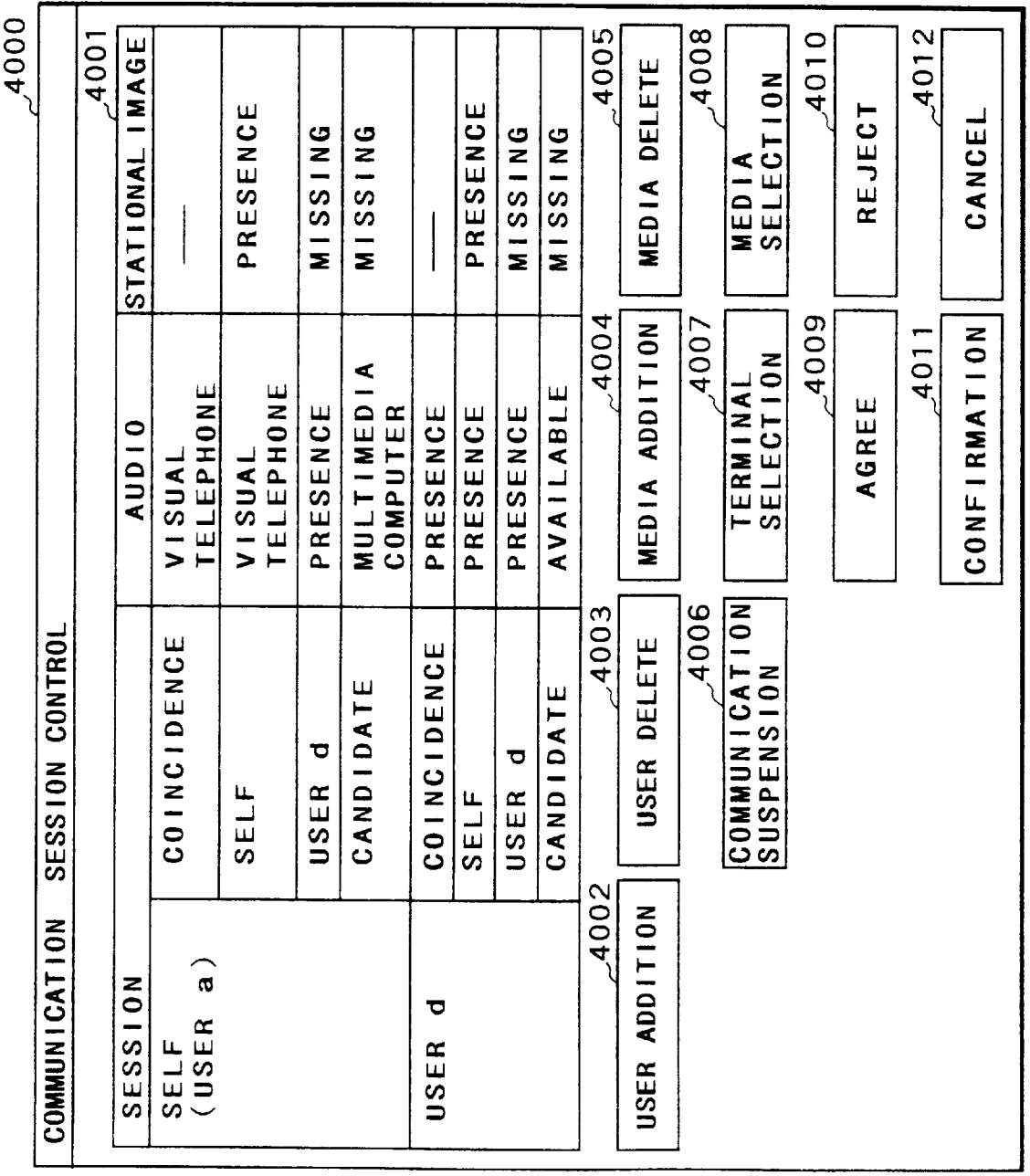
FIG. 29 is a view illustrating a display example of the communication session processing section for the user (a) in the third operation example of the communication system.
Figure 30:
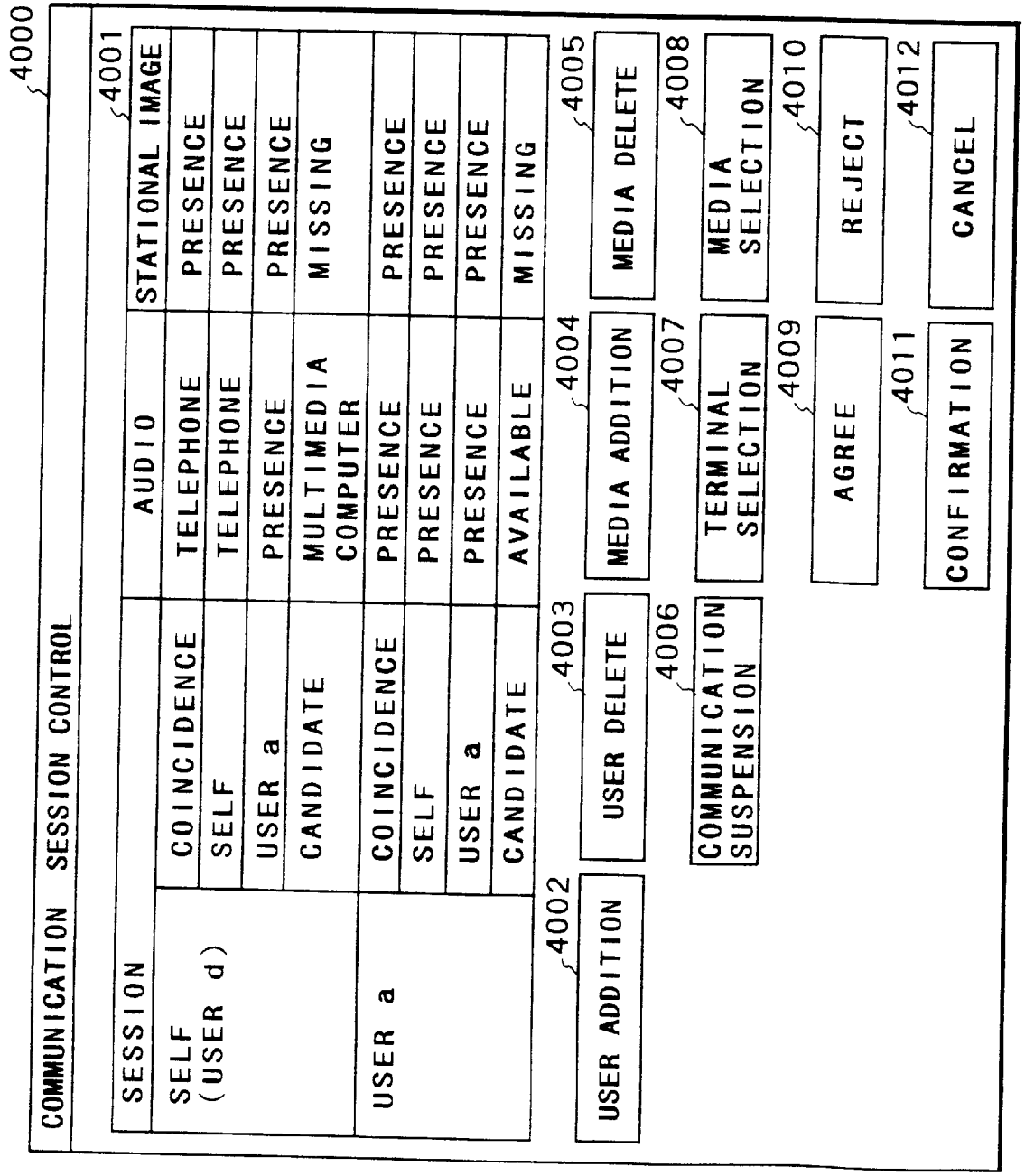
FIG. 30 is a view illustrating a display example of the communication session processing section for the user (d) in the third operation example of the communication system.

In the following description, it is assumed that the user a changes the request of the video image to a request of the still image by the above method already described. As a result of this change, the session control section with respect to the user a is displayed as shown in FIG. 29. Pushing of the confirmation button 4011 means the decision of changed contents. Accordingly, this change is also transmitted from the user adjustment section 250 of the terminal 101 to the user adjustment section 250 of the terminal 107 from this changing time. As a result, the session control screen 4000 with respect to the user d is displayed as shown in FIG. 30. The user d expresses an agreement with respect to this change in communication request by using an agreement button 4009 and a rejection with respect to this change by using a rejection button 4010. The agreement or rejection is transmitted from the user adjustment section 250 of the terminal 107 to the user adjustment section 250 of the terminal 101. In the case of the rejection, it is also possible to simultaneously propose a change in another shape of the communication request. In the following description, it is assumed that the agreement is obtained (S104 in FIG. 18). This adjustment relates to only the users a and d. Since the user d agrees with the proposal of the user a, the user adjustment sections 250 of the terminals 101 and 107 determine that the adjustment is agreed. If this case is further divided, communication contents are changed instead of a change in selection with respect to the proposal of the user a so that it is determined (S107 in FIG. 18) that the changed communication contents are agreed instead of the agreement of a candidate (S105 in FIG. 18).

The changed contents of the communication request may be transmitted to the candidate determination section 150 by the user adjustment section 250 of the terminal 101 or 107. The candidate determination section 150 determines (S102 in FIG. 18) provision of the audio object and the still image by the terminal 101 (multimedia computer) and the audio object and the still image by the terminal 103 (visual telephone) for the user a, and provision of the audio object and the still image by the terminal 107 (multimedia computer) for the user c as candidates by a method similar to the above method.

FIGS. 31 and 32 show examples of the communication session control screen respectively shown to the users a and d in a candidate selection or at an inputting time (S103 in FIG. 18) of the change in communication request after the above candidates are determined. The communication session control screen 4000 is displayed as shown in each of these figures.

Figure 33:
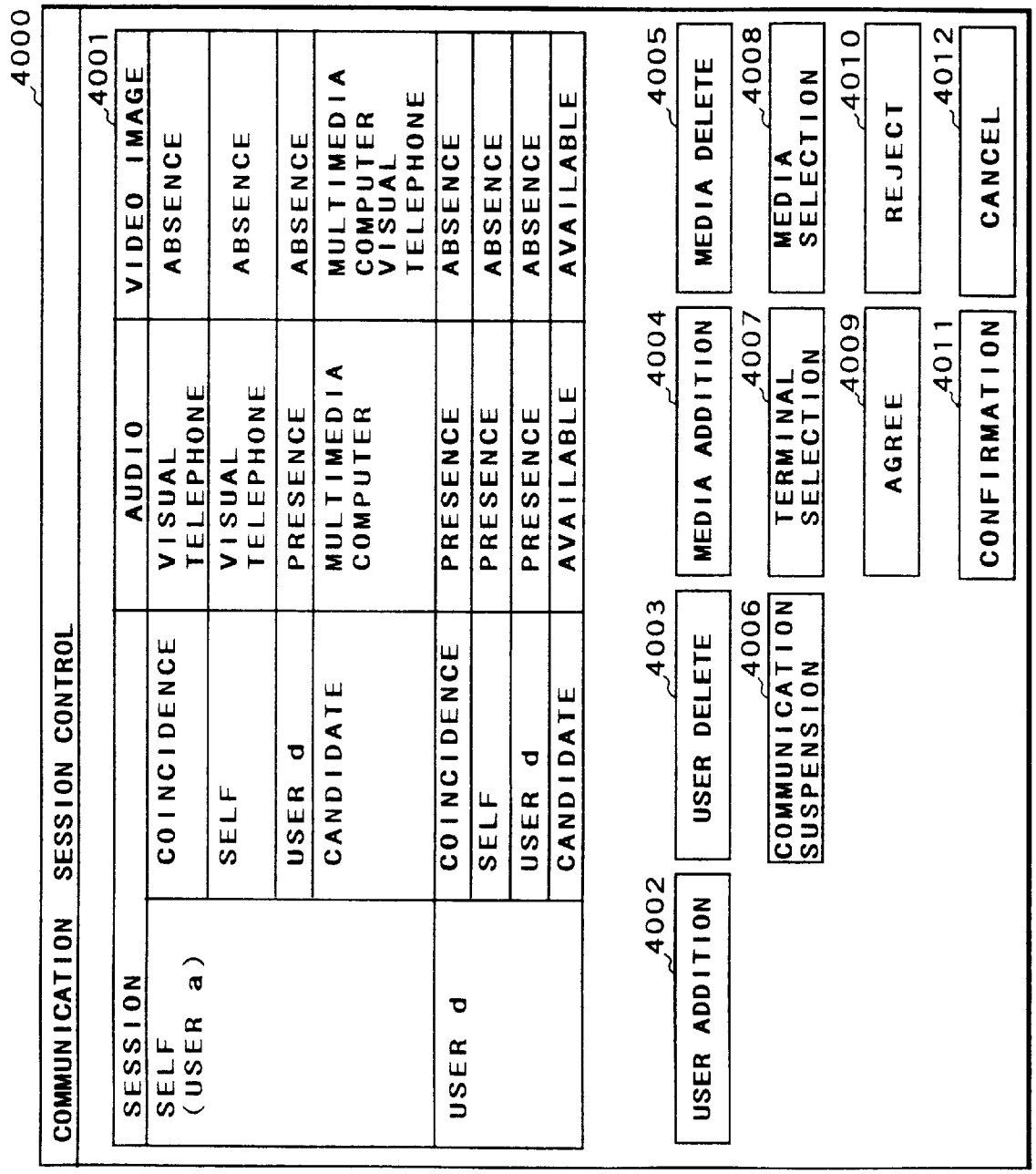
FIG. 33 is a view illustrating a display example of the communication session processing section for the user (d) in the fourth operation example of the communication system.
Figure 34:
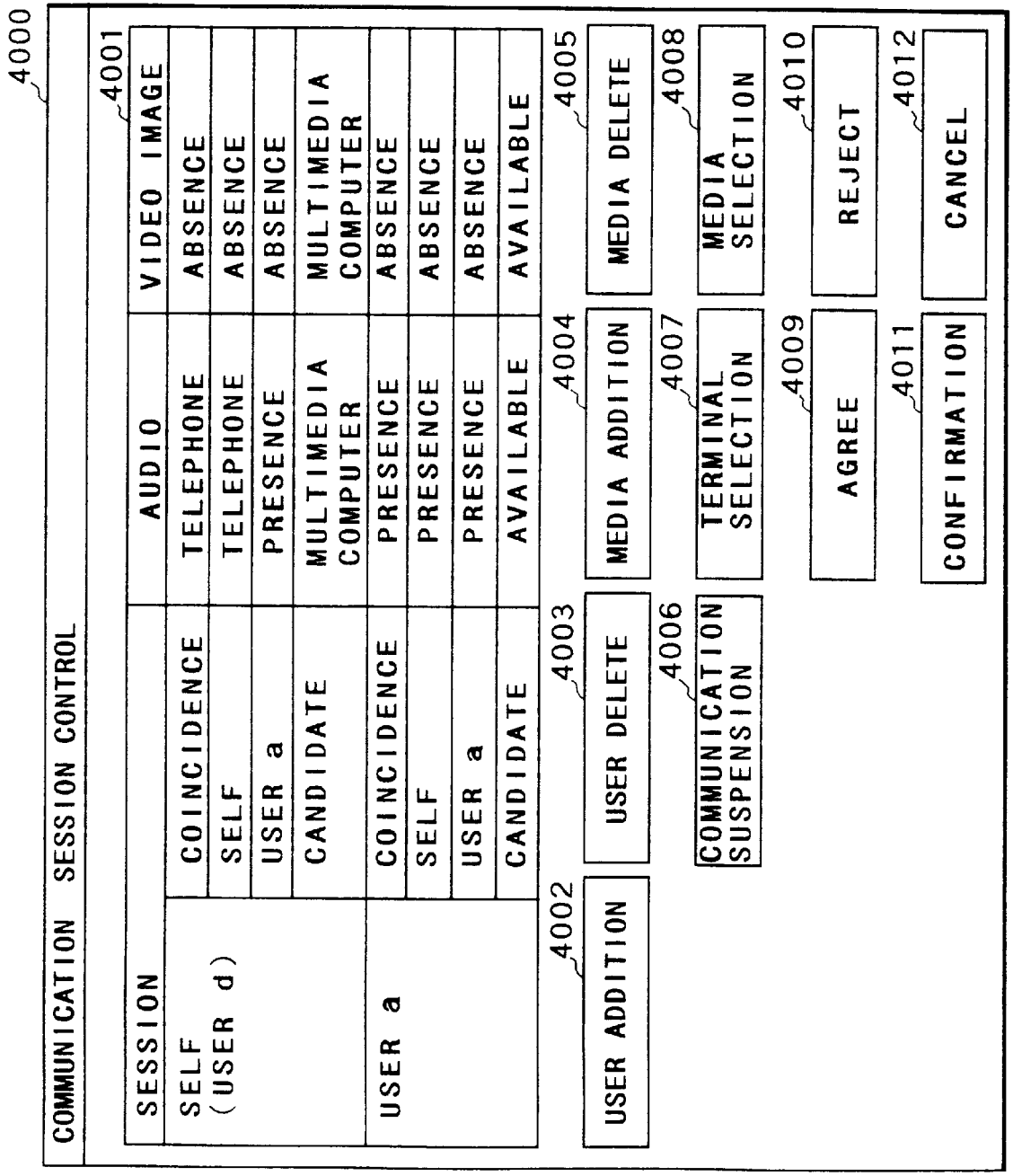
FIG. 34 is a display example of the communication session processing section for the user (a) in the fourth operation example of the communication system.

If the user a selects the visual telephone and the user d selects the multimedia computer (S103 in FIG. 18), both contents agree with each other (S104 and S105 in FIG. 18). Then, a call/connection is set (S106 in FIG. 18) between the terminal 103 (visual telephone) and the terminal 107 (multimedia computer) by the call/connection control section 160, thereby terminating processing. In another case, it is considered that the user a selects the visual telephone as a terminal and only the audio object as media at a time point at which the contents of FIG. 27 are displayed to the user a. As a result of this selection, the session control screen 4000 with respect to the user a is displayed as shown in FIG. 33. Pushing of the confirmation button 4011 means the decision of changed contents. Accordingly, this change is also transmitted from the user adjustment section 250 of the terminal 101 to the user adjustment section 250 of the terminal 107 from this changing time. As a result, the session control screen 4000 with respect to the user d is displayed as shown in FIG. 34. The user d expresses an agreement with respect to this change in communication request by using the agreement button 4009. The agreement is transmitted from the user adjustment section 250 of the terminal 107 to the user adjustment section 250 of the terminal 101 (S104 in FIG. 18). This adjustment relates to only the users a and d. Since the user d agrees with the proposal of the user a, the user adjustment sections 250 of the terminals 101 and 107 determine that the adjustment is agreed. In this case, since the proposal of the user a is a change in selection (S105 in FIG. 18), the call/connection control section 160 sets a call/connection (S106 in FIG. 18) of only the audio object between the visual telephone 103 and the multimedia computer 107, thereby terminating processing. As a result, when communication including a combination of plural media is required without designating a terminal in advance and the plural media of this communication request are realized by a combination of one or more terminals in the communication system for enabling a multimedia service, it is possible to prevent the communication from being realized in a shape unexpectable by a user by presenting media usable in the communication with a called user and selecting the media by the user. Further, it is possible to realize the communication in a shape reflecting an intention of one or more users.

Next, for example, an operation example 4 will be explained in a case in which the user a requires communication with the user d by an audio object and a video image and the user d proposes the addition of a user b in this communication. As explained next, this operation example 4 lays emphasis on a communication request relative to users participating in the communication instead of the communication request associated with media.

Figure 35:
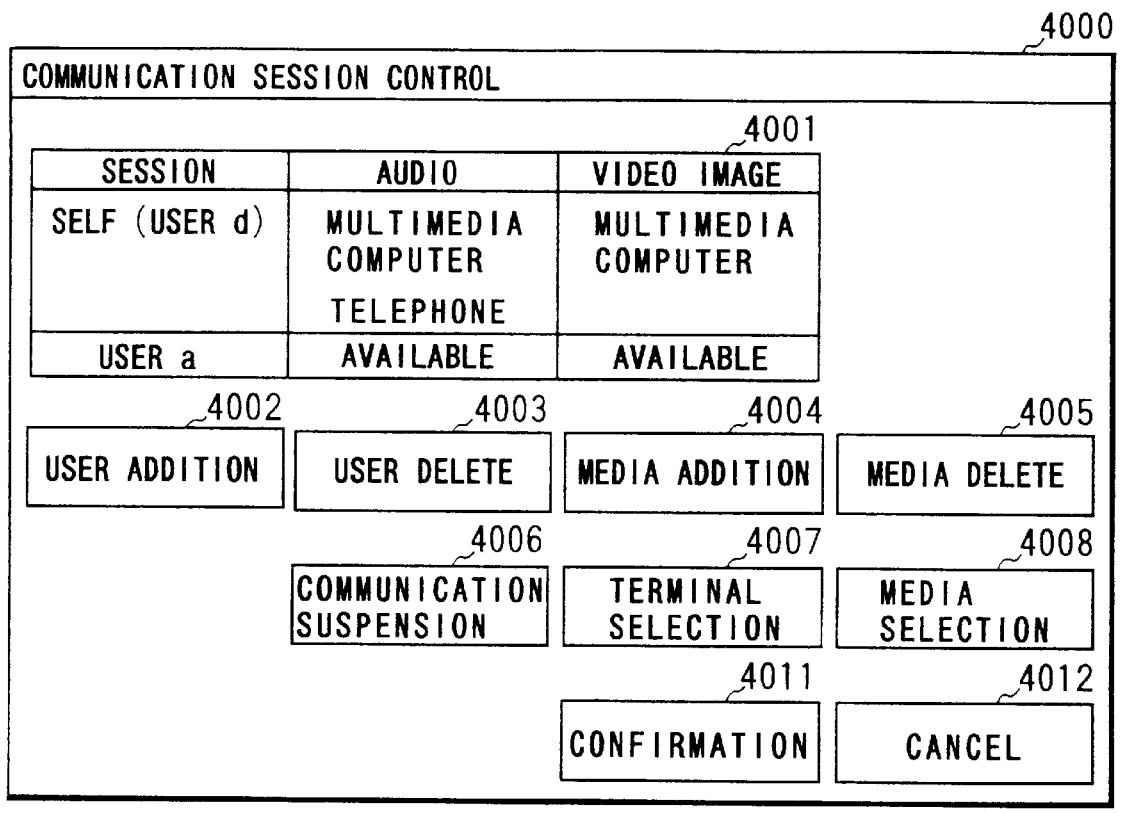
FIG. 35 is a display example of the communication session processing section for the user (d) in the fourth operation example of the communication system.

The steps (S101 and S102 in shown FIG. 18) up to FIG. 35 are identical to those of the example of action 3 described previously with the relevant drawings up to FIG. 26 and will be explained in no more details.

FIG. 35 illustrates a sub-screen of the communications session control viewed by the user d for selection of the choices or entry of the communication demand change mode (S103 of FIG. 18). The communications session control sub-screen 4000 appears locally on the display screen of the terminal 107. This sub-screen allows the terminal 107 to act as the user intention exhibiter 240 of the terminal 107.

Figure 37:
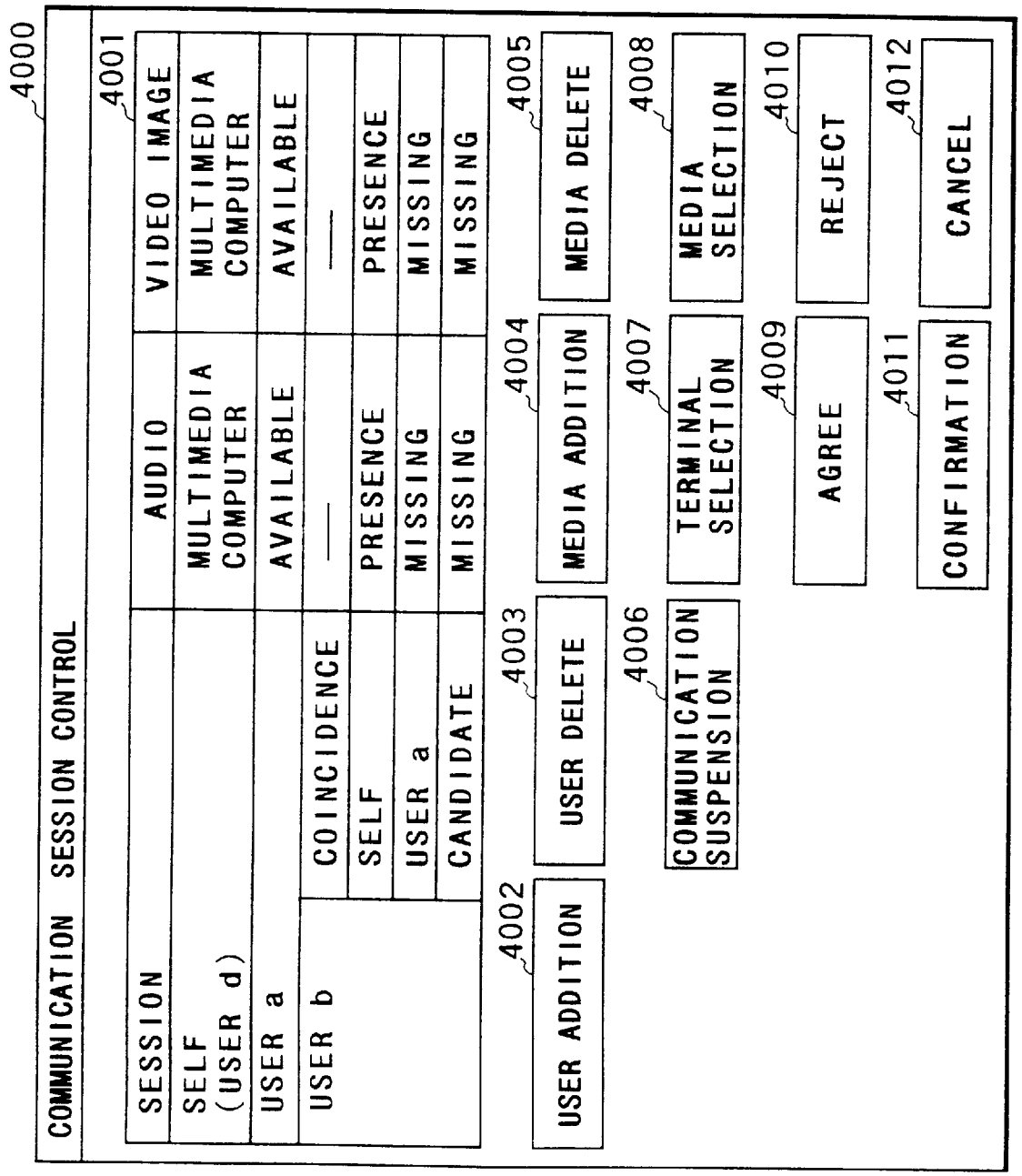
FIG. 37 is a display example of the communication session processing section for the user (d) in the fourth operation example of the communication system.

When the user a requests communication over audio objects and video images, the user d can select the multimedia computer and acknowledge the response to the request through viewing the communications session state section 4001 of the communications session control sub-screen 4000. It is now assumed that the user d demands concurrent communication with the user b as well as the user a over audio objects and video images. In addition to the selection of the multimedia computer, the user d turns on the user addition button-switch 4002 to allow the participation of the user b thus suggesting a change of the communication demand (S103 in FIG. 18). The selection by the user a (audio object and video image on a visual telephone, equal to the example 3) is loaded to the inter-user coordinator 250 of the terminal 101, while the selection by the user d (audio objects and video images on a multimedia computer) and the communication demand change (additional communication with the user b over audio objects and video images) are entered in the inter-user coordinator 250 of the terminal 107. The two inter-user coordinators 250 of the terminals 101 and 107 exchange data of the selection to confirm the conformity between the user a and the user d. More specifically, the user a is informed by the user d having suggested the communication demand change, and the inter-user coordinators 250 of the terminals 101 and 107 enable the users a and d to monitor their respective sub-screens shown in FIGS. 36 and 37.

In this example unlike the example 3, the user a and the user d share their common information and the session state section 4001 allows the information on the user b, introduced by the user d, to be displayed categories such as "conformity, "yourself", "opposite user (d or a)", and "candidate". As the result, the user a acknowledges that the participation of the user b is suggested. When the user a accepts the participation, he presses the acceptance button-switch 4009. If not, the user a activates the rejection button-switch 4010. When the user b is accepted to enter, the "yourself" columns of his category for both the audio objects and the video images in the session state section 4001, shown in FIG. 36, are shifted from N/A to yes. If not accepted, the columns are changed from N/A to no. Either the acceptance or the rejection is transmitted from the inter-user coordinator 250 of the terminal 101 of the user a to the inter-user coordinator 250 of the terminal 107 of the user d.

As the user a has accepted the participation, the opposite user (namely, the user a) columns of the user b category for the audio object and video image in the session state section 4001 at the user d are shifted from N/A to yes. They are turned to no, if the participation of the user a is not accepted. From now on, it should be assumed that the participation has been accepted (S104 in FIG. 18). This steps for the conformity are involved by the two users a and d. After the user a accepts the suggestion of the user d, the user coordinators 250 of the terminals 101 and 107 at both sides determine that the two users are agreed over the participation.

The suggestion of the user d is not a change in the selection but in the communication-related choice. Hence, it is determined that the communication-related choice is agreed (S107 in FIG. 18) but not the candidate (S105 in FIG. 18). The transmission of the communication-related choice to the candidate selector 150 may be done by either the user coordinator 250 of the terminal 101 or 107. The candidate selector 150 then assigns the user b as a candidate for communication with a terminal apparatus 104 (visual telephone) over audio objects and video images and recognizes the multi-user communications between three users. On accessing the available multi-point media processing information storage section 301, the available multi-point media processing section 191 for executing the communications between three users is activated (S102 in FIG. 18).

Although the communication session section 4001 carrying the candidate is exposed to each of the users a, b, and d at the step of the candidate selection or the communication demand change (S103 in FIG. 18), it will be explained in no more detail as its similarity is previously described more than one time.

When the two users a and d remain their selection and the user b accepts the communication with his visual telephone over audio objects and video images (S103 in FIG. 18), the conformity between the three users is established (S104 and S105 in FIG. 18). The call/connection control section 160 builds a call/connection between the terminal apparatus 103 (visual telephone), the terminal 104 (visual telephone), the terminal 107 (multi-media computer), and the available multi-point media processing section 191 and the procedure stops.

If the three users are not agreed, the step of the candidate selection and demand change is repeated (S104 in FIG. 18) by the same manner, of which explanation will be omitted.

Accordingly, in case that the communication of multiple media is carried out with one or more terminal apparatuses regardless of pre-assignment of the type of the terminal apparatus to be used in a multi-media service dedicated communications system, it will be prevented from any interaction which is not expected by the users but take care of the intention of one or more users.

As set forth above, the second embodiment allows the communication of multiple media in the multi-media service dedicated communications system to be demanded and implemented without assigning terminal apparatuses to be used for receiving multiple media with the use of one or more terminal apparatuses by enabling each user to monitor and select from a list of the media appropriate for communication with the other users. The communications system or a method of controlling the communications system is thus provided capable of preventing any undesired communication which is not expected by the user and subjecting the communications to the intention of one or more users.

More particularly, according to the present invention, the user can select a desired combination of terminal apparatuses of different types for communication of multiple media by determining with one single communication demand a number of users to be participated, choices of the media to be used, and if desired, a mode of communication, without concerning the terminal environment of the other users and the application of available coding scheme, and make a call/connection to each of the terminal apparatuses.

Also, when a combination of the multiple media is demanded and used for communication between one or more of the terminal apparatuses without preassigning any of the terminal apparatuses to be used, its undesired transmission which is not expected by the user is prevented but its desired one can be performed while taking care of the intention of one or more of the users.

If a terminal computer wants to acquire a resource (a device handling the media) which is not used but occupied by a careless user, it has to look for other available resources while declining its service or gives up the complete service. In either case, the service will be affected more or less. For example, the resource is occupied by an application program loaded on the terminal computer. It is not unusual that the resource remains occupied as the application program is not closed by the careless user in spite of completion of its use.

Another embodiment will hence be described in the form of a communications system in which unintentional holding of the resource after actual completion of its use is avoided to provide a desired service.

FIG. 38 illustrates the third embodiment of the present invention in which a plurality of computers (personal computers or work stations) 1-1 to 1-n are connected to each other by a communication path 402. Each of the computers 1-1 to 1-n includes an audio input/output (I/O) device which comprises a microphone 408 and a speaker 409, an image pickup device or camera 406, e,g, a television camera or electronic still camera, which serves as an image I/O device, and a display 407.

In this embodiment, the computers and their I/O devices are employed for communication service at a conference.

One of the computers has a service control section 403 provided with a program (referred to as a conferencing application hereinafter) for implementing the communication service and each of them also has a terminal resource management section 404 which comprises a program (referred to as a terminal resource manager hereinafter) for controlling the resources including various I/O devices and a disk drive. In addition, a network resource management section 405 containing a program for controlling the use of bands on the transmission path between the computers (referred to as a network resource manager hereinafter) is installed in a specific computer. A structure of the resource manager is shown in FIG. 39.

As shown, the resource manager comprises a resource usage manager 413 for controlling the use of the resources, a resource request information holder 410 for storing records of how the service controllers request desired ones of the resources respectively, and a request resource availability determining section 411 for determining the busyness of the requested resources. Some of the resources such as audio and video I/O devices may be clear in the condition of busyness and the other such as the network resources may hardly be determined whether it is busy or not busy due to variations in the use of the bands.

It is however possible for the request resource availability determining section 411 to determine that the requested resource is "not busy" when the minimum of not-busy amounts in the uncertain resource measured for a period of time is greater than a margin value attributed to the resource.

In addition to the above mentioned programs, other programs (referred to other applications hereinafter) than the conference dedicated server program are concurrently activated in the computers. The conferencing applications, resource managers, and other applications can be exchanged through the communications path.

Figure 40:
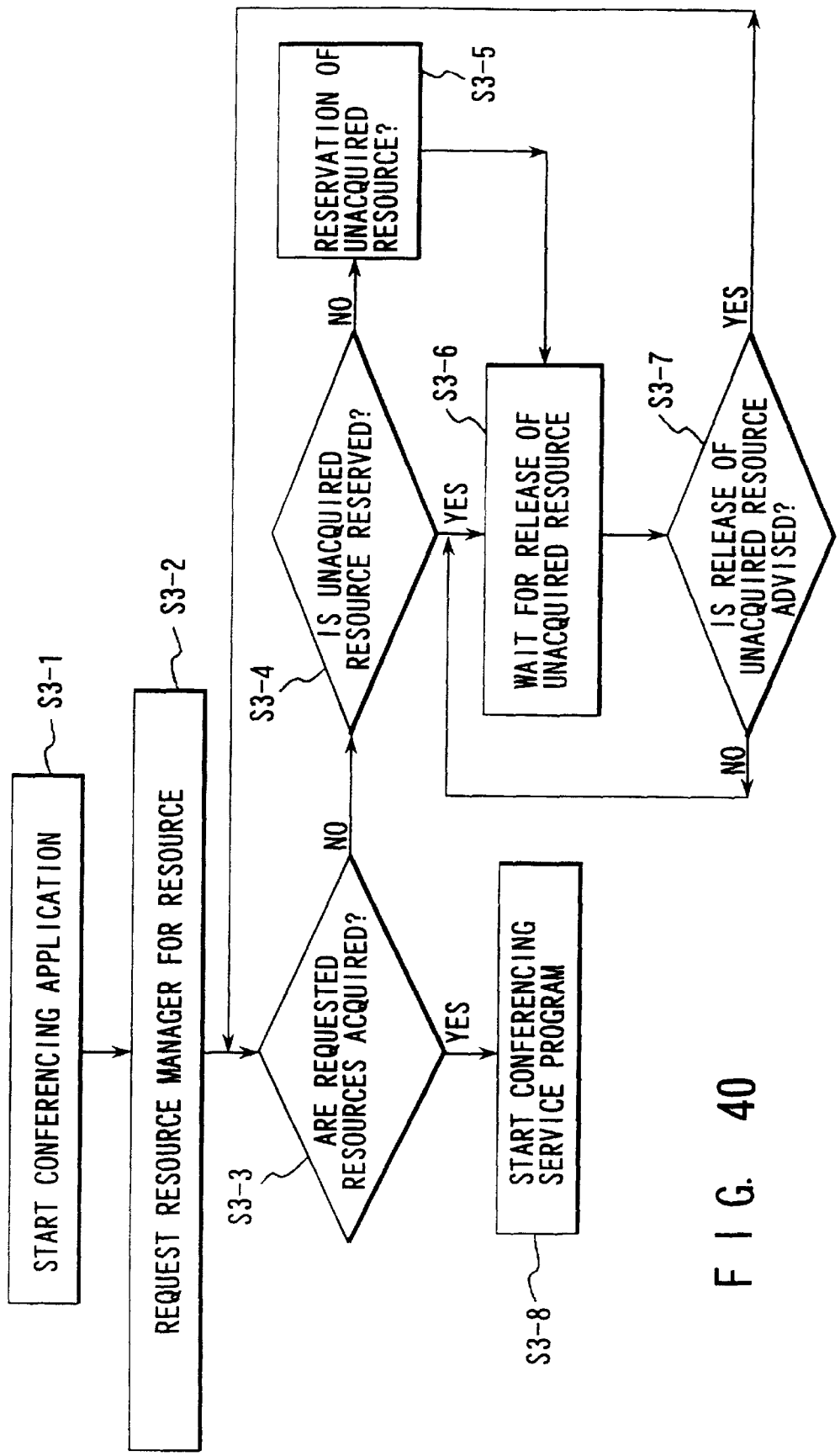
FIG. 40 is a view illustrating a service control section of the third embodiment.

The action of the conference service program will now be explained for demanding the resources. FIG. 40 is a flowchart showing the procedure of acquiring a desired resource with the conferencing application before starting the conference service program.

The flowchart of FIG. 40 is activated with the computers 1-1 to 1-n which are connected to the communications path 2 constituting a computer network or a system for cross communications between the computers 1-1 to 1-n.

The procedure starts with activation of the conferencing application in the service controller of one (a service request originated computer) of the computers 1-1 to 1-n (Step S3-1).

The conferencing application in the service request originated computer inquires of the network resource manager whether or not a band range on the communications path 402 is available for connecting to each other the I/O devices of the computers which are connected to the communications path 402 and participate in the conference. Also, the conferencing application asks the terminal resource manager of each computer about the use of its I/O devices (Step S3-2).

In response, the resource manager stores data of the requested resource in the resource request information storage section 410 and drives the request resource availability determining section 411 to examine the busy condition of the resource stored.

When each of the requested resources is unoccupied and available (i.e. it is judged yes at Step S3-3), the terminal and network resource managers call and operate the resources for driving the conferencing application in the member computers to start the conference service program (Step S3-8). Upon end of the conference, the resource managers set free the resources to close the conference service program.

More detailed description will be made as a principal feature of the present invention, referring to a case in that some or all of the requested resources essential for carrying out the conference service program with the conferencing application are occupied. It is assumed in the first instance that some of the terminal resources requested for the conference service program are not gained as occupied by the other application.

Upon the conferencing application in the service request originated computer being opened (S3-1), the network resource manager 405 is requested for saving a proper band portion of the communications path 402 to exchange audio and video data between the audio and video I/O devices of the member computers (Step S3-2).

The network resource manager then stores the requested resource (containing data of the band and the communications path) in the resource request information storage section 410 and causes the request resource availability determining section 411 to examine the busyness of the communications path related resource of interest.

When it is determined that the resource is not busy, the not busy portion of the communications path is saved for the conferencing application. Also, the conferencing application in the service request originated computer demands the terminal resource manager of each member or participating computer for assigning the audio and video I/O devices.

The terminal resource manager of the participating computer stores data of the assigned terminal resources (of the I/O devices) in its resource request information storage section 410 and demands the request resource availability determining section 411 for examining the busyness of the terminal resources. When the assigned terminal resources are not busy, the terminal resource manager of the participating computer saves the terminal resources for the conferencing application. It is now assumed that the camera in one of the participating computers is being controlled by another program and its resource is determined "busy" (i.e. no is given in Step S3-3).

In this case, the terminal resource manager of the participating computer informs the conferencing application of the service request originated computer that its camera is busy.

The conferencing application of the service request originated computer requires the terminal resource manager to reserve the use of the camera (Step S3-5). The terminal resource manager when the use of the camera is required is monitoring the resources and upon detecting end of the use of the camera, of which data is stored in the resource request information holder 410, saves the camera for the conferencing application in the service control section. This allows the conferencing application of the service request originated computer to control the camera as is informed (i.e. yes is given at Step S3-7).

Accordingly, the conferencing application of the service request originated computer accesses once more the participating computer which failed to save the requested resource when its use is demanded at the beginning and starts the conference service program using the conferencing application and the enabled resources.

Hence, such an unwanted action as the conferencing application attempting desperate control of the camera or the user trying forced starting of the conferencing application will be avoided.

According to the third embodiment, when a particular resource is demanded for use with a desired service program but is occupied, its use is reserved. Upon the resource being unoccupied, the desired service program is started. This prevents the application from attempting desperate control of the resource or the user from operating the application without confirming the availability of the resources. The service will thus favor the users.

As described, the use of a resource has been reserved and upon the resource being not busy, it is available to the application. The disadvantage is that you have to stand by until the resource is unoccupied. In case of emergency use of the service program, the stand-by period should be eliminated. A fourth embodiment of the present invention is intended for overcoming the above disadvantage and will be described in more details.

According to the fourth embodiment, when a desired resource is occupied by one or more service control sections (application programs), a demand for unoccupying the resource is selectively given to the service control sections. This action will be explained referring to a block diagram of FIG. 41.

As shown in FIG. 41, a system of the fourth embodiment comprises computers 1-1 to 1-n (personal computers or workstations) connected to each other by a communications path 402, and audio and video I/O devices (including cameras 406, displays 407, microphones 408, and speakers 409), similar to that of the third embodiment.

One of the computers contains a conferencing application in its service control section 403. Each of the computers includes a terminal resource manager in its terminal resource management section 404. A network resource manager is also installed in a network resource control section 405 of one of the computers. The resource managers are identical to those shown in FIG. 39 of the first embodiment.

The fourth embodiment is differentiated from the third embodiment by the fact that each member computer has a resource requested service controller determining section 412 for, when a desired resource is busy and occupied by more than one of the service control sections (application programs), determining a target service control section to be demanded for unoccupation of the desired resource, and the service control section 403 includes a resource gain/release function and a resource control function in addition to the control functions for performing relevant service programs.

The resource gain/release function is provided for directing upon request the terminal resource management section 404 (terminal resource manager) to save an unoccupied resource or unoccupy the resource to be used. The resource control function examines whether a resource which is demanded for the use shall be to be unoccupied or not and if the unoccupied resource is requested, instructs the resource gain/release function to unoccupy the resource.

The service control section 403 may include the resource requested service controller determining section 412 as well as the resource gain/release function, the resource control function, and the control functions for performing the service programs. The service control section 403 (including application program) with such a modification is shown in FIG. 42. As shown, the service control section 403 comprises the service control resource requested service controller determining section 412, the resource gain/release section 414, the resource control section 415, and the control functions section for performing the service programs.

The resource requested service controller determining section 412 is provided for, when a desired resource is busy and occupied by more than one of the service control sections (application programs), determining a target service control section to be demanded for unoccupation of the desired resource. The resource gain/release section 414 is responsive to a request for directing the terminal resource management section 404 (terminal resource manager) to save an unoccupied resource or unoccupy the resource to be used. The resource control section 415 upon receiving a resource release demand examines whether the demanded resource is to be unoccupied or not and when the unoccupied resource is needed, directs the resource gain/release section 414 to unoccupy the resource.

The service control section 403 contains a function of examining whether the requested resource is to be unoccupied or not when the unoccupied resource is demanded, a function of informing the terminal resource manager that the requested resource has been unoccupied and is not busy, and a function of informing the terminal resource manager that the requested resource has been occupied and is busy. This allows each terminal manager to unoccupy or save the resources according to the information.

The action of the system of the fourth embodiment will now be explained.

It is assumed, similar to the third embodiment, that some of the resources which are essential for executing the conference service program of the conferencing application are occupied by other applications than the conferencing application.

FIG. 43 illustrates a series of steps from the resources available to the conferencing application to the start of a service program.

As shown in FIG. 43, when the conferencing application is activated in the service request originated computer (Step S6-1), its demand of saving the resources required for performing the service program of the conferencing application is loaded via the communications path 402 to the network resource manager and the terminal resource managers of their respective member computers (Step S6-2).

If a terminal resource or camera at one of the member computers is for example busy as occupied by a particular application program and its busyness is detected by the request resource availability determining section 411 of the resource manager (i.e. no is given at Step S6-3), the conferencing application directs the resource requested service control section 412 to identify and demand the particular application using the camera (i.e. the service control section 403 occupying the resource) for unoccupying the camera.

More specifically, the service control section (the particular application) occupying the camera (resource) can be identified by inquiring the terminal resource manager and controlled by the resource requested service control section 412.

In this case, the single application is used to occupy the camera and identified by the resource requested service control sections 412 for demanding its release. The resource (namely, network resource) may be occupied by more than one of applications. This will be described relating to a fifth embodiment.

The service control section (the application program) when demanded for release of the (camera) resource examines whether the resource is to be unoccupied or not. If yes, it unoccupies the resource and informs the release to the terminal resource manager.

When the conferencing application is formed of the release of the resource by the terminal resource manager (yes at Step S6-6), it saves the (camera) resource and performs the conference service program.

To determine whether the requested resource is to be unoccupied or not by the service control section 403, a criteria condition is given as follows:

(i) "A specific quality level of the service predetermined (by the user) stays within a permissive range even if the requested resource is unoccupied." is the condition. In this case, the resource is to be unoccupied when it is determined that the service quality level stays in the permissive range when the resource has been released.

Other conditions may be added that:

(ii) Information of the resource is displayed on the user interface (screen of the computer) for allowing the user to determine whether or not the resource is unoccupied.

(iii) As a group of the applications are ranked due to their priority (defined by the user), they are abandoned in the order of less priority in response to the demand of a higher ranked application.

(iv) The resource is released when no access to the resource occupying application or resource has been made for a given period of time.

(v) The resource is released when its occupation is conditioned (by the user) and terminated by the condition.

As set forth above, a particular resource when requested for use by a service program is recognized and saved by its owner. If the requested resource is occupied, a demand for releasing the resource is given to an application which occupies the resource. In response to the demand, the application examines whether the release is accepted or not. When the release is accepted, the resource is unoccupied and saved for the service program. Accordingly, the service program can be performed anytime without early reservation.

It will now be described in case that the requested resource is occupied by plurality factors (e.g. the communications path being filled with a number of applications and saving no available bands).

FIG. 44 is an explanatory diagram showing a fifth embodiment in which the construction of a system is identical to that of the fourth embodiment. In FIG. 44, a communications path 302 is adapted for a multiplexed arrangement which saves for a plurality of bands. Any unoccupied band can be used for transmission of data to perform a service program.

In this embodiment, a conferencing application (denoted by Meeting 1) is activated on and between a plurality of member computers in the system.

Then, a second conferencing application (denoted by Meeting 2) is inserted in this system of the member computers. It is assumed that while the second conferencing application is enabled with the terminal resources or audio and video I/O devices being saved for, its band (network resource) for transmission of the data is not assigned. The action for overcoming the foregoing condition will be explained.

The network resource manager directs the request resource availability determining section 411 to examine whether a corresponding band on the communications path 402 is available or not. This examination may be carried out according to the procedure described in the third embodiment.

If it is determined that the corresponding band is occupied, the network resource manager drives the resource requested service controller determining section 412 to select most eligible one of the applications occupying the network resources.

For the selection, traffic in the network resource may be monitored for a given period of time and its smallest or absence (other application 2 in FIG. 44) shall be chosen.

The request for releasing the network resource is given to the eligible application which in turn directs the resource release determining section to examine whether the requested network resource is to be unoccupied or not. The subsequent steps are similar to those described in the fourth embodiment.

According to the third to fifth embodiments, when a particular resource required for a master application is occupied by another applications and not available for use in the communication system, it is reserved and utilized upon being unoccupied. More specifically, the master application is informed of the release of the requested resource by either a resource controller managing the use of the requested resource or the application occupying the requested resource so that it readily saves the requested resource. This prevents any desperate attempt of restarting the master application.

Also, according to the present invention, the master application commands the resource holding application directly or via the resource controller for release of the requested resource. Once the request resource has been released, it is captured by the master application which thus needs not to stand by until the resource holding application releases the requested resource according to its own program. This will increase the efficiency of using the resources.

As the result, unwanted operations will be avoided and occupation of the resources will be minimized, hence preventing interruption of the other applications and increasing the level of user service.

In the communication system such as a telephone network, there are provided moderately functioned terminals, each handling one call at a time, and no call is distributed to a plurality of connections. The multimedia communications however allows one single call to be connected to multiple terminals.

A plurality of media signals in the conventional telephone network such as H122 are multiplexed on one connection while the call and connection are controlled simultaneously. One single terminal is allowed to handle one call at a time and reject a second call inserted during communication over the first call while defining that its line is busy. Such a communication system that intends not to concern communication resources applicable to the conventional terminals apparatuses or communication network may hardly be compatible with multimedia communications.

Although the multimedia system employs various types of resources, any conventional communication system fails to control calls and connections in relation to the communication resources applicable in the terminals or communication network. In other words, the availability of a desired resource is recognized only when a call has been made. If the environment of an opposite terminal is not clearly advised, a call to the opposite terminal may often fail. For compensation, a sixth embodiment of the present invention will be described in which a call is matched to a connection under condition of the environment of an opposite terminal.

In this embodiment, there are provided communication resource management units applicable to the terminals and network for managing the communication resources. The communication resource management section is coupled to a call/connection control section which is responsive to data of the communication resources from the communication resource management section for controlling calls and connections.

An action of controlling calls and connections with the call/connection control section in response to the data of the communication resources given from the communication resource management section for managing the communication resources applicable to the terminals and network will be explained according to the sixth embodiment.

The call/connection control section is referred to as a CC control section while a call control block is abbreviated to CCB hereinafter.

FIG. 46 is a schematic hardware diagram of a system showing the sixth embodiment as well as a seventh embodiment which will be described later. As shown, three, A, B, and C, terminals 601, 701, and 801 respectively are connected by a network 501 to each other.

The terminal A 601 has an I/O device comprising a display 602, a speaker 603, and a microphone 604. The terminal B 701 is identical in the construction to the terminal A 601 and includes a display 702, a speaker 703, and a microphone 704.

The terminal C 801 includes a video player 802, a speaker 803, and a microphone 804. The video player 802 plays back a video data which can be supplied in the form of audio and video signals to the network.

FIG. 47 is a schematic diagram of the terminal A 601.

The terminal A 601 has a communication control section 611 through which it is connected to the network. An I/O control section 612 is provided for controlling I/O devices in the terminal A 601. A communication resource management section 613 directs the I/O control section 612 to control the I/O devices and also controls communication resources including a communication band assigned to the terminal A 601. The communication resource management section 614 thus includes a communication resource management table for defining conditions of the resources.

A CC control section 614 controls calls and connections of the terminal A 601. Also, a human machine interface (HMI) control section 615 is provided for controlling the interface between terminal and user.

Those units of the terminal A 601 are connected to each other by a bus 616. Components in the terminal B 701 or C 801 are the same as described.

The action of each section will be explained referring to a flow chart of FIG. 48. In this embodiment, the network is an ATM network system allowing each terminal to use a rate of 3 Mbps for transmission and reception in its environment.

Also, an audio band range is assigned to 1 Mbps for each of transmission and reception and a video band range is 2.5 Mbps for each of transmission and reception. It is assumed that the I/O devices in the terminals are unoccupied at the beginning and the communication resource management tables of the terminals A 601 and C 801 are as illustrated in FIGS. 49A and 49B.

Figure 48A:
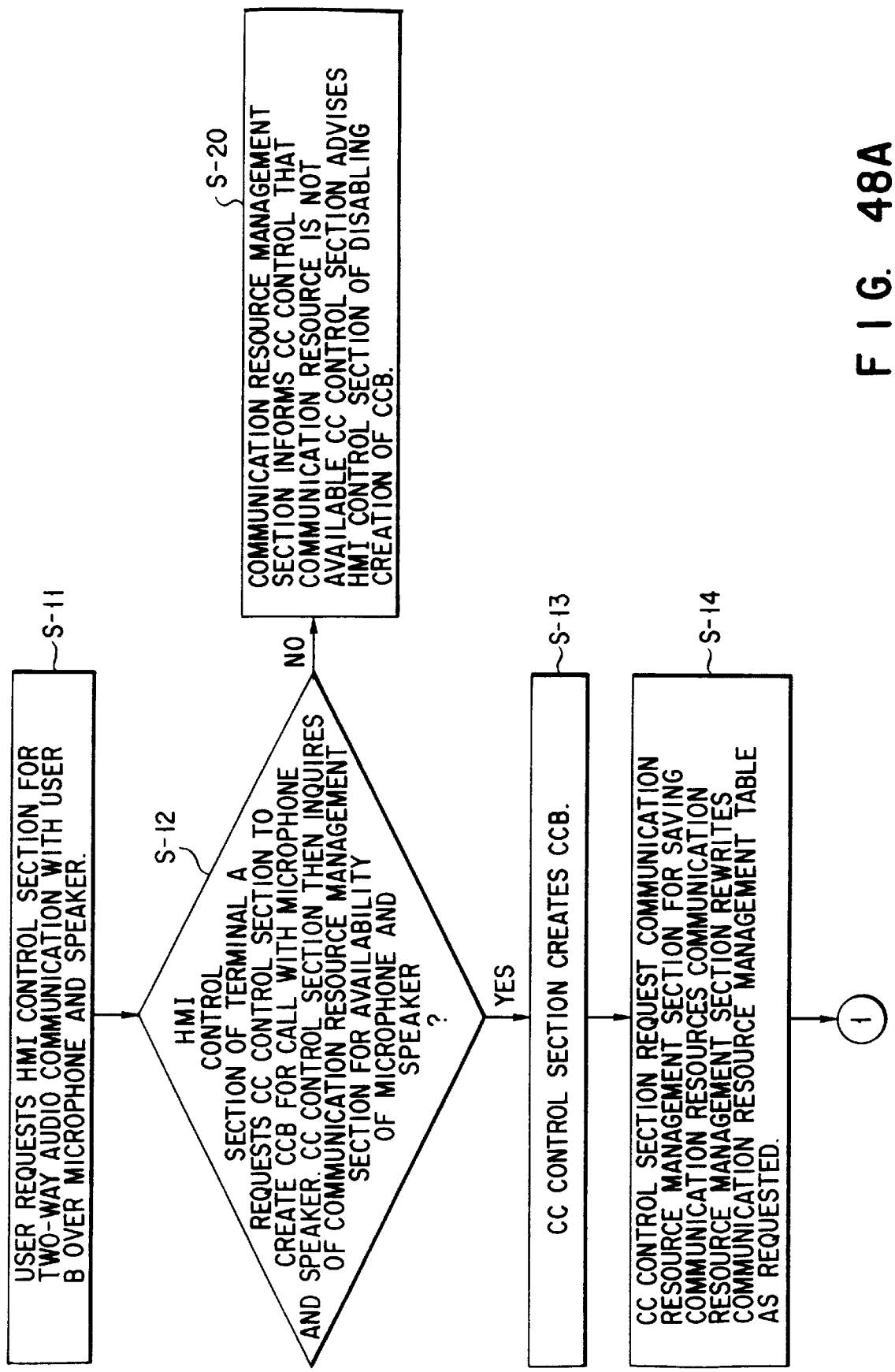
FIGS. 48A and 48B are a flow chart illustrating action of the communication system of the invention.
Figure 48B:
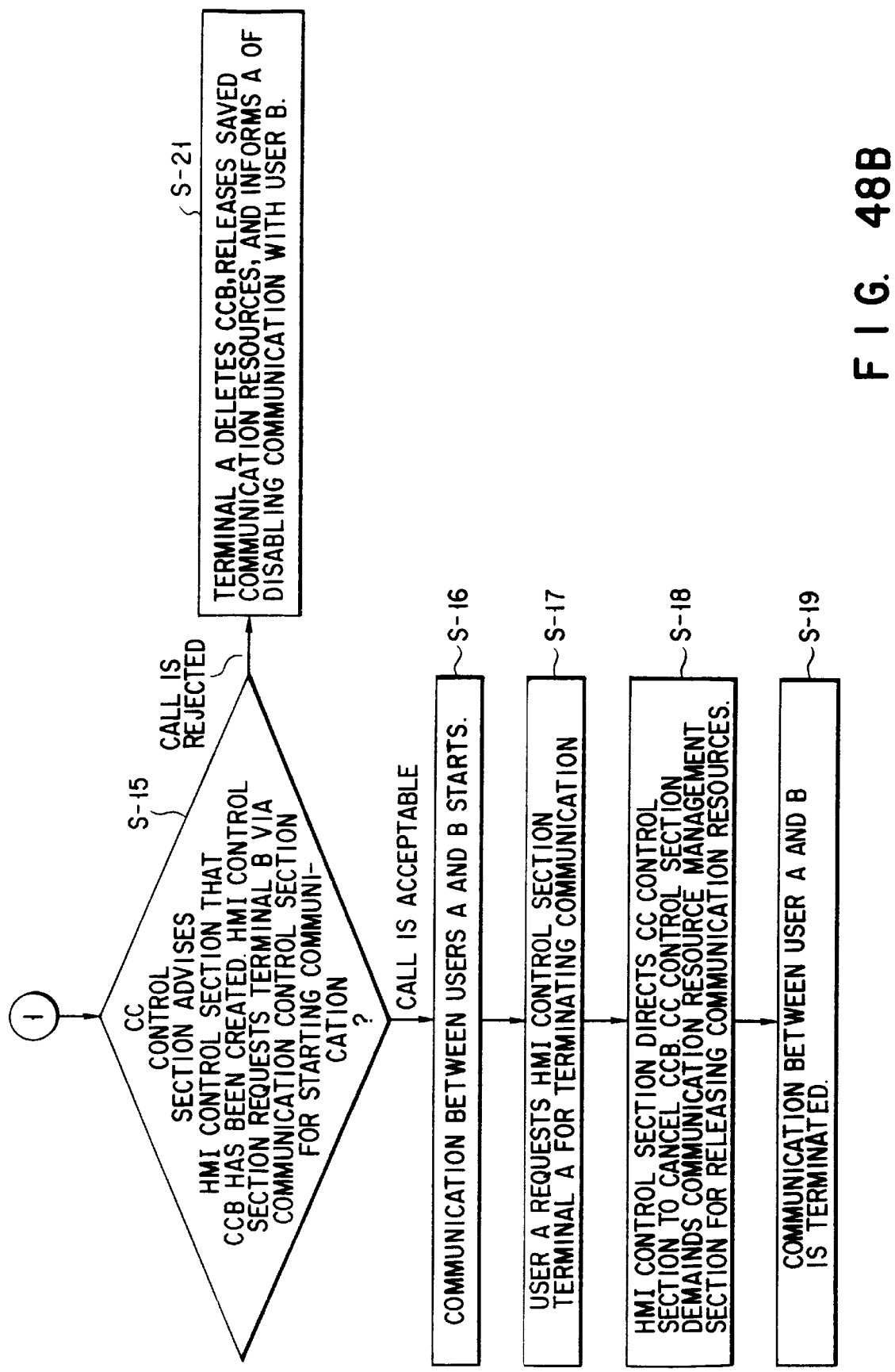

The communication resource management table of the terminal B 701 is identical to that of the terminal A 601 and will be explained in no more details referring to FIGS. 48A and 48B.

Normal Sequence
(Call and connection for communication between terminals)

The flow chart starts with a user of the terminal A 601 (referred to a user A hereinafter and equally defined for users of the terminals B and C) requesting through the HMI control section 615 for two-way audio communication with the user B (with the terminal B 701) over the microphone and speaker (Step S-11).

In response to the request of the user A, the HMI control section 615 of the terminal A 601 directs the CC control section 614 to create a CCB for call with the microphone and speaker. The CC control section 614 upon confirming that a call with the microphone and speaker is required drives the communication resource management section 613 to examine whether or not the microphone and the speaker stand by for use (Step S-12).

If the microphone in the terminal A 601 is deenergized and its communication resource is not used, its non availability is announced to the CC control section 614 by the communication resource management section 615. The CC control section 614 in turn informs the HMI control section 615 of disabling the call. The HMI control section 615 advises the user A that the call to the user B is disabled by the microphone being deenergized (i.e. no at Step S-12).

Returning to the routine, the microphone and the speaker in the terminal A 601 are not unoccupied and their communication band is saved. The communication resource management section 613 informs the CC control section 614 that the communication resources required are available (yes at Step S-12).

The CC control section 614 then creates a CCB for the call (Step S-13).

The CCB is a block essential for controlling the call and having some fields. A format of the CCB is shown in FIG. 50 and the CCB created in the terminal A 601 is illustrated in FIG. 51. It is noted that the format of the CCB displays only fundamental fields related to this embodiment.

The fields in the CCB of FIG. 50 are explained.

Denoted by 901 in FIG. 50 is a call reference field for carrying a call reference or a number assigned to the call identified with the CCB. The call reference is an identifier which is unique and indicative. In this embodiment, the identifier simply identifies the call. Assignment of the call reference may be unspecified and the number of 1 is assigned to each terminal in the embodiment.

A called user field 902 in FIG. 50 carries a data of the opposite terminal to be communicated. Denoted by 903 is a communication resource field allocated to a communication resource used at the opposite terminal.

The CC control section 614 supplies the communication resource management section 613 with data of the call reference number (1 in this embodiment), the opposite terminal to be communicated (terminal B), its communication resources (microphone and speaker), and the request for use of the resources. In response, the communication resource management section 613 in the terminal A 601 modifies the communication resource management table as shown in FIG. 52, and advises the CC control section 614 of the modification of the table (Step S-14). The communication resources are thus saved for use.

Upon being informed of the modification of the table by the communication resource management section 613, the CC control section 614 advises the HMI control section 615 that the CCB has been created. The HMI control section 615 in turn directs the communication control section 611 to send a call for communication to the terminal B 701. The call for starting communication is transmitted from the terminal A 601 to the terminal B 701 (Step S-15).

If the terminal B 701 is not eligible for accepting the call, its communication control section 211 of the terminal B 301 replies to the communication control section 611 of the terminal A 201 expressing that the call is rejected.

The reply from the terminal B 701 is received through the communication control section 611 by the HMI control section 615 of the terminal A 601. The HMI control section 615 of the terminal A 601 then demands the CC control section 614 for canceling the CCB created on request.

The CC control section 614 cancels the CCB and sends the call reference number 1 and the resources defined in the CCB to the communication resource management section 613 of the terminal A 601 for releasing the saved communication resources. In response, the communication resource manager section 613 releases the saved communication resources and advises the CC control section 614 that the release has been done. As the saved communication resources have been released, the communication resource management table in the terminal A 601 is rewritten so that the microphone and the speaker are unoccupied.

As being formed by the communication resource management section 613 that the release is successfully made, the CC control section 614 advises the HMI control section 615 of completion of canceling the CCB. The HMI control section 615 informs the user A that the communication with the user B is rejected (no at Step S-15).

The description now returns to yes at Step S-15.

When the call from the terminal A 601 to the terminal B 701 is accepted, the procedure goes as follows.

When accepting the communication with the terminal A 601 over the microphone and speaker, the terminal B 701 creates a corresponding CCB carrying the call reference number 1 in the prescribed manner and replies the terminal A 601. As the communication control section 611 of the terminal A 601 is informed of the acceptance of the call, the communication with the microphone and speaker starts between the user A and the user B (Step S-16).

It should be noted by now that the CCB and the communication resource management table are common resources in the terminal A 601 and are handled by an exclusive controlling manner. More specifically, the CCB and the communication resource management table are controlled by an exclusive technique such as a semaphore method. Therefore, it would be understood that such a known exclusive technique may be employed in the embodiment.

The procedure goes to end of the communication between the user A and the user B.

When the user A wants to disconnect the communication, he enters the disconnection to inform the HMI control section 615 of its terminal A 601 (Step S-17).

The HMI control section 615 then directs the communication control section 611 to disconnect the connection to the terminal B 701 and also demands the CC control section 614 of the terminal A 601 for canceling the CCB with the call reference number 1.

In response, the CC control section 614 of the terminal A 601 deletes the CCB with the call reference number 1 and directs the communication resource management section 613 to release the communication resources identified with the call reference number 1.

The communication resources identified with the call reference number 1 can be specified by referring to the CCB.

The communication resource management section 613 releases the saved communication resources and advises the CC control section 614 of the release. As being informed of the release of the saved communication resource, the CC control section 614 of the terminal A 601 cancels the CCB and informs the communication control section 611 that the CCB has been canceled. As the result, the communication between the user A and the user B is ended (step S-18).

A case that a communication resource occupied by the user A has to be released during the communication will now be explained.

The procedure is almost similar to the above. Only a difference is that the CCB is not canceled while the CC control section 614 sends data of the call reference number, the communication resource to be released, and the request for releasing the communication resource to the communication resource management section 613. This procedure may be used for the user A occupying an additional resource during the communication.

As the normal sequence of the steps has been described, another sequence when the communication encounters an interruption will be explained.

Imagine that the two-way communication between the user A and the user B over the microphone and speaker is proceeded with the communication resource management table of the terminal A shown in FIG. 52.

The user C (with the terminal C) intends to play back a video data in the terminal C 801 and transmit it to the user A. The user C then follows the prescribed procedure of the normal sequence to communicate with the user A. The procedure is started with generation of the call reference number and modification of the communication resource management table in the terminal C 801.

The communication control section 613 of the terminal C 801 demands the communication control section 611 of the terminal A 601 for standing by for receiving audio and video data. In response, the communication control section 611 of the terminal A 601 directs the CC control section 614 to create the CCB for a call over the display and speaker.

The CC control section 614 of the terminal A 601 drives the communication resource management section 613 of the terminal A 601 to examine whether the speaker and the display are occupied or not for use. Then, the communication resource management section 613 finds the speaker being occupied through referring to the communication resource management table and informs the CC control section 614 of the occupation.

Accordingly, the CC control section 614 of the terminal A 601 advises the communication control section 611 that creation of the CCB is not disabled. The communication control section 611 of the terminal A 601 then informs the terminal C 801 that the call subjected to the intention (of transmission of the audio and video data) is rejected due to the speaker at the terminal A 601 being occupied. The terminal C 801 is thus informed of the rejection of receiving the audio and video data.

The user C gives up the transmission of the audio and video data but supplies the user A with the video data only.

The terminal C 801 demands its CC control section 614 to establish a CCB for the call involving the use of the display and transmits the call to the terminal A 601 asking if the display is available.

It is apparent that the communication band of each terminal of the embodiment ranges in 3 Mbps, the audio dedicated band is 1 Mbps for either transmission or reception, and the video dedicated band is 2.5 Mbps for either transmission or reception. As the terminal A 601 uses 1 Mbps of the band range for two-way audio communication with the terminal B 701, the remaining range of 2 Mbps only is saved.

However, 2.5 Mbps is needed for transmission of the video data to be reproduced on the display and will hardly be reserved for transmission of the full data.

The communication control section 611 of the terminal A 601 thus advises the terminal C 801 that the reception of the video data is not feasible due to shortage of the band range.

Accordingly, the communication resource management section is operated for controlling the communication resources applicable to the terminal and the network. More particularly, a specific resource required for the communication is identified and examined for its availability by comparing with data of the required resource in the communication resource management section. When the required resource is unoccupied and available, it is used for the communication. If the required resource is occupied and not available, the communication resource management section examines to have a substitute of the occupied resource. When the substitute resource is found, it is used for the communication. Those actions are performed at the stage of starting a call, thus ensuring more practical communications with the optimum use of available resources.

The seventh embodiment of the present invention will be described in which when the communication resource occupied by a lower priority communication is demanded by an emergency or higher priority communication, it is released and saved for use with the higher communication.

Figure 53:
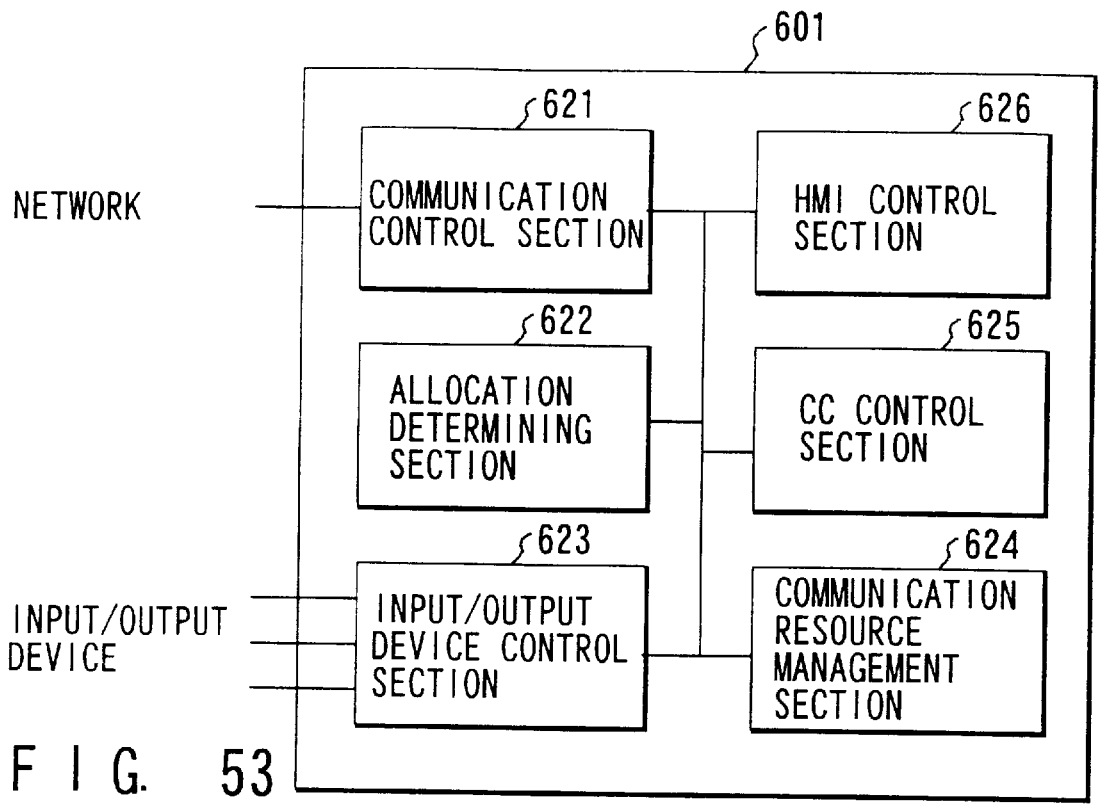
FIG. 53 is a view illustrating a structural example of a terminal used in a communication system of a seventh embodiment of the invention.

As described previously, a hardware arrangement of the seventh embodiment is identical to that of the sixth embodiment including three terminals A, B and C and a network. FIG. 53 is a schematic diagram of the terminal.

As shown in FIG. 53, the terminal 601 has a communication control section 621 connected to the network. An I/O device control section 623 is provided for controlling various I/O devices in the terminal 601. A communication resource management section 624 controls the actions of the I/O devices via the I/O device control section 623 and of relevant communication resources including the band range assigned to the terminal, and has a communication resource management table for defining the resources.

Also, there are provided a CC control section 625 for controlling call and connection of the terminal and an HMI control section 626 for controlling the interface between user and terminal.

So far, the arrangement is equal to that of the sixth embodiment. The seventh embodiment is featured by an allocation determining section 622 in the terminal 601. The allocation determining section 622 is provided for ranking two communications according to a predetermines criteria and allocating available resources at the terminal or network to the communications.

The above components are connected by a bus 627 to each other. The three, A, B, and C, terminals 601, 701, and 801 are identical in the construction.

In this embodiment, the CCB includes an additional field for carrying a priority of the call. In other words, the calls are ranked with data of their respective fields. The priority may be determined as desired. The priority is classified into two ranks, 0 and 1, in this embodiment. The rank 0 is lower than the rank 1.

Although the priority resides in two ranks for ease of the description, it may be ranked in three or more levels depending on the requirements of the system.

Figure 54:
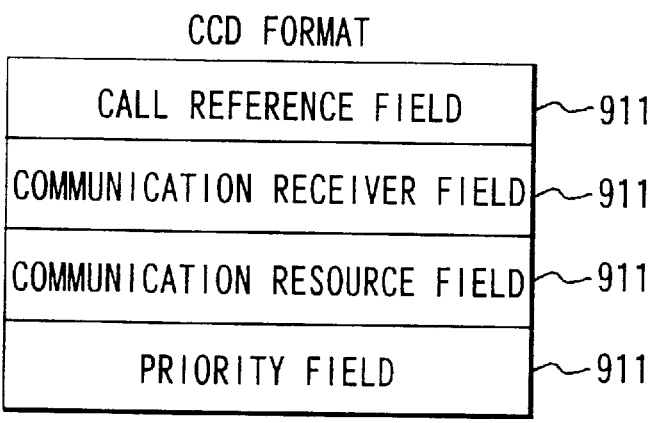
FIG. 54 is a view of a CCB format used in the communication system of the seventh embodiment.

FIG. 54 is a diagram showing a format of the CCB in this embodiment. This format is differentiated from the CCB of the sixth embodiment by a priority field 914 added for defining the priority of the call. It is noted that the priority is based on a term "predetermined criteria" which will be used for the description.

The action will now be explained.

Figure 55:
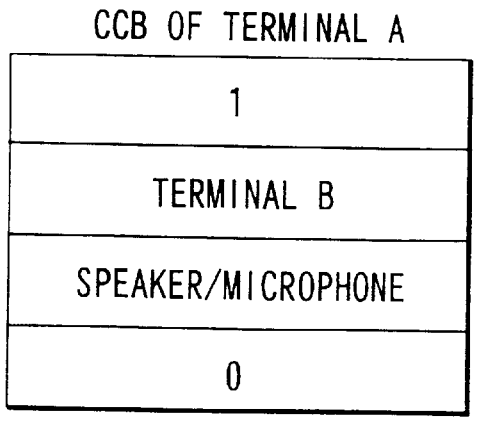
FIG. 55 is a view illustrating a CCB example of a terminal (A) used in the communication system of the seventh embodiment.

As the users A and B are engaged in two-way audio communication with each other, their communication resources are the microphone and the speaker. When their two-way communication is ranked to 0 of the priority, the CCB in the terminal A is as shown in FIG. 55. FIG. 56 shows the communication resource management table of the terminal A for the call.

It is now desired by the user C to produce an emergency call to the user A for two-way audio communication. The user C demands the HMI control section 626 of the terminal (C) 801 for starting the two-way audio communication over the microphone and speaker at the priority of 1.

After the CCB and the resources are enabled, the communication control section 621 of the terminal (C) 801 contacts the communication control section 621 of the terminal (A) 601 for the two-way audio communication at the priority of 1.

The communication control section 621 of the terminal (A) 601 directs the CC control section 625 to prepare the CCB for the two-way audio communication over the microphone and speaker at the priority of 1.

The CC control section 625 then requires the communication resource management section 624 to examine whether the microphone and the speaker are available or not for use. The communication resource management section 624 finds through referring the communication resource management table (FIG. 56) that the microphone and the speaker are occupied by the two-way communication of the call reference number 1 between the user A and the user B.

Accordingly, the communication resource management section 624 informs the CC control section 621 that the required communication resources are occupied by the communication of the call reference number 1 and not available.

The CC control section 621 of the terminal (A) 601 then demands the allocation determining section 622 for proper allocation of the communication resources by comparing the current communication between the two terminals (A) 601 and (B) 701 with the call from the terminal (C) 801 over the predetermined criteria.

The allocation determining section 622 of the terminal (A) 601 identifies the CCB from the call reference number 1 and knows that the priority of the current communication between the two terminals (A) 601 and (B) 701 is 0.

Meanwhile, the allocation determining section 622 is informed by the CC control section 625 of the terminal (A) 601 that the priority of the call from the terminal (C) 801 is 1. The allocation determining section 622 of the terminal (A) 601 determines that the call from the terminal (C) 801 has a higher priority of communication than the current communication between the two terminals (A and B), and demands the CC control section 625 of the terminal (A) 601 for releasing the communication resources which are occupied by the current communication of the call reference number 1 (between the two terminals (A and B)) but required by the priority call from the terminal (C) 801.

In response, the CC control section 625 of the terminal (A) 601 directs the communication resource management section 624 to release the required communication resources for use with the call from the terminal (C) 801. The communication resource management section 624 of the terminal (A) 601 upon receiving the demand from the CC control section 625 releases temporarily the communication resources required by the terminal (C) 801 and advises the CC control section 625 of the terminal (A) that the release is made.

The CC control section 625 informed of the release prepares the CCB for communication with the terminal (C) 801. The preparation of the CCB and the saving of the resources at the terminal (A) 601 are identical to those explained in the sixth embodiment.

In addition, the priority of the call is written in the priority field of the CCB at the time.

As explained, this embodiment allows the call and connection to be executed depending on its priority which is an extra criterion. When a call is inserted during the current communication and demands the use of the communication resources which are being occupied by the current communication, its priority is examined. If the priority of the inserted call is higher than that of the current communication, the required communication resources are released for use with the inserted call. Therefore, the communication resources can effectively be used according to the priority as a higher priority call is served first.

It may be possible to allocate a given number of the communication resources in a desired ratio depending on the criteria convenience of the priority. This allows the inserted call to use some but not all of the required communication resources. On the other hand, the current application in action can also continue its service program.

As the allocation of the communication resources depending on the priority has been explained, another example will be described in which the allocation of the communication resources is determined by the user.

The example is an eighth embodiment of the present invention in which when a call is inserted during the current communication and demands the use of the communication resources which are being occupied by the current communication, the allocation of the communication resource for both the call and the current communication is determined by the user.

Figure 57:
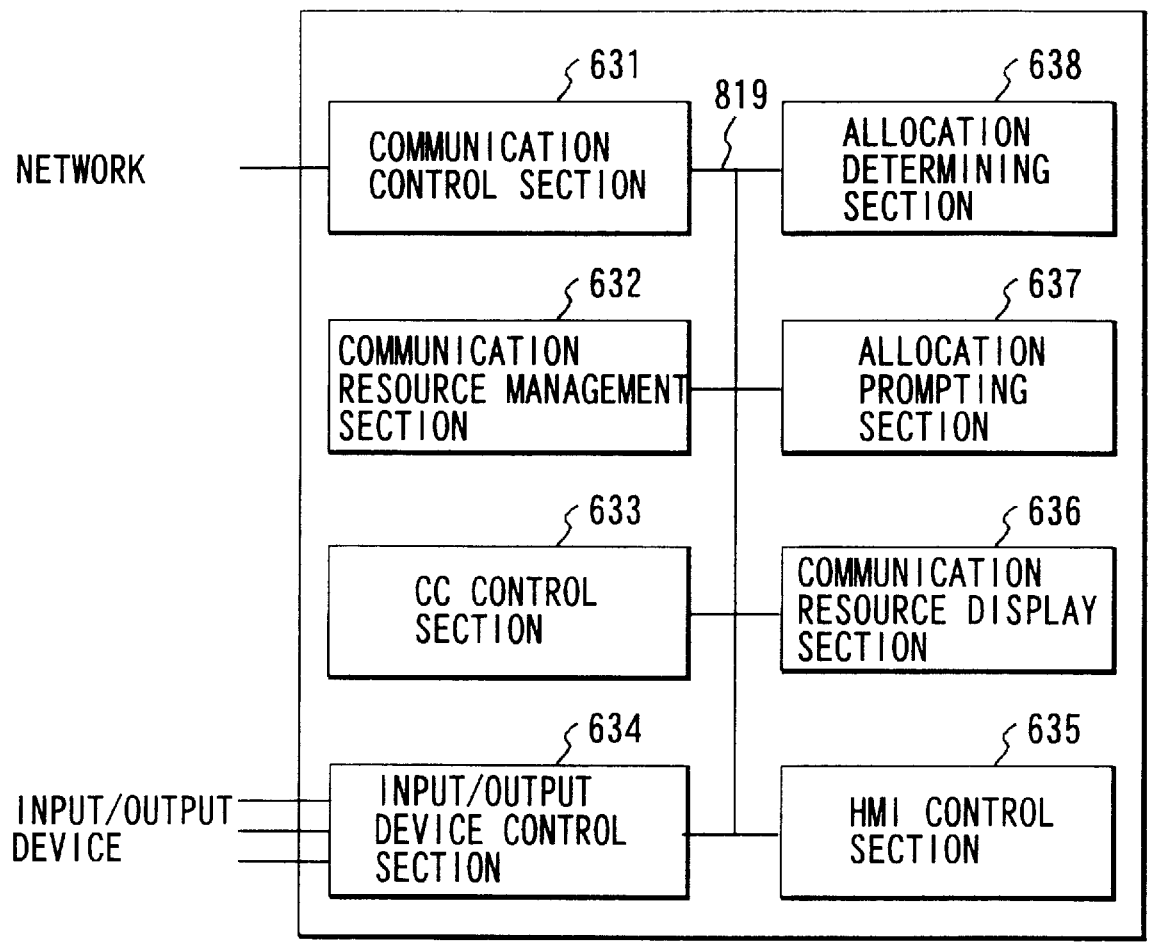
FIG. 57 is a view illustrating a structural example of a terminal used in a communication system of an eighth embodiment of the invention.

A hardware arrangement (including three terminals A, B, and C and a network) and a format of the CCB are identical to those of the fourth embodiment. The terminal arrangement of the eighth embodiment is shown in FIG. 57.

Each terminal is connected by its communication control section 631 to the network. An I/O device control section 634 is provided for controlling various I/O devices in the terminal. A communication resource management section 632 controls the conditions of the I/O devices through the I/O device control section 634 and of the communication resources of the terminal including a communication band range assigned to the terminal, and has a communication resource management table for defining the use of the communication resources.

There are also provided a CC control section 633 for controlling call and connection of the terminal and an HMI control section 626 for controlling the interface between user and terminal. In particular, a communication resource display 636 is provided for displaying the type and use of the communication resources being occupied, the type and use of the communication resources required. The user may determine the allocation of a limited number of the communication resources while monitoring the display of the communication resources.

When the allocation is determined, it is executed by an allocation command section 637. The allocation command section 637 directs an allocation determining section 638 to allocate the communication resources correspondingly. Those components are coupled to each other by a bus 639 in the terminal. The three, A, B, and C terminals 601, 701, and 801 are identical in the construction.

Figure 58:
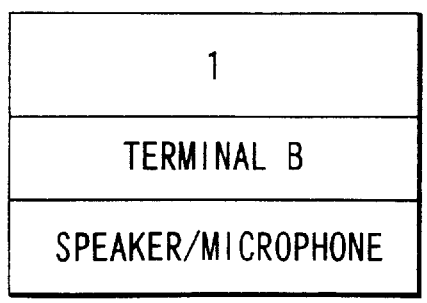
FIG. 58 is a view illustrating a CCB example of the terminal (A) used in the communication system of the eighth embodiment.

As the user A and the user B are engaged in two-way audio communication with each other, their communication resources are the microphone and the speaker. The CCB in the terminal (A) 601 is as shown in FIG. 56. FIG. 58 shows the communication resource management table of the terminal (A) at the time.

It is now desired by the user C to produce an emergency call to the user A for two-way audio communication. The user C demands the HMI control section 635 of the terminal C 801 for starting the two-way audio communication over the microphone and speaker at the priority of 1. After the CCB and the resources are accessed and enabled in the terminal (C) 801, the communication control section 631 of the terminal C 801 requests the communication control section 631 of the terminal (A) 601 for starting the two-way audio communication.

The communication control section 631 of the terminal A 601 directs the CC control section 633 of the terminal (A) 601 to prepare the CCB for the two-way audio communication over the microphone and speaker. The CC control section 633 of the terminal (A) 601 then requires the communication resource management section 632 of the terminal (A) 601 to examine whether the microphone and the speaker are available or not for use.

The communication resource management section 632 of the terminal (A) 601 finds through referring the communication resource management table (FIG. 56) that the microphone and the speaker are occupied by the two-way communication of the call reference number 1 between the user A and the user B. Then, the communication resource management section 632 informs the CC control section 633 that the required communication resources are occupied by the communication of the call reference number 1 and not available.

The CC control section 633 of the terminal (A) 601 then demands the communication resource display 632 for displaying the type and use of the communication resources occupied and the type and use of the communication resources required by the inserted call. An example of the display on the communication resource display 632 is shown in FIG. 59.

The user A monitors the type and use of the communication resources occupied and the type and use of the communication resources required by the inserted call displayed in the communication resource display 632 of the terminal (A) 601 and determines the allocation of its communication resources.

If the user A accepts and allocates all the communication resources required by the user C for the communication with the user C, he directs the allocation demand section 637 of the terminal (A) 601 to implement the allocation.

Figure 60:
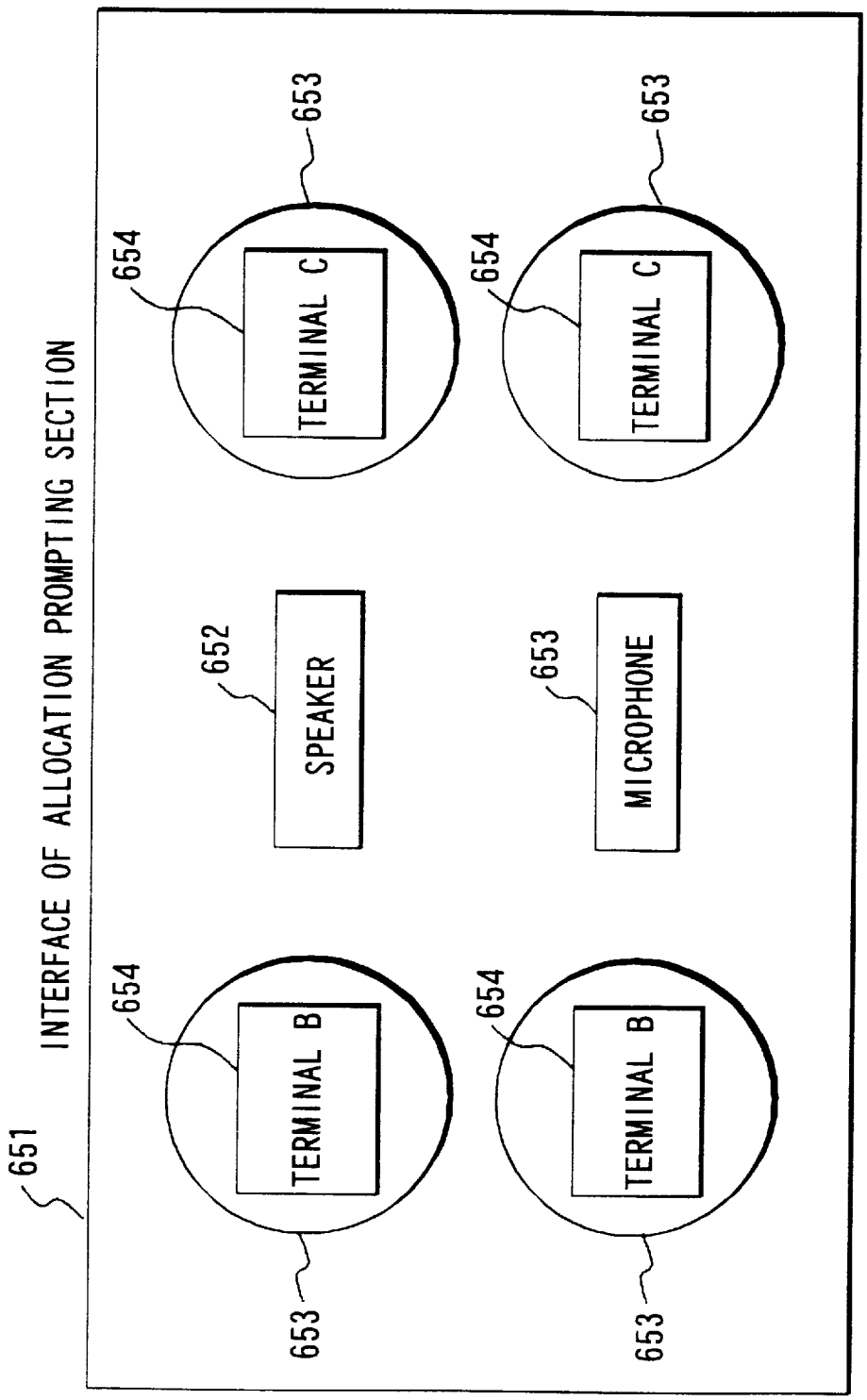
FIG. 60 is a view illustrating an example of an assignment instruction section interface used in the communication system of the eighth embodiment.

FIG. 60 illustrates a human-machine interface 651 provided in the allocation demand section 637. The interface 651 includes panels 652 representing overlap ones of the communication resources.

More particularly, the microphone and the speaker are required by the terminal (C) 801 and displayed as the I/O devices on the panels 652. The two I/O devices are allocated to a desired one of the terminals by pressing down corresponding terminal selection buttons 653.

A panel 654 is indicative of the terminal to which the resources are allocated. As the communication resources on both the terminals are involved for communication, two or more pairs of the selection button 653 and the terminal indication panel 654 shall successfully perform the allocation. Although the call from the terminal (C) 801 is fulfilled with all the required communication resources in this embodiment, the communication resources may be allocated in an arbitrary proportion with the use of a proportion control which is mounted on the interface 651 and preset for desired allocation.

As it is desired that the required communication resources are allocated to the terminal (C) 801, the user A presses the selection button 653, shown in FIG. 60, indicative of the terminal (C) 801. Then, the allocation demand section 637 transmits a signal of the allocation through the bus 639 to the allocation determining section 638. The following steps are identical to those explained in the seventh embodiment. However, the priority is not defined in the CCB.

According to the eighth embodiment, when a call is inserted during the current communication and demands the use of the communication resources which are being occupied by the current communication, the allocation of the communication resources is determined by the user. As the user determines the allocation of the communication resources, its communication will be favorable to the user. Any undesired shift of the mode of communication to another after the current communication is disconnected disregarding the will of the user will thus be prevented.

The sixth to eighth embodiments of the present invention allow the communication resource management section to determine the availability of the communication resources used for the terminals and the network, and the call/connection control section to control the call and connection according to the availability of the communication resources determined by the communication resource management section.

In addition, the allocation determining section is provided for when a second communication is inserted and demands the use of a part or all of the communication resources which are being occupied by a first communication, allocating the communication resources to the first and second communications so that the first and second communications are controlled for optimum exchange of data.

In the communication system with the allocation determining section, there are added the display section for displaying the type and use of the communication resources occupied by the first communication and of the communication resources required by the second communication, and the allocation demand section for allowing the terminal user to determine the allocation of the communication resources from relevant information displayed on the display section and distributing the allocation to the allocation determining section.

This permits the communication resource management section to examine and determine the availability of the communication resources used for the terminals and network and the call/connection control section to control the call and connection of each terminal according to the availability of the communication resources determined by the communication resource management section. Hence, the call and connection are successfully adjusted compatible to the multimedia depending on the availability of the communication resources allocated to the terminals and network. When a second communication is inserted during the connection of a first communication and demands the use of a part or all of the communication resources which are being occupied by the first communication, the allocation determining section determines the allocation of the communication resources to the first and second communications according to the predetermined criteria so that a higher priority can be served first.

As there are provided the display section for displaying the type and use of the communication resources occupied by the first communication and of the communication resources required by the second communication, and the allocation demand section for allowing the terminal user to determine the allocation of the communication resources from relevant information displayed on the display section and distributing the allocation to the allocation determining section, the predetermined criteria can be controlled by the terminal user to represent his intention.

According to the sixth to eighth embodiments, the call and connection are controlled according to information on the availability of the communication resources used for the terminals and network. This allows each user to produce a call any time without discerning the availability of the communication resources at the opposite terminal. If the opposite terminal is low in function and fails to reply the call, its disability is informed. If more than two calls want to use a limited number of the communication resources at one time, a higher priority or emergency call is served first as identified and connected to the communication resources allocated by the predetermined criteria.

FIG. 61 is a schematic diagram of a hardware arrangement of the communication system according to the eighth embodiment.

As shown in FIG. 61, a plurality of computer terminals 1001-1 to 1001-n are connected by a network 1002 to each other. Each of the computer terminals 1001-1 to 1001-n includes a microphone 1005 and a speaker 1006 as audio I/O devices, a camera 1003 as a video I/O device, and a display 1004. The computer terminals with the I/O devices will now be explained in the form of a remote conference service system.

A software arrangement of the system is first explained.

FIG. 62 illustrates the software arrangement of the system in which each of the terminal computers 1001-1 to 1001-n has a service control section 1007 on which a program for implementing the conference service (referred to as a conferencing application hereinafter) is installed. In addition, a set of other programs 1008 than the conferencing application are loaded (referred to as an other application).

Also, in each of the terminal computer 1001-1 to 1001-n, there is a terminal resource management section 1009 provided with another program for controlling the resources including I/O devices and a disk drive (thus, referred to as a resource manager).

Figures 63, 64:
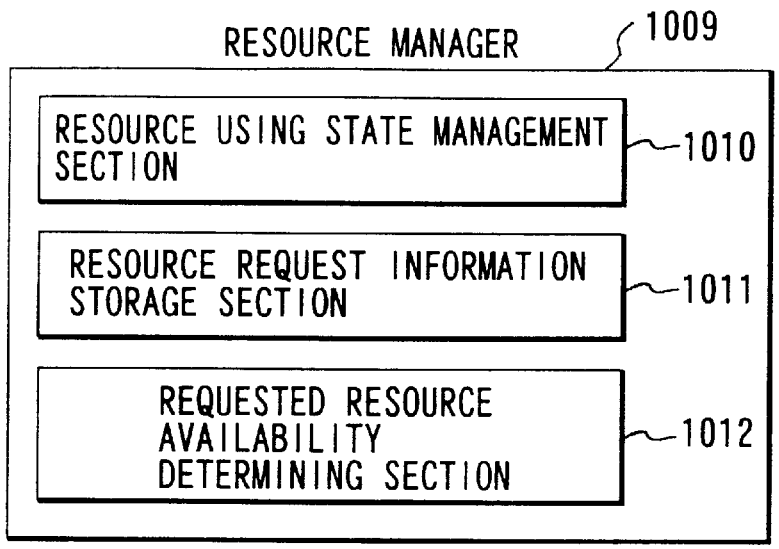
FIG. 63 is a view illustrating a resource manager in the communication system of the ninth embodiment.
FIG. 64 is a view illustrating a resource request information storage section in the communication system of the ninth embodiment.

FIG. 63 shows a structure of the resource manager.

The resource manager comprises a resource using state management section 1010 for controlling the use of the terminal resources, a resource request data storage section 1011 for storing request of the resources from the service control section, and a requested resource availability determining section 1012 for examining availability of the requested resources.

The action of saving the requested resources will now be explained as is a primary feature of the present invention. FIGS. 65 and 66 show steps of the conferencing application saving the required resources before starting the service program. FIG. 65 is a flowchart of the conferencing application and FIG. 66 is a flowchart of the resource manager.

The conferencing application is first activated at any of the computer terminals 1001-1 to 1001-n (Step S5-1 in FIG. 65). The conferencing application starts making communication connections along the communication path (network 1002) between the computer terminals of members of the conference and saving the I/O devices for enabling the conference.

It is noted that the connection is made by the conferencing application of a host computer terminal, for example, to one of the resources or a speaker in an opposite terminal.

The connection to other terminal resources in such a remote conference service is identical. More specifically, the communication environment required for the remote conference service is established by making the connection from the audio and video I/O devices (a microphone and a speaker or a camera and a display) of one computer terminal to those of another terminal.

Although the remote conference service requires not only the terminal resources but also the network resources (including a band width), the description concerns how the terminal resources demanded are saved. The network resources assigned to the terminal resources may be saved. Obtained, or controlled by the same procedure of a resource manager installed in the computer terminal.

It is also noted that signaling protocol used for the connection is based on Q-2931 of Layer 3 UNI of ITU-T (former CCITT).

(1) When requested resource is not busy:

FIG. 67 illustrates a signaling sequence employed for the conferencing application demanding the use of a specific resource. A signaling message is received and transmitted on signaling entities provided in both the terminal and the network. In FIG. 67, the bodies for receiving and transmitting the signaling message are however the conferencing application, the network, and the resource manager for ease of the description which is emphasized in transmission and receipt of negotiation information in the signaling message. This premise is also applied to a signaling sequence shown in FIG. 68.

The conferencing application determines an opposite computer terminal and selects one resource (speaker) from the audio and video I/O devices in the computer terminal. Then, the signaling entity in the host computer terminal is activated to send a signaling message, SETUP to the resource manager of the opposite computer terminal for setting a connection over a given band (Message m8-1 in FIG. 68 and Step S5-2 in FIG. 65). Data defined by the element of broadband high layer information in the SETUP message is transparently transmitted through the signaling entities of the network to the entity in the opposite computer terminal and its field can be exploited for negotiation for saving the required resource. It is noted that the broadband high layer information element (referred to as B-HLI element hereinafter) includes:

Request ID which is an identifier for identifying one from multiple resource requests introduced to the service control section.

Request resource ID which is an identifier for identifying a resource in the opposite terminal to be coupled by the connection.

Standby request switch which resides in two binary values (ON and OFF) representing whether the standby is desired or not when the requested resource is occupied.

The request ID may be an identifier capable of identifying between the resource manager and the service control section (conferencing application) at the request side, and may be expressed by, for example, a combination of a conferencing application ID and a time on which the request is made. In this embodiment, the request resource ID is "audio-out" indicating the audio output device (speaker) and the standby request switch is ON when the standby is desired.

The resource manager of the opposite terminal receives the data defined by the B-HLI element from the signaling entity (Step S6-1 in FIG. 66). The request ID, request resource ID, and standby request switch are stored in the resource request data storage section (Step S6-2). The availability of the requested resource is then examined by the request resource availability determining section (Step S6-3).

The resource request data storage section is a table which is used when the requested resource is occupied and its release is desired and shown in FIG. 64. The requested resource availability determining section examines whether or not the requested resource (speaker) is occupied by another application and if not (i.e. it is judged not busy at Step S6-3), determines the connection to the resource (program for driving the speaker) which is executed by the following steps (Step S6-4 in FIG. 66, Message m7-2 and higher in FIG. 67, and Steps S5-4 and S5-5 in FIG. 65).

(2) When requested resource is busy:

The procedure when the requested resource is busy will be explained. Similar to when the requested resource is not busy, the conferencing application directs the signaling entity of the host terminal to send the signaling message SETUP, for starting the connection over a given band range to the speaker (drive program) of the opposite terminal, to the resource manager which controls the use of the speaker at the opposite terminal (Step S5-2 in FIG. 65 and Message m8-1 in FIG. 68).

The B-HLI element in the SETUP message contains data indicative of the requested resource, as described previously. The resource manager of the opposite terminal receives the data defined by the B-HLI element from the signaling entity (Step S6-1 in FIG. 66). The request ID, request resource ID, and standby request switch are stored in the resource request data storage section (Step S6-2). The availability of the requested resource is then examined by the requested resource availability determining section (Step S6-3).

When the request resource availability determining section judges that the requested resource (speaker) is occupied and not available (busy at Step S6-3), the resource manager instructs the signaling entity to send a message, RELEASE COMPLETE for canceling the connection and the action of making the connection stops (Step S6-5 and Message m8-2).

Simultaneously, when the standby request switch is off with the SETUP message from the service control section of the resource request side (off at Step S6-6), entry of the requested resource in the resource request data storage section is canceled (Step 6-10) and the procedure for the requested resource is terminated (Step S6-11).

The resource manager however proceeds the standby for release of the specific resource (speaker in this embodiment) held in the resource request data storage section (Step S6-7). When the specific resource is unoccupied (yes at Step S6-8), the resource manager directs the signaling entity to send the SETUP message to the service control section of the resource request side in order to advise the release of the resource (Step S6-9 and Message m8-3).

This time, the B-HLI data field of the SETUP message is filled with data of the request ID, resource ID, and standby response from the resource request data storage section.

The resource manager cancels the entry of the resource data in the resource request data storage section (Step S6-10) and the procedure is terminated (Step S6-11).

In the other hand, the conferencing application at the resource request side receives and confirms, through referring the standby response and request ID of the B-HLI element, a reply indicative of the availability of the requested resource (speaker) which has been transmitted from the resource manager of the opposite side via the signaling entity of the host terminal (yes at Step S5-9). The conferencing application directs the signaling entity to answer the SETUP signal with the RELEASE COMPLETE message and then start the connection with SETUP (Step S5-2).

The procedure after starting the connection is identical to that at the startup of the conferencing application.

As the request for saving a desired terminal resource to be used in the service program is carried out during the procedure of signaling (Step S5-10 in FIG. 65), no separate negotiation for saving the resource is needed but the availability of multiple resources is informed respectively. If the requested resource is occupied, the standby mode is used thus increasing the efficiency of usage.

The communication system according to a ninth embodiment of the present invention includes the service control section for controlling the resources of a communication network or the resources of terminals connected to a network to perform a service program. In particular, the service control section allows the signaling message for setup of communication connection to carry data of the resource required for the service control operation and be sent to opposite service control section or resource management section. Upon receiving the signaling a message, the opposite service control section or resource management section examines whether or not the requested resource is available for assignment to the service control section. When it is determined available, the requested resource is assigned to the service control section at the request side and the communication connection is proceeded. Even if it is determined that the resource requested by the request side service control section is not available, the opposite service control section or resource management section allows standby and when the requested resource is available, informs the request side service control section of the availability of the requested resource with the use of a signaling message for setup of communication connection to the request side service control section.

More specifically, the signaling message for setup of communication connection is loaded with the data of the resource required for performing the service control in the system and transmitted to the opposite service control section or resource management section. The opposite service control section or resource management section on receiving the signaling message examines whether or not the requested resource is assigned to the request side service control section. A result of the examination is carried on the signaling message from the opposite side to the request side for setup of the communication connection so that the request side service control section can effectively acknowledge yes or non of the availability of the requested resource installed at the opposite terminal.

When the resource which has been occupied when requested by the request side service control section is released, its release is readily advised on the signaling message by the opposite service control section or resource management section to the request side service control section before making the communication connection. This allows the service control section to stand by and gain the requested resource in spite of previous unsuccessful attempt thus increasing the frequency of use of the resource.

Particularly, the availability of a terminal resource required by a specific application is acknowledged at the setup of connection to the resource in the communication system. The procedure of saving the required resource can thus be effected during the signaling operation for having network resources. If the required resource is occupied, a standby mode is called for gaining the resource. There is no need of performing a negotiation procedure or making a separate connection for advising the release of the resource in a conventional manner. The procedure of saving the required resource will thus be carried out at a higher efficiency.

As set forth above, the present invention eliminates the disadvantage that a service program is prevented from using its required resource which has been unoccupied but not released.

Also, the availability of a terminal resource required by a specific application is acknowledged at the setup of connection to the resource in the communication system. The procedure of saving the required resource can thus be effected during the signaling operation for having network resources. If the required resource is occupied, a standby mode is called for gaining the resource. There is no need of performing a negotiation procedure or making a separate connection for advising the release of the resource in a conventional manner. The procedure of saving the required resource will thus be carried out at a higher efficiency.

For communication between terminals connected to an ISDN system, a call connection message is transmitted from a call terminal to the network which in turn examines whether a communication channel or network resource required by the call terminal is available or not. When available, the call connection message is given to an opposite terminal. If a requirement is not available, no connection is made and the call is repeated. As the availability of resources at the opposite terminal is acknowledged only when a call is connected. Therefore, the call has to be repeated at random and if the opposite terminal is occupied or the network is busy for a considerable length of period, the desired communication will hardly be made. A communication system according to the present invention is provided with a reserve function which reserves the resources of terminals constituting a communication service or the opposite terminal and the resources of a network for making a communication between the terminals without delay. A tenth embodiment of the present invention featuring the reserve function will now be described.

Figure 69:
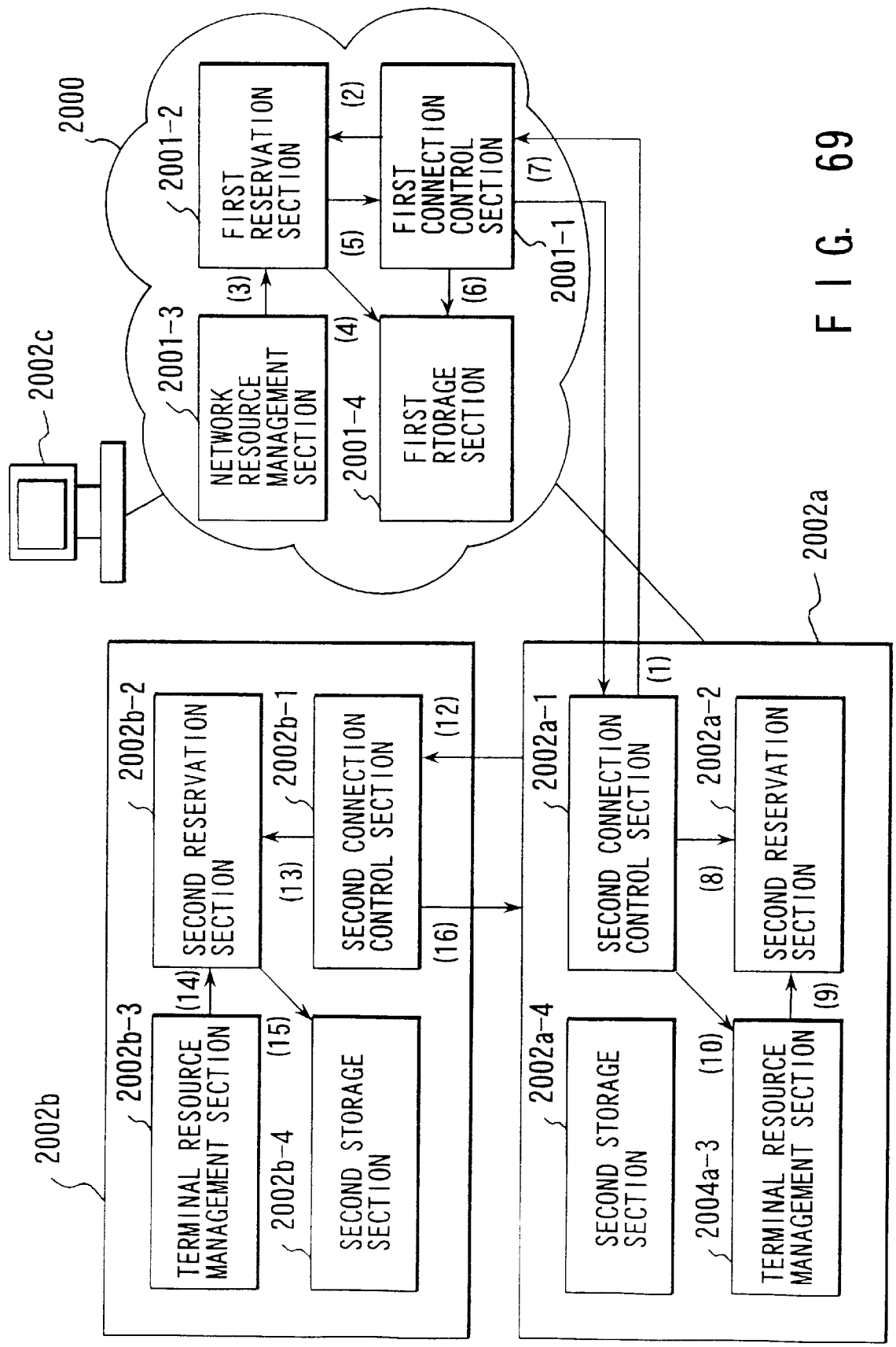
FIG. 69 is a block diagram of a communication system of the tenth embodiment according to the invention.

The tenth embodiment is shown in FIG. 69 in which there are provided a communication network 2001 for communication service and communication terminals 2002a, 2002b, and 2002c for demanding the communication service. A first connection control section 2001-1 permits one or more resources in the communication network 2001 to be connected to the terminals 2002a, 2002b, and 2002c for communication.

A first reserve section 2001-2 when receiving demands of communication reserve from the terminals 2002a, 2002b, and 2002c reserves and defines network resources in the network 2001 with first reserve identifiers. There are also shown a network resource management section 2001-3 for controls the resources in the network 2001 and a first storage section 2001-4 for storage of the relation between the first reserve identifier and a reserve data defined by the first reserve identifier. Also, second connection control sections 2002a-1, 2002b-1, and 2002c-1 (not shown) make connections between terminal resources reserved in their respective terminals 2002a, 2002b, and 2002c and the network resources reserved with the first reserve identifiers.

There are also connected second reservation sections 2002a-2, 2002b-2, and 2002c-2 (not shown) for saving the resources required by the terminals 2002a, 2002b, and 2002c respectively for the communication service, and resource management sections 2002a-3, 2002b-3, and 2002c-3 (not shown) for controlling the resources in the terminals 2002a, 2002b, and 2002c.

Second storage sections 2002a-4, 2002b-4, and 2002c-4 (not shown) are provided for storage of the relation between the first identifiers and local terminal reserve identifiers of their respective terminals 2002a, 2002b, and 2002c, and reserve data defined by the local terminal reserve identifiers.

The procedure of communication reserve operation is illustrated in FIG. 69, in which the network and terminal resources are reserved with the terminals 2002a, 2002b, and 2002c connected for having a conference.

When the terminal 2002a starts the three-party conference across the network, it carries out a series of reserve action steps for reserving required network resources. More specifically, the terminal 2002a sends to the network 2001 a communication reserve message for reserving the required network resources (Step 1). The communication reserve message includes parameters of the type of service (the three-party conference in this embodiment), the communication setup start absolute time/relative time/resource hold time (communication setup start time xx:yy:zz), the initiative for communication setup (at initiative of the network), and the address (telephone number) of the member terminals.

The network 2001 upon receiving and examining the communication reserve message at its first connection control section 2001-1 identifies the network resources required for the service (of the three-party conference) by the terminal 2002a and demands its first reserve section 2001-2 for issuing the corresponding first identifiers (Step 2).

In response, the first reserve section 2001-2 of the network 2001 consults the network resource management section 2001-3 (Step 3) to save the required network resources and issue their corresponding first reserve identifiers. The first reserve section 2001-2 then generates a table for defining a combination of the required network resources and their first reserve identifiers and stores it in the first storage section 2001-4 (Step 4).

FIG. 70 shows an example of the table carrying combination data stored in the first storage section 2001-4. The first reserve section 2001-2 also transmits the first reserve identifiers to the first connection control section 2001-1 (Step 5). Then, the first connection control section 2001-1 produces a list of the member terminals which participate the three-party conference relative to the first reserve identifiers through reading the parameters in the communication reserve message and saves it in the first storage section 2001-4 (Step 6).

FIG. 71 shows an example of the list carrying combination data stored in the first storage section 2001-4. The first connection control section 2001-1 also prepares and loads a reserve receipt message to the terminal 2002a with the first reserve identifiers (Step 7).

This is followed by the second control section 2002a-1 of the terminal 2002a determining the terminal resources required for the thee-party conference as well as the first reserve identifiers and demanding the second reservation section 2002a-2 for reserve action (Step 8).

The second reservation section 2002a-2 consults the terminal resource management section 2002a-3 for saving the required terminal resources (Step 9), issues local terminal reserve identifiers, generates a table of the terminal resources relative to their respective local terminal reserve identifiers, and stores it in the second storage section 2002a-4 (Step 10).

In addition, the second reservation section 2002a-2 generates a table of the local terminal reserve identifiers relative to their respective first reserve identifiers, and stores it in the second storage section 2002a-4 (Step 11).

The terminal 2002a also saves the terminal resources in the other member terminals 2002b and 2002c using the following steps. The connection control section 2002a-1 of the terminals 2002a determines the first identifiers and sends a communication reserve message to the terminals 2002b and 2002c (Step 12).

The action of saving the required terminal resources in the terminal 2002b is now explained while the same is carried out in the terminal 2002c. The second control section 2002b-1 of the terminal 2002b determines the terminal resources required for the thee-party conference as well as the first reserve identifiers and demands the second reservation section 2002b-2 for reserve action (Step 13).

The second reservation section 2002b-2 consults the terminal resource management section 2002b-3 for saving the required terminal resources (Step 14), issues local terminal reserve identifiers, generates a table of the terminal resources relative to their respective local terminal reserve identifiers, and stores it in the second storage section 2002b-4 (Step 15).

FIG. 72 illustrates an example of the table carrying combination data stored in the second storage section 2002b-4. The second reservation section 2002a-2 further generates a table of the local terminal reserve identifiers relative to their respective first reserve identifiers, and stores it in the second storage section 2002b-4 (Step 16).

FIG. 73 shows an example of the table carrying combination identifier data stored in the second storage section 2002b-4. The second connection control section 2002b-1 finally returns a reserve completion message to the terminal 2002a (Step 16). The procedure of reserve operation is completed. Although the procedure of reserving the required terminal resources is commenced by the service host terminal, it may be performed by the network.

The action of starting the reserved communication service will now be described.

The reserved communication service determined by the above steps is the three-party conference which starts at the predetermined absolute time xx:yy:zz under the initiative of the network. The network 2001 upon being advised by its built-in clock function that the time arrives at xx:yy:zz reads from its first storage section 2001-4 the address of the member terminals 2002a, 2002b, and 2002c for the three-party conference, determines the first reserve identifiers, and sends out the communication setup demand to the member terminals 2002a, 2002b, and 2002c. When receiving the communication setup demand from the network 2001, the member terminals 2002a, 2002b, and 2002c enable the required terminal and network resources stored in their respective second storage sections 2002a-4, 2002b-4, and 2002c-4 (not shown) and defined by their respective first reserve identifiers.

At the time, the enabling of the reserved terminal resources is almost forcedly executed. Even if the terminal resources are busy for unreserved communications, they are forcedly released by terminating or canceling the unreserved communications on the way. When the existing communication is of a reserved mode and its operating time is up, it will be forced to release the resources. It is thus understood that a function is essential in the communication system for accepting a reserve of communication only when it overlaps with no other communications to prevent double booking.

Accordingly, upon the predetermined start time being reached, the member terminals 2002a, 2002b, and 2002c commence their communication to each other through the network 2001 under the desired conditions (of time and resources).

FIG. 74 shows an action of starting the connection at the initiative of the network, in which the call setup message (SETUP) is given from the network 2001 to each of the member terminals 2002a, 2002b, and 2002c at the predetermined or reserved time.

Accordingly, the member terminals 2002a, 2002b, and 2002c for the three-party conference can thus be connected instantly to each other by the start call from the network for the conference over the required resources when they are in the standby mode with their required resources being unoccupied.

Although the start of the communication is defined by the absolute time in the above description, it may be controlled by a relative time such as "some minutes later". It is also possible to determine a desired time by which the network resources are saved and before the time, allow the terminals to specify the communication setting at their own initiative.

An action at the initiative of the terminals is shown in FIG. 75. This action is a case in which the connection is started by the terminal 2002a. When the predetermined time arrives, the terminal 2002a specifies the first reserve identifiers and sends out the communication setup demand to the network 2001. The network 2001 thus receives the demand through its first connection control section 2001-1. The first connection control section 2001-1 reads the network resources defined by the first reserve identifiers from the first storage section 2001-4 and allows them to connect to the terminal 2002a.

The first connection control section 2001-1 of the network 2001 also retrieves the address of the required terminal resources defined by the first reserve identifiers from the first storage section 2001-4 and sends out the communication setup demand with the relevant first reserve identifiers to the other terminals 2002b and 2002b than the start terminal 2002a.

The message of the communication setup demand for saving the required terminal resources may be delivered to the terminals either in a sequence or at once time.

The above description is based on the fact that the member terminals 2002a, 2002b, and 2002c and the network 2001 have been informed of the resources required by a desired service. Instead, a data base DB including data of the resources may be provided separately and used for starting the service.

Also, in the prescribed system, the first reserve identifiers are determined for specifying and saving the resources in the network 2001 on reservation and then, utilized to define the required resources at each terminal. It is understood that the terminal resources may first be saved before specifying the network resources.

In this case, the first reserve identifiers are transmitted to the other member terminals 2002b and 2002c only when the start terminal 2002a has completed to make a reserve of communication to the network 2001. Although the fundamental units are installed in each terminal of the embodiment, they may be assigned to one single terminal or separately allocated in different terminals.

According to the final embodiment of the present invention, the networks and terminal resources are reserved in advance and enabled at a predetermined time to start a desired communication service. Also, the network resources and the terminal resources are separately saved by the reserve units for allowing the network and the terminals to build an organic system for optimum communications as well as to develop a novel communication service with reservation.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A communication system comprising:

a plurality of terminals capable of processing a medium or media;

an available terminal information storage section for storing a terminal or terminals available for each user;

an available media information storage section for storing the medium or media available for each terminal;

a determination section for determining, on the basis of contents of said available terminal information storage section and said available media information storage section, at least one of a combination of one or more media and a combination of one or more terminals which are available for each of users participating in communication in accordance with a communication request; and a call/connection control section for setting a call/connection for some of said terminals which correspond to the at least one combination determined by said determination section.

2. The communication system according to claim 1, wherein said determination section is provided with functions for determining media used for communications from media specified by the communication request, media available for the user on a calling user side and media available for the user on a called user side, and determining a combination of terminals available for the user on the calling user side and a combination of terminals available for the user on the called user side to use the media determined.

3. The communication system according to claim 1, wherein said determination section further comprises a section for reporting a communication failure to a user or a terminal that has made a communication request, when the combinations of the media and terminals capable of communicating between users participating in communication are undetermined.

4. The communication system according to claim 1, wherein said determination section further comprising a reporting section for reporting determined or undetermined media to a user or a terminal that has made a communication request, when the combinations of media and terminals which are capable of communication between users participating in communication are determined only in a part of the media.

5. The communication system according to claim 1, wherein said determination section further comprises a setting/releasing section for setting/releasing a call/connection only for determined media when the combinations of media and terminals which are capable of communication between users participating in communication are determined only in a part of the media.

6. The communication system according to claim 1, wherein said available terminal information storage section updates a stored content of the terminal available for each user in accordance with at least any of a movement of the user, power ON/OFF of the terminal or connection and disconnection to a subscriber's line of the terminal.

7. The communication system according to claim 1, wherein said available media information storage section updates a stored content of the media available for each terminal in accordance with at least attaching/detaching of an I/O device.

8. The communication system according to claim 1, which further comprises one or more media conversion sections for performing media-conversion among media usable in communication and one or more available media conversion information storage sections for storing types of the media to be converted and positional information representing a media position in a communication system; and
    wherein said determination section is provided with a function for repeatedly starting said available media conversion information storage sections to search at least one of said media conversion sections for connecting the media used by a first user and the media used by a second user, and determining the media available for each user participating in communication and at least one of said media conversion sections for connecting between the media, when there are no media commonly available among users participating in communication.

9. The communication system according to claim 1, which further comprises plural available multi-point media processing sections for arithmetically processing plural media-information, and an available multi-point media processing information storage section for storing a media processing class, available media and positional information within said communication system, as information regarding said available multi-point media processing sections; and
    wherein said determination section determines, at least one of said available multi-point media processing sections on the basis of a communication mode specified by a communication request and media available for each user participating in communication; and
    said call/connection control section controls setting of connections between a determined one of said available multi-point media processing section and said terminal available in communication, in accordance with topology based on said communication mode.

10. The communication system according to claim 1, which further comprises an adjusting section for adjusting and determining at least one of a media combination of one or more media and a terminal combination of one or more terminals among users participating in communication.

11. A communication control method for a communication system comprising the steps of:
    preparing a media conversion section for performing a media conversion among plural media information objects and a storage section for respectively storing a terminal available for each user and media available for each terminal;
    obtaining one or more terminals available for respective users participating in communication on the basis of a content of said storage section in accordance with a communication request containing information for identifying the users participating in the communication and information for identifying types of said media;
    obtaining one or more media realization schemes available for the respective users participating in the communication on the basis of information of said storage section for portions or all of the obtained terminals;
    determining one or more media realization schemes and a combination of terminals used by the respective users participating in the communication and a media conversion section for performing a media conversion; and
    setting a call/connection based on a determination result.

12. The communication control method for the communication system according to claim 11, wherein said preparing step includes providing various multi-spot media processing sections for performing arithmetic processing among plural media information objects; said determining step includes determining an optimal one from the available multi-point media processing sections according to a communication mode specified by information regarding communication modes contained in the communication request; and said setting call/connection step includes setting the call/connection on the basis of information regarding the media realization schemes and the combination of terminals, the available conversion sections and the determined available multi-point media processing section.

13. The communication control method for the communication system according to claim 11, wherein said call/connection setting step includes setting/releasing the call/connection only for determined media realization scheme when combinations of media realization schemes and terminals which are available among users participating in the communication are determined only in portions of the media realization schemes.

14. A communication control method for a communication system comprising the steps of:
    inputting a communication request containing information regarding at least one or more called users and one or more media that the user wishes to communicate with;
    adjusting and determining at least one of a media combination of one or more media and a terminal combination of one or more terminals among users participating in the communication according to the communication request; and
    setting call/connections for at least one of the media combination and the terminal combination when at least one of the media combination and the determined terminal combination is available.

15. A communication system comprising:
    a communication request input section for accepting the input of the communication request containing information regarding one or more called users and one or more media the user wishes to communicate with;
    a candidate determination section for determining one or more sets each including at least one of a media combination of one or more media and a combination of one or more terminals which are available for each of users participating in a communication in order to satisfy a part of a communication request;

a user intention reflex section for reporting to the user or a different user participating in the communication at least one of a candidate of the combination of one or more media and a candidate of the combination of terminals, selecting one of the candidates and determining permission of the communications based on the selected candidate or a change of the communication request in accordance with an input of the user who has received the report; and a setting section for setting call/connections on the basis of a determination result of said user intention reflex section.

16. The communication system according to claim 15, which further comprises a communication request change section for allowing the user to input a content of the change when said user intention reflex section selects the change of the communication request.

17. The communication system according to claim 15, which further comprises an inter-user adjusting section for making an adjustment regarding the selection of the combination candidate or the change of the communication requests between at least two or more users participating in the communication when said user intention reflex section determines that non-coincidence occurred among the inputs of a plurality of users or such non-coincidence may occur.

18. A communication system comprising as one of a plurality of terminals interconnected by a network a terminal unit capable of processing one or more media, wherein said terminal unit includes:

a communication request input section for inputting by a user information regarding one or more called users and one or more media the user wishes to communicate with;

a user intention reflex section for reporting to the user or a different user participating in a communication at least one of a combination of one or more media and a combination of terminals which are available for satisfying at least portions of the communication request at the time of issuance thereof, selecting one of the combinations, and determining permission of the communications based on the selected combination or a change of the communication request in accordance with an input of the user who has received the report; and a setting section for setting call/connections based on a determination result of said user intention reflex section.

19. A communication system comprising:

a plurality of service control sections for connecting a plurality of terminals having various resources to a communication network and providing services by using resources of this communication network or various resources of the terminals connected to the communication network;

a reservation section for reserving resources which one of said service control sections needs to provide desired services when the resources are not available because another service control section has acquired the same;

a management section for managing use of the resources; and a report section for reporting, when said reserved resources are released, the release thereof to said service control section for providing the desired services based on information of said management section.

20. A communication system comprising:

a plurality of service control sections for connecting a plurality of terminals having various resources to a communication network and providing services by using resources of this communication network or various resources of the terminals connected to the communication network;

a release request section for requesting release of resources which one of said service control section needs to provide desired services when the resources are not available because another service control section has acquired the same; and a resource release section for releasing resources depending on requests of said release request section.

21. A communication system comprising:

a network having plural resources;

a plurality of terminals connected to said network and provided with various resources;

a plurality of service controllers for providing a desired service, using said resources of said network or said terminals;

a report section for reporting said resources required by said service controllers to provide the desired service and priority thereof;

a release section for releasing the resources corresponding to one of said service controllers when the resources that one of said service controllers requested to provide a desired service have been already secured by the other of said service controllers, and if said the other service controller has a priority lower than said one service controller.

22. A communication system comprising:

a plurality of service control sections for realizing a desired service by controlling resources of a network or resources of terminal units connected to said network;

a management section for managing using state of said resources;

a transmission section for setting information representing the resources required for controlling the service in an available one of said service control sections as requested resource information in a signaling message when setting a communication connection;

a determination section for recognizing requested resources on the basis of the requested resource information in the signaling message and determining whether or not the recognized resource should be allocated to said available one of said service control sections; and a control section for controlling said system to execute continuously a sequence for setting the communication connection, using a destination of the setting communication connection as the requested resource, when said determination section determines a resource allocation, and to stop setting of the communication connection when said determination section rejects the resource allocation.

23. A communication system comprising:

a plurality of terminals connected to a network and having plural resources;

a receipt section for receiving a reservation register for reserving the resources of at least one of said terminals which is used for realizing a communication service, a reservation time and a called user terminal;

a call generator for generating a call to said called user terminal at the reservation time on the basis of the reservation register; and a control section for securing reserved ones of said resources and enabling a communication in response to the call.

24. A communication system comprising:

a plurality of terminals connected to a network having plural resources;

a first reservation section for reserving one or more resources of said network and outputting a first reservation identifier in response to a request of a first one of said terminals;

a first storage section for storing a relationship between the first reservation identifier and reservation contents including at least a reserved time and reserved resources which are reserved by the first reservation identifier;

a first connection control section for realizing a communication service by connecting said reserved resources to said terminals;

a second reservation section for reserving terminal resources via said terminals associated with the communication service performed by said first terminal in accordance with a request issued directly or through said network from said first terminal;

a second storage section for storing a relationship between the first reservation identifier and said terminal resources reserved by said terminals associated with the communication service; and a second connection control section for connecting said terminal resources to said resources of said network reserved by the first reservation identifier in accordance with a correspondence relation between the first reservation and said reserved terminal resources.

25. A communication system according to claim 24, wherein the first reservation identifier is contained in a communication setting request for requesting a communication from said first connection control section to all the terminals associated with the communication to be realized when the communication is realized, and said terminals corresponding to the communication setting request obtains said resources reserved by the first reservation identifier from said second storage section and are connected to said resources of said network which correspond to the communication setting request.

* * * * *